United States Patent
Macloud et al.

(10) Patent No.: US 11,775,699 B2
(45) Date of Patent: Oct. 3, 2023

(54) EXTRACTING GRASPING CUES FROM TOOL GEOMETRY FOR DIGITAL HUMAN MODELS

(71) Applicant: Dassault Systemes Americas Corp., Waltham, MA (US)

(72) Inventors: Alexandre Macloud, Montreal (CA); Louis Rivest, Montreal (CA); Ali Zeighami, Montreal (CA); Pierre-Olivier Lemieux, Montreal (CA); Rachid Aissaoui, Montreal (CA)

(73) Assignee: DASSAULT SYSTEMES AMERICAS CORP., Waltham, MA (US)

( * ) Notice: Subject to any disclaimer, the term of this patent is extended or adjusted under 35 U.S.C. 154(b) by 324 days.

(21) Appl. No.: 16/864,484

(22) Filed: May 1, 2020

(65) Prior Publication Data

US 2020/0349299 A1    Nov. 5, 2020

Related U.S. Application Data

(60) Provisional application No. 62/842,350, filed on May 2, 2019, provisional application No. 62/842,371, filed
(Continued)

(51) Int. Cl.
*G06F 30/12*    (2020.01)
*G06F 30/10*    (2020.01)
(Continued)

(52) U.S. Cl.
CPC .............. *G06F 30/12* (2020.01); *G06F 30/10* (2020.01); *G06V 10/22* (2022.01); *G06V 10/44* (2022.01);
(Continued)

(58) Field of Classification Search
CPC ............................... G06V 10/22; G06V 10/44
See application file for complete search history.

(56) References Cited

U.S. PATENT DOCUMENTS 10,576,625 B1 *  3/2020  Stubbs ................. H05K 999/99
11,620,416 B2     4/2023  Lemieux et al.
(Continued)

OTHER PUBLICATIONS

Goussous, et al. "A New Methodology for Human Grasp Predication" IEEE Transactions on Systems, Man, and Cybernetics—Part A: Systems and Humans, vol. 39, No. 2, Mar. 2009 (Year: 2009).
(Continued)

*Primary Examiner* — Brian T Pendleton
*Assistant Examiner* — Frank Johnson
(74) *Attorney, Agent, or Firm* — Hamilton, Brook, Smith & Reynolds, P.C.

(57) ABSTRACT

Grasping remains a complex topic for simulation. Embodiments provide a method to automatically determine grasping cues for tools. An example embodiment scans a CAD model representing a real-world tool to generate a series of sections from the CAD model. In turn, properties of each section are extracted and one or more regions of the CAD model are identified based upon the extracted properties and a tool family to which the tool represented by the CAD model belongs. To continue, a respective classification for each of the one or more identified regions is identified and grasping cues for the CAD model are generated based upon the determined respective classification for each of the one or more regions.

20 Claims, 31 Drawing Sheets

Related U.S. Application Data on May 2, 2019, provisional application No. 62/842,337, filed on May 2, 2019.

(51) Int. Cl.
| | |
|---|---|
| *G06V 10/22* | (2022.01) |
| *G06V 10/44* | (2022.01) |
| *G06V 20/64* | (2022.01) |
| *G06F 111/04* | (2020.01) |

(52) U.S. Cl.
CPC ........ *G06V 20/653* (2022.01); *G06F 2111/04* (2020.01); *G06V 2201/06* (2022.01)

(56) References Cited

U.S. PATENT DOCUMENTS

| | | | | |
|---|---|---|---|---|
| 2009/0173560 | A1* | 7/2009 | Nakamoto | B25J 9/1612 700/259 |
| 2010/0256790 | A1* | 10/2010 | Teran-Matus | G06F 30/00 700/118 |
| 2012/0004774 | A1* | 1/2012 | Umetsu | B25J 9/1697 700/254 |
| 2014/0163731 | A1* | 6/2014 | Shi | B25J 9/1612 700/250 |
| 2014/0371871 | A1* | 12/2014 | Farina | A61F 2/54 623/24 |
| 2019/0248003 | A1* | 8/2019 | Nagarajan | B25J 9/1697 |
| 2019/0366539 | A1* | 12/2019 | Arisoy | B25J 9/1612 |
| 2020/0316782 | A1* | 10/2020 | Chavez | B25J 9/1697 |
| 2020/0349300 | A1 | 11/2020 | Lemieux et al. | |
| 2021/0031375 | A1* | 2/2021 | Drumwright | B25J 9/1612 |
| 2022/0348409 | A1* | 11/2022 | Sun | B25J 9/0093 |
| 2023/0021942 | A1 | 1/2023 | Zeighami et al. | |
| 2023/0169225 | A1 | 6/2023 | Brouillette et al. | |
| 2023/0177228 | A1 | 6/2023 | Bourret et al. | |
| 2023/0177437 | A1 | 6/2023 | Bourret et al. | |

OTHER PUBLICATIONS

Al-Masri, et al. "Human-Like Motion Based on a Geometrical Inverse Kiematics and Energetic Optimization" 2008 IEEE/RSJ International Conference on Intelligent Robots and Systems (Year: 2008).
Leon, et al. "From Robot to Human Grasping Simulation" 2014, Springer, Cognitive Systems Monographs vol. 19 (Year: 2014).
Johns, et al. "Deep Learning a Grasp Function for Grasping under Gripper Pose Uncertainty" 2016 IEEE/RSJ International Conference on Intelligent Robots and Systems (IROS) (Year: 2016).
Abdel-Malek, K., et al., "Santos: an integrated human modeling and simulation platform, in DHM and Posturography". 2019, Elsevier. p. 63-77.
Abdel-Malek, K., et al., "Towards a new generation of virtual humans. International Journal of Human Factors Modelling and Simulation", 2006. 1(1): p. 2-39.
Afyouni, I, et al. "Spatial models for context-aware indoor navigation systems: a survey", Journal of Spatial Information Science, 2012, 1 (4), pp. 85-123.
Baerlocher, P. and R. Boulic, An inverse kinematic architecture enforcing an arbitrary number of strict priority levels. The visual computer, 2004. 20(6): p. 402-417.
Bataineh, M., et al. "Neural network for dynamic human motion prediction", Science Direct, Expert Systems with Applications, 48 (2015) 26-34.
Bhatia, N., et al., "Modeling visually guided hand reach for Digital Human Models", Science Direct, 6th Internatioanl Conference on Applied Human Factors and Ergonomics (WHFE 2015) and the Affiliated Conferences, AHFE 2015, Procedia Manufacturing 3 (2015) 3820-3827.
Björkenstam, S., et al., "Enhancing digital human motion planning of assembly tasks through dynamics and optimal control", Science Direct, Procedia CIRP, 2016. 44: p. 20-25.

Burns, E., et al., "The hand is more easily fooled than the eye: Users are more sensitive to visual interpenetration than to visual-proprioceptive discrepancy". Presence: teleoperators & virtual environments, 2006. 15(1): p. 1-15.
Chaffin, D.B., "Digital Human Modeling for Workspace Design", Reviews of Human Factors and Ergonomics, Dec. 2008.
Chaffin, D.B., "Human motion simulation for vehicle and workplace design", Human Factors and Ergonomics in Manufacturing & Service Industries, 2007. 17(5): p. 475-484.
Chaffin et al., "Simulating Reach Motions", Society of Automotive Engineers, Inc. 1999.
Diffrient et al., "Humanscale 7/8/9," 1982, The MIT Press.
Faraway, J.J., "Regression analysis for a functional response. Technometrics," 1997. 39(3): p. 254-261.
Feyen, R., et al., "Computer-aided ergonomics: a case study of incorporating ergonomics analyses into workplace design". Applied ergonomics, 2000. 31(3): p. 291-300.
Frazzoli, E., et al. "Algorithmic Foundations for Robotics X", Proceedings of the Tenth Workshop on the Algorithmic Foundations of Robotics, 2013.
Jung, E.S. and J. Choe, "Human reach posture prediction based on psychophysical discomfort," International Journal of Industrial Ergonomics, 1996. 18(2-3): p. 173-179.
Jung, E.S., et al., "Upper body reach posture prediction for ergonomic evaluation models". International Journal of Industrial Ergonomics, 1995. 16(2): p. 95-107. (Science Direct).
LaValle, S.M., et al. "Randomized Kinodynamic Planning", The International Journal of Robotics Research, vol. 20, No. 5, May 5, 2001, pp. 378-400.
Lehericey, F., "Iterative and Predictive Ray-Traced Collision Detection for Multi-GPU Architectures," Graphics [cs.GR]. 2013.
Li, Y., et al. "On motion planning for narrow-clearance assemblies using virtual manikins" Science Direct, 51st CIRP Conference on Manufacturing Systems, Procedia CIRP 72 (2018) 790-795.
Liu, Y. and N.I. Badler, "Real-time reach planning for animated characters using hardware acceleration.", in Proceedings 11th IEEE international workshop on program comprehension. 2003. IEEE.
Macloud, A., et al., "Extracting Grasping Cues From One-Handed Tools Geometry for Digital Human Models," (2019).
Namgung, I., "Path space approach for planning 2d shortest path based on elliptic workspace geometry mapping", KSME international Journal, 2004. 18(1): p. 92-105.
Park, W., et al., "Toward memory-based human motion simulation: development and validation of a motion modification algorithm", IEEE transactions on systems, man, and cybernetics—Part A: Systems and Humans, 2004. 34(3): p. 376-386.
Peinado, M., et al., "Full-body avatar control with environment awareness". IEEE Computer Graphics and Applications, 2009. 29(3): p. 62-75.
Perez, M.A., "Prediction of whole-body lifting kinematics using artificial neural networks", 2005, Virginia Tech.
Pettré, J., et al., "Planning human walk in virtual environments", in IEEE/RSJ International Conference on Intelligent Robots and Systems. 2002. IEEE.
Pettré, J., et al., "A 2-Stages Locomotion Planner for Digital Actors", Eurographics, SIGGRAPH Symposium on Computer Animation (2003).
Reed, M.P, et al., "The HUMOSIM Ergonomics Framework: a New Approach to Digital Human Simulation for Ergonomic Analysis", SAE Technical Papers, Jul. 2006.
Reed, M.P. and D.W. Wagner, "An integrated model of gait and transition stepping for simulation of industrial workcell tasks", SAE Transactions, 2007: p. 2062-2072.
Russell, S., et al., "Artificial Intelligence a Modern Approach" 3rd Edition Pearson Education, Inc. 2010.
Ryan, P.W., Cockpit Geometry Evaluation. vol. V. Validation. 1969, Boeing Co Seattle WA Military Aircraft Systems Div.
Siciliano, B., et al., "Robotics—Modeling, Planning and Control", Advanced Texbooks in Control and Signal Processing (2009).
Wagner, D.W., et al, "Predicting foot positions for manual materials handling tasks", SAE transactions, 2005: p. 2872-2876.

(56) References Cited

OTHER PUBLICATIONS

Yang, L., et al. "Survey of Robot 3D Path Planning Algorithms", Journal of Control Science and Engineering, vol. 2016, Sril ID 7426913, 22 pages.
Zhang, X., et al., "Optimization-based differential kinematic modeling exhibits a velocity-control strategy for dynamic posture determination in seated reaching movements", Journal of Biomechanics 31 (1998) 1035-1042.
Zhao, L., et al., "Applying Empirical Data on Upper Torso Movement to Real-time Collision-free Reach Tasks", SAE Technical Papers—Jun. 2005.
Zheng, Y., et al., "Ray-Shooting Algorithims for Robotics", Disney Research Pittsburgh, 2012.
Bourret, Q., et al., "Ergo4All: an Ergonomic Guidance Tool for Non-ergonomist", in: Black N.L., Neumann W.P., Noy I. (eds) Proceedings of the 21st Congress of the International Ergonomics Association (IEA 2021). IEA 2021.
Cort, J.A. and Devries, D., "Accuracy of Postures Predicted Using a Digital Human Model During Four Manual Exertion Tasks, and Implications for Ergonomic Assessments", IISE Transactions on Occupational Ergonomics and Human Factors, 7:43-58 (2019).
Hogberg, D., et aL, "IMMA—Intelligently Moving Manikins in Automotive Applications", Third International Summit on Human Simulation (ISHS2014) 2014.
Lemieux, Pierre-Olivier, et al., "A visual acuity constraint for digital human modeling", Conference proceedings 4th. 2016.
Perez, J., et al., "Ergonomists' and Engineers' Views on the Utility of Virtual Human Factors Tools", Human Factors and Ergonomics in Manufacturing & Services Industries, 25 (3) 279-293 (2015).
Zeighami, A., et al., "Stepping behavior for stability control of a digital human model", AISB/ASB 2019.
Au, O.K.-C., et al., "Skeleton extraction by mesh contraction," in: ACM transactions on graphics, vol. 27, No. 3, article 44, (2008).
Baerlocher, P., "Inverse kinematics techniques of the interactive posture control of articulated figures," [Ph. D. thesis]. Ecole Polytechnique Federale de Lausanne (EPFL) (2001).
Berscheid, L., et al., "Improving Data Efficiency of Self-supervised Learning for Robotic Grasping," arXiv preprint arXiv:1903.00228, (2019).
Bohg, J. and D. Kragic, "Learning grasping points with shape context," Robotics and Autonomous Systems, vol. 58, No. 4, pp. 362-377 (2009).
Bohg, J., et al., "Data-driven grasp synthesis—a survey," *IEEE Transactions on Robotics*, 30(2), 289-309 (2014).
Buss, S.R. and Kim, J.- S., "Selectively damped least squares for inverse kinematics," Journal of Graphics tools, 10(3). 37-49 (2004).
Cheze, L., et al., "Determination of the number of degrees of freedom of the trapeziometacarpal joint—an in vitro study," IRBM, 33(4):271-277 (2012).
Cornea, N.D., et al., "Curve-skeleton properties, applications, and algorithms," IEEE Transactions on Visualization & Computer Graphics, 20 pages (2007).
Cutkosky, M.R. and R.D. Howe, "Human Grasp Choice and Robotic Grasp Analysis," In *Dextrous Robot Hands*, Springer-Verlag, pp. 5-31 (1990).
Cutkosky, M.R., "On grasp choice, grasp models, and the design of hands for manufacturing tasks," IEEE Transactions on robotics and automation, 5(3): 269-279 (1989).
Díaz, C., et al., "Grasping points for handle objects in a cooperative disassembly system," IFAC Proceedings vols. 40: 126-131 (2007).
Ekvall, S. and Kragic, D., "Interactive grasp learning based on human demonstration," in Robotics and Automation, Proceedings. ICRA'04. 2004 IEEE International Conference on, IEEE, 3519-3524 (2004).
El-Khoury, S. and A. Sahbani, "A new strategy combining empirical and analytical approaches for grasping unknown 3D objects," Robotics and Autonomous Systems, 34 pages (2009).
El-Khoury, S., "Approche Mixte, Analytique et par Apprentissage, pour la Synthèse d'une Prise Naturelle" (Thesis, Pierre et Marie Curie University, Paris, France, 2008).

Endo, Y., et al., "An application of a digital hand to ergonomic assessment of handheld information appliances," SAE Technical Paper (2006).
Endo, Y., et al., "A computer-aided ergonomic assessment and product design system using digital hands," in International Conference on Digital Human Modeling, Springer, 833-842 (2007).
Endo, Y., et al., "Virtual grasping assessment using 3D digital hand model," in Annual Applied Ergonomics Conference: Celebrating the Past-Shaping the Future (2007).
Endo, Y., et al., "Optimization-based grasp posture generation method of digital hand for virtual ergonomics assessment," SAE international journal of passenger cars-electronic and electrical systems, 1 (2008-01-1902). 590-598 (2009).
Feix, T., et al., "The grasp taxonomy of human grasp types," IEEE Transactions on Human-Machine Systems, 46(1): 66-77 (2016).
Fischer, M., et al., "Learning techniques in a dataglove based telemanipulation system for the DLR hand," in Robotics and Automation, Proceedings. 1998 IEEE International Conference on, (1998), IEEE, 1603-1608 (1998).
Goussous, F. A., "Grasp Planning for digital humans," Thesis, University of Iowa, 87 pages (2007).
Holleman, C. and L.E. Kavraki, "A framework for using the workspace medial axis in PRM planners," in: Proceedings 2000 ICRA. Millennium Conference. IEEE International Conference on Robotics and Automation. Symposia Proceedings (Cat. No. 00CH37065), IEEE, pp. 1408-1413 (2000).
Huang, J. and C.-H. Menq, "Automatic data segmentation for geometric feature extraction from unorganized 3-D coordinate points," IEEE Transactions on Robotics and Automation, vol. 17, No. 3, pp. 268-279 (2001).
Hueser, M., et al., "Learning of demonstrated grasping skills by stereoscopic tracking of human head configuration," in Robotics and Automation, ICRA 2006. Proceedings 2006 IEEE International Conference on, IEEE, 2795-2800 (2006).
Kyota, F., et al., "Detection and evaluation of grasping positions for autonomous agents," In International Conference on Cyberworlds, 9 pages (2005).
Lemieux, P.-O., et al., "Degrees of freedom coupling adapted to the upper limb of a digital human model," International Journal of Human Factors Modelling and Simulation, 5(4): 314-337 (2017).
Li, X., et al., "Point cloud surface segmentation based on volumetric eigenfunctions of the Laplace-Beltrami operator," Computer Aided Geometric Design, 71: 157-175 (2019).
Li, Y. and N. Pollard, "A Shape Matching Algorithm for Synthesizing Humanlike Enveloping Grasps," in IEEE/RAS Int. Conf. on Humanoid Robots (Humanoids), pp. 442-449 (2005).
Ma, C.-M., et al., "Three-dimensional topology preserving reduction on the 4-subfields," IEEE Transactions on Pattern Analysis and Machine Intelligence, 24: 1594-1605 (2002).
Miller, A.T., et al., "Automatic grasp planning using shape primitives," in Robotics and Automation, Proceedings. ICRA'03. IEEE International Conference on, IEEE, 1824-1829 (2003).
Minetto, R., et al., "An optimal algorithm for 3D triangle mesh slicing," Computer-Aided Design, 92: 1-10 (2017).
Myers, A., et al., "Affordance Detection of Tool Parts from Geometric Features," In International Conference on Robotics and Automation, pp. 1374-1381 (2015).
Myers, A., et al., "Affordance of Object Parts from Geometric Features," In International Conference on Robotics and Automation, pp. 1374-1381 (2015).
Nguyen, V.-D., "Constructing force-closure grasps," Int. Jour. Robotic Res, 7(3): 3-16 (1988).
Nguyen, V.-D., "Constructing stable grasps in 3D," in Robotics and Automation Proceedings. 1987 IEEE International Conference on, IEEE, 234-239 (1987).
Parkinson, M.B. and Reed, M.P., "Creating virtual user populations by analysis of anthropometric data," International Journal of Industrial Ergonomics, 40(1): 106-111 (2010).
Pitarch, E.P., et al., "SANTOS™ hand: a 25 degree-of-freedom model," SAE Technical Paper (2005).

(56) References Cited

OTHER PUBLICATIONS

Prabhakar, S. and M.R. Henderson, "Automatic form-feature recognition using neural-network-based techniques on boundary representations of solid models," Computer-Aided Design, 24: 381-393 (1992).
Reed, M.P., et al., "Methods for measuring and representing automobile occupant posture," SAE Technical Paper (1999).
Reed, M.P., et al., "Developing and implementing parametric human body shape models in ergonomics software," in Proceedings of the 3rd International Digital Human Modeling Conference. Tokyo, Japan (2014).
Roa, et al., "Grasp quality measures: review and performance," Autonomous robots, 38(1): 65-88 (2014).
Rouhi, R., et al., "A review on feature extraction techniques in face recognition," Signal & Image Processing, vol. 3, No. 6 (2012).
Sahbani, A., et al., "An overview of 3D object grasp synthesis algorithms," Robotics and Autonomous Systems, 36 pages (2012).
Schmidt, P., et al., "Grasping of unknown objects using deep convolutional neural networks based on depth images," in: 2018 IEEE International Conference on Robotics and Automation (ICRA), IEEE, pp. 6831-6838 (2018).
Svensson, S., et al., "Curve skeletonization of surface-like objects in 3D images guided by voxel classification," Pattern Recognition Letters, 23: 1419-1426 (2002).
Tay, S.C., et al., "In-vivo kinematic analysis of forearm rotation using helical axis analysis," Clinical Biomechanics, 25(7): 655-659 (2010).
Vahrenkamp, N., et al., "Planning high-quality grasps using mean curvature object skeletons," IEEE Robotics and Automation Letters, 3: 911-918 (2017).
Wu, G., et al., "ISB recommendation on definitions of joint coordinate system of various joints for the reporting of human joint motion—Part I: ankle, hip, and spine," Journal of biomechanics, 35(4): 543-548 (2002).
Wu, G., et al., "ISB recommendation on definitions of joint coordinate systems of various joints for the reporting of human joint motion—Part II: shoulder, elbow, wrist and hand," Journal of biomechanics, 38(5): 981-992 (2005).
Yamane, K., et al., "Synthesizing animations of human manipulation tasks," ACM Transactions on Graphics, 23(3) (2004).
Zhang, Z., et al., "FeatureNet: Machining feature recognition based on 3D Convolution Neural Network," Computer-Aided Design, 101: 12-22 (2018).
Zhou, W. and M.P. Reed, "Validation of the human motion simulation framework: posture prediction for standing object transfer tasks," SAE Technical Paper (2009).
Gibson, James, J., "The Theory of Affordances," *The Ecological Approach to Visual Perception* (1979).
Badler, Norman I., et al., "Animation control for real-time virtual humans." Communications of the ACM 42.8 (1999): 64-73.
Bekey, George A., et al. "Knowledge-based control of grasping in robot hands using heuristics from human motor skills." IEEE Transactions on Robotics and Automation 9.6 (1993): 709-722.
Blanchonette, P., "Jack Human Modelling Tool: A Review", Australian Government Deparment of Defense, Defense Science and Technology Organisation Technical Report, DSTO-TR-2364, AR-014-672, Jan. 2010, Victoria, Australia.
Bourret, Q., et al. "Flexible hand posture for tools grasping." DHM (2019).
Bourret, Q., et al., "Grasp Planning of Unknown Object for Digital Human Model", 13th International Conference on Applied Human Factors and Ergonomics.
Duffy, V.G., "Handbook of Digital Human Modeling: Research for Applied Ergonomics and Human Factors Engineering (1st ed.)". Chapter 2.4 (2008).

Ergonomics Specialist—Dassault Systèmes, "Human-Centered Prodcut and Workplace Design with Virtual Ergonomics", https://www.3ds.com/products-services/delmia/disciplines/industrial-engineering/tag/88-1007/. Downloaded from Internet Jan. 11, 2023.
European Committee for Standardization, EN 1005-2. Safety of machinery—Human physical performance. Part 2: Manual handling of machinery and component parts of machinery. Brussels, European Committee for Standardization (2003).
European Committee for Standardization, EN 1005-3:2002+ A1:2008, "Safety of machinery—Human physical performance—Part 3: Recommended force limits for machinery operation", Oct. 2008.
European Committee for Standardization, EN 1005-4:2002+ A1:2008, "Safety of machinery—Human physical performance—Part 4: Evaluation of working postures and movements in relation to machinery", Oct. 2008.
Feix, T., et al., "Analysis of human grasping behavior: Object characteristics and grasp type." IEEE transactions on haptics 7.3 (2014): 311-323.
Gallagher, S. and M.C. Schall Jr, "Musculoskeletal disorders as a fatigue failure process: evidence, implications and research needs," Ergonomics, 60(2): 255-269 (2016).
Hignett et al., Practical Ergonomics, REBA Employee Assessment Worksheet, 1 page, based on Technical note: Rapid Entire Body Assessment (REBA), Hignett, McAtamne, Applied Egonomics, 31(2): 201-205 (2000).
Hignett, S., & McAtamney, L., "Rapid entire body assessment (REBA)", Applied Ergonomics, 31(2), 201-205 (2000).
Human Factors Engineering, "The next generation of human modeling and simulation begins when you're ready," Virtual Soldier Research, 8 pages (2004).
International Labour Office in collaboration with the International Ergonomics Association, Ergonomic Checkpoints: Practical and Easy-to-Implement Solutions for Improving Safety, Health, and Working Conditions, Second Edition, 2010, Geneva, Switzerland.
International Organization for Standardization, ISO 11226:2000, "Ergonomics—Evaluation of static working postures" Technical Corrigendum 1, 2000, Geneva, Switzerland.
International Organization for Standardization, ISO 11228-3:2007, "Ergonomics—Manual handling—part 3: Handling of low loads at high frequency", 2007, Geneva, Switzerland.
International Organization for Standardization, ISO 14738:2002, "Safety of machinery—Anthropometric requirements for the design of workstations at machinery", p. 12, Sep. 2002, Geneva, Switzerland.
Macloud, A., et al. "Extracting grasping cues from pistol-shaped tools for digital human models." Computer-Aided Design and Applications 18.6 (2021): 1167-1185.
McAtamney, L., et al., "RULA: a survey method for the investigation of work-related upper limb disorders", Applied Ergonomics, pp. 91-99, vol. 24, No. 2, Apr. 1993.
Mital, A .: Guide to Manual Materials Handling. CRC Press, Boca Raton (1997).
Salvendy, G., Handbook of Human Factors and Ergonomics, Fourth Edition, 2012, John Wiley & Sons, Inc., Hoboken, New Jersey.
SantosHuman, Inc., "PredictiveHuman Model", https://www.santoshumaninc.com; (8 pages) downloaded from Internet Jan. 11, 2023.
Stephens, A., and M. L. H. Jones. "Workplace methods and use of digital human models." Handbook of Digital Human Modeling, USA: Taylor and Francis 6 (2009): 1-6.
Waters, Thomas R., et al., "Revised NIOSH equation for the design and evaluation of manual lifting tasks", Ergonomics, pp. 749-776, vol. 26, No. 7, 1993.
Zhou, Wei, et al. "Simulating complex automotive assembly tasks using the HUMOSIM framework", No. 2009-01-2279. SAE Technical Paper, 2009.

\* cited by examiner

EXTRACTING GRASPING CUES FROM TOOL GEOMETRY FOR DIGITAL HUMAN MODELS

RELATED APPLICATIONS

This application claims the benefit of U.S. Provisional Application No. 62/842,337, filed on May 2, 2019, U.S. Provisional Application No. 62/842,371 filed on May 2, 2019, and U.S. Provisional Application No. 62/842,350 filed on May 2, 2019. This application is related to the non-provisional U.S. application "Systems And Methods For Determining Digital Model Positioning For Grasping" by Pierre-Olivier Lemieux, Quentin Bourret, Rachid Aissaoui, and Nicola Hagemeister.

The entire teachings of the above applications are incorporated herein by reference.

BACKGROUND

A number of existing product and simulation systems are offered on the market for the design and simulation of objects, e.g., humans, parts, and assemblies of parts, amongst other examples. Such systems typically employ computer aided design (CAD) and/or computer aided engineering (CAE) programs. These systems allow a user to construct, manipulate, and simulate complex three-dimensional models of objects or assemblies of objects. These CAD and CAE systems, thus, provide a representation of modeled objects using edges, lines, faces, and closed volumes. Lines, edges, faces, closed volumes or polygons may be represented in various manners, e.g. non-uniform rational basis-splines (NURBS).

CAD systems manage parts or assemblies of parts of modeled objects, which are mainly specifications of geometry. In particular, CAD files contain specifications, from which geometry is generated. From geometry, a representation is generated. Specifications, geometries, and representations may be stored in a single CAD file or multiple CAD files. CAD systems include graphic tools for representing the modeled objects to designers; these tools are dedicated to the display of complex objects. For example, an assembly may contain thousands of parts. A CAD system can be used to manage models of objects, which are stored in electronic files.

CAD and CAE systems use a variety of CAD and CAE models to represent objects. These models may be programmed in such a way that the model has the properties (e.g., physical, material, or other physics based) of the underlying real-world object or objects that the model represents. A CAD/CAE model may be used to perform simulations of the real-world object it represents.

SUMMARY

Simulating a human utilizing a tool is a common simulation task implemented and performed by CAD and CAE systems. Performing these simulations requires setting grasping parameters, e.g., the locations where the human model grasps the tool model. For instance, instantiating a digital human model (DHM) in a scene to simulate a manufacturing task typically requires specifying how to grasp the necessary tools.

However, grasping is a complex topic for digital human modeling and simulation. An embodiment provides a new method to extract grasping cues for manufacturing tools such as mallets, screwdrivers, pliers, and straight drills. Embodiments identify geometric cues to automatically define a plausible grasp for these tools. Embodiments use the tool geometry, e.g., a three-dimensional (3D) geometric model, as an input. The tool mesh is segmented into zones, segments, and regions, successively. The method next classifies the tool's regions as a head, a handle, or a trigger (if any), reflecting the tool's affordance. The grasping cues are then extracted from the regions so as to be used for generating a task-oriented grasp.

An embodiment automatically extracts grasping cues from tool 3D models. These cues are used as an input to determine a plausible task-oriented grasp for a DHM. An embodiment focuses on extracting grasping cues from pistol-shaped tools, such as pistol drills and pistol screwdrivers. These tools have multiple working or operating directions as opposed to hammers or screwdrivers. One such embodiment uses the tool 3D geometry as input. The geometry of the tool is analyzed iteratively to extract the main directions from the geometry. The main directions are the handle axis and the working (or body) axis. Once these main directions are obtained, the tool's geometry is scanned along an optimal direction to precisely identify the push trigger region. Such an embodiment labels the tool's regions as head, handle, and pistol trigger, thus reflecting the tool's affordance. The grasping cues are extracted from these regions so as to be used for generating a task-oriented grasp.

Further, it is noted that while embodiments are described herein as in a virtual domain, determining grasping cues for a human model based upon the geometry of a tool, embodiments are not so limited. Specifically, embodiments may be employed to determine grasping cues for any object, on any object to be grasped, based upon the physical features of the object being grasped. As such, embodiments may be used to determine grasping on an object by any other object, e.g., human, animal, and robot, amongst other examples.

An embodiment is directed to a computer-implemented method of determining grasping cues for a model of a tool. The method scans a CAD model representing a real-world tool to generate a series of sections from the CAD model. Then, properties of each section of the series of sections are extracted and one or more regions of the CAD model are identified based upon the extracted properties and a tool family to which the tool represented by the CAD model belongs. To continue, a respective classification for each of the one or more identified regions is determined. In turn, grasping cues for the CAD model are generated based upon the determined respective classification for each of the one or more regions.

In an embodiment, scanning the CAD model comprises scanning the CAD model in an optimal direction. An embodiment may further include determining the optimal scanning direction. In an embodiment, the optimal scanning direction is determined by processing an oriented bounding box surrounding the CAD model to determine a longest dimension of the oriented bounding box. The optimal scanning direction is identified as an axis along the determined longest dimension of the oriented bounding box. In another embodiment, determining the optimal scanning direction includes (i) determining an approximate handle axis for a handle of the tool represented by the CAD model, (ii) determining a working axis of the tool represented by the CAD model using the determined approximate handle axis, and (iii) determining the optimal scanning direction based on the determined working axis.

According to an embodiment, each section is formed of one or more closed curves, and each closed curve forms a face. In such an embodiment, extracting properties of each section comprises calculating properties for each face. Properties of each face in an example embodiment include at least one of: geometric center, area, and extremum points, amongst other examples.

Another embodiment associates the identified grasping cues with the CAD model in computer memory. In such an embodiment, the grasping cues, e.g., indications of grasping locations for the tool, are stored in computer memory as a property of the CAD model. Such an embodiment may also simulate the real-world use of the tool using the CAD model with the associated grasping cues.

Yet another embodiment is directed to a system that includes a processor and a memory with computer code instructions stored thereon. In such an embodiment, the processor and the memory, with the computer code instructions, are configured to cause the system to implement any embodiments described herein.

Another embodiment is directed to a cloud computing implementation for determining grasping cues for a CAD model of a tool or other tool model. Such an embodiment is directed to a computer program product executed by a server in communication across a network with one or more clients, where the computer program product comprises program instructions which, when executed by a processor, causes the processor to implement any embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
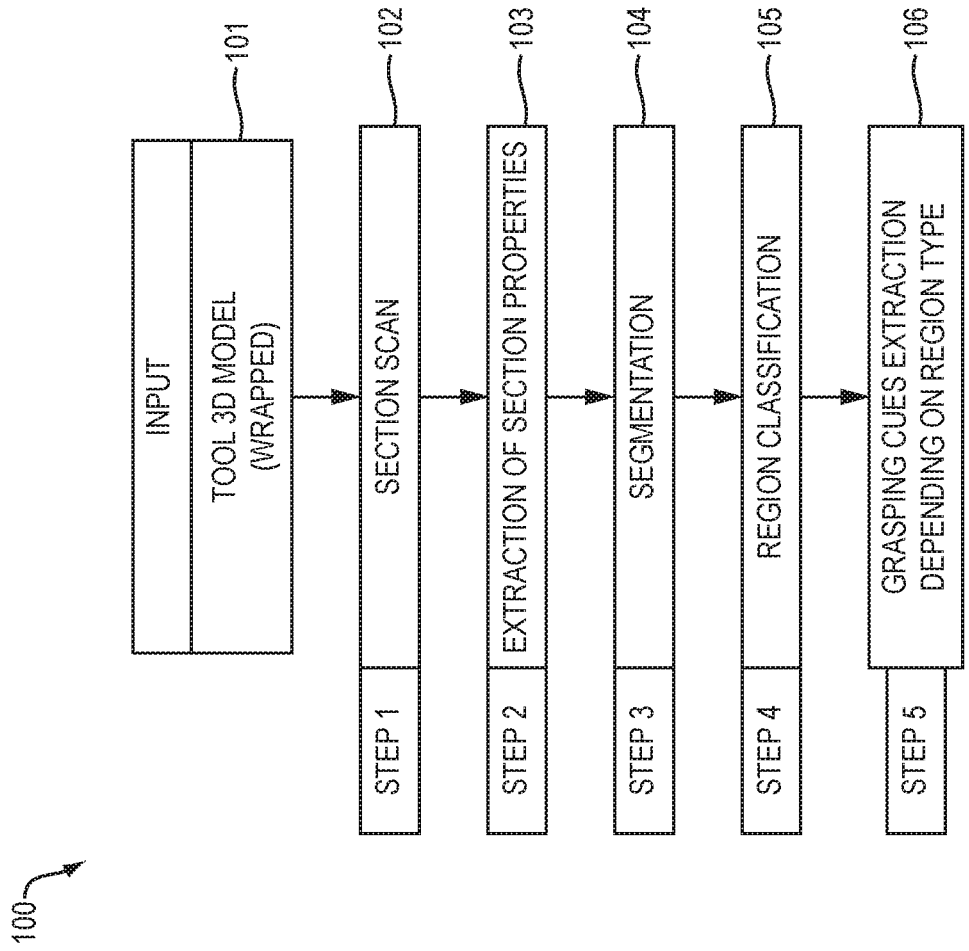
FIG. 1 is a flowchart of a method for determining grasping cues for a CAD model of a tool according to an embodiment.

A description of example embodiments follows.

Instantiating a digital human model (DHM) in a scene to simulate a manufacturing task typically encompasses specifying a variety of aspects, such as the mannequin anthropometry, the 3D work environment as well as the tools involved in the task. In addition, the mannequin should grasp the tools in a plausible manner for a given task. To this end, the specified grasp should take into account the tool's affordance as well as the task to be simulated. However, automatically specifying a plausible and task-oriented grasp is a major challenge for digital human modeling.

To instantiate a DHM in a scene with minimum user input, Applicant has developed a new virtual mannequin posture solver called the Smart Posturing Engine (SPE). The SPE is intended to simulate and validate task feasibility in an industrial environment, such as automotive assembly lines, by automatically positioning a virtual mannequin in a 3D scene. The grasping module of the SPE will automatically generate a plausible grasp for a given hand-held tool. Embodiments can employ the SPE to determine grasp for objects and simulate use of the object. Further, embodiments can be employed in any solvers and computer-implemented environments known in the art to determine grasping cues for objects and to perform simulations of real-world tasks.

Tools have inherent affordance that lends to human action. Indeed, it is assumed that every tool possesses affordance features (or regions), such as a handle and a trigger (if any), that suggest how to interact with that tool for a task. Embodiments analyze the tools' geometry to detect these affordance features, and generate grasping cues from the features to devise a plausible grasp.

Grasping is a major requirement for digital human modeling and, as such, other methods have been implemented to determine grasp, however, these existing methods are inadequate. Cutkosky & Howe [1] classified the available approaches for grasping as analytical or data-driven (bracketed numbers in this document refer to the enumerated list of references hereinbelow). Analytical approaches refer to the methods that construct grasps by computing kinematic and dynamic equations of the hand and finger positions. Unfortunately, analytical approaches suffer from computational complexity, which prevents the resolution of task-oriented grasps [2, 3].

On the other hand, data-driven, i.e., empirical, approaches bring up new strategies by observing either the object or human behavior [3]. According to Bohg & Kragic [4], data-driven grasp synthesis based on objective observation can be classified into three groups based on what is assumed to be known a priori about the query object. Hence, a "Known Object" is an object that has been encountered before and for which grasps have already been generated. A "Familiar Object" assumes that the query object is similar to a previously encountered object. An "Unknown Object" corresponds to a new shape never grasped before. Embodiments propose a method to extract grasping cues for a human mannequin by analyzing the geometry of familiar objects.

Existing functionality has focused on unknown objects. Miller et al. [5] simplified unknown objects as an assembly of geometric primitives so as to limit the number of possible grasps. Li and Pollard [6] study the situation as a shape-matching problem between the human hand and the object to grasp. Based on a database of human grasp from Yamane et al. [7], a suitable grasp is retrieved when queried with a new object. Shape features of the objects are matched against the shape of the inside of the available hand postures. However, many of the grasps generated by this method are inadequate for completing a task.

Kyota et al. [8] proposed an approach where grasp postures are generated using a neural network. Learning algorithms allow reliable grasp detection for unknown objects, but do not always select the one that best suits the task [9].

El-Khoury [9] exploits object affordance inspired by the way humans choose the grasping mode. Instead of searching grasping postures on the entire object, El-Khoury assumes that it is more appropriate to break down the query object into a set of functional regions. 3D objects are thus segmented into a set of elementary superquadrics. A network of neurons is then trained to identify the graspable parts of the object. Segmentation brings better results for the grasping of the unknown objects. Further publications in robotics tend to use segmentation during the vision process to simplify the grasping region detection [10, 11].

Data-driven approaches for object grasping for digital human models and robotics require the recognition of geometric features. During the past three decades, researchers have proposed different techniques to recognize geometric features, including segmentation-based approaches, neural network-based approaches, volume decomposition-based approaches and skeletonization [12].

Researchers have developed segmentation methods to extract geometric information, such as edges and smooth regions, from scanned data. For grasping purposes, El-Khoury et al. [13, 14] suggested that it is more appropriate to break down the query object into a set of functional regions than to analyze the object as a whole. The 3D mesh of an object is thus segmented into a set of elementary superquadrics and the most optimal region for grasping is then sought. Huang & Menq [15] proposed a systematic approach to automatically extract geometric surfaces from 3D point clouds by segmenting a mesh by detecting sharp and smooth borders. More recently, Li et al. [16] proposed a new powerful segmentation method based on volumetric eigenfunctions of the Laplace Beltrami operator. However, segmenting an object with a free form surface remains ambiguous when edges have small variations or when regions are homogeneous.

Artificial Neural Networks (ANNs) have been applied in the field of 3D feature recognition since the 1990s. Regarding grasping, Kyota et al. [8] proposed a method for point detection on geometric models. Then, the detected points are evaluated to determine whether they are in a graspable portion or not by testing several candidate positions learned using a data glove. Prabhakar & Henderson [17] used ANNs to recognize features from solid models. Schmidt et al. [18] presented a data-driven approach exploiting Deep Convolutional Neural Network algorithms to resolve hand grasping posture for unknown objects. Zhang et al. [19] more recently presented a novel framework of deep 3D convolutional neural networks (3D-CNNs) termed FeaturedNet to learn machining features from CAD models of mechanical parts. Overall, the use of neural networks requires a vast 3D geometry database, which limits the exploitation of machine learning for grasping.

Another approach used in geometric feature extraction is mesh skeletonization. Skeletons (see [20] for a thorough survey) can be defined as centered curvilinear structures that approximate topology and geometry of 3D volumes. Skeletonization is a process that is mainly applied on polygonal meshes and volumetric models to retrieve mesh skeletons [21], [22], [23]. There is a vast amount of literature of curve skeletons starting with the well-known medial axis [24]. Diaz et al. [25] presented a feature extraction process to obtain grasping points oriented mainly to disassembly cooperative tasks from medial axis transform skeletonization. On the other hand, Vahrenkamp et al. [26] proposed a grasp planner technique which integrates curve skeletonization and segmentation to generate robust grasps on the query object shape. Their results show that the skeleton-based grasp planner is capable of autonomously generating high-quality grasps, but does not provide a good skeleton for sharp edge geometries. Overall, skeletonization is a time consuming process that is unreliable due to opposition between eliminating noise without overlooking small geometric details.

Globally, data-driven solutions for object grasping may combine segmentation, machine learning and skeletonization in order to provide better results for grasping unknown geometries [27], [14]. However, few methods are proposed in the literature to help a human mannequin automatically determine how to grasp tools in a manufacturing environment. Embodiments use a data-driven method combining segmentation and skeletonization notions so as to extract grasping cues from tools such as mallets, screwdrivers, pliers, straight drills, and pistol-shaped tools. Embodiments propose a new data-driven method to provide a DHM with grasping cues based on the object geometry analysis and segmentation. Applicant is developing a new virtual mannequin posture solver referred to herein as the Smart Posturing Engine (SPE). The SPE is used to simulate and validate task feasibility in an industrial environment, such as an automotive assembly line. The grasping portion of the SPE can utilize embodiments described herein to automatically generate a plausible grasp for a given object. Further, embodiments can be used or implemented in any known simulation or modeling method or system to determine grasp.

Embodiments focus on grasping tools. Tools have inherent affordance, i.e., properties or features that indicate what can be done with the object, that lends to human action. Indeed, embodiments assume that every tool possesses affordance features (or regions), such as a handle and a trigger (if any), that suggest how to interact with that object for an expected task. An embodiment recognizes these regions for one-handed tools, such as mallets, screwdrivers, pliers and straight drills, as well as pistol-shaped tools. It is thus assumed that the family to which the tool belongs is known before launching the analysis. Grasping cues are extracted from the identified regions, including the head of the tool that provides a (task-related) working direction. These grasping cues are finally fed to the SPE, or other such solver, so as to generate plausible grasps.

Grasping Cue Generation Method Embodiment

FIG. 1 is a flowchart of a method 100 for determining grasping cues according to an embodiment. The method 100 starts with the input 101 of tool 3D geometry. The model received at step 101 may be any such CAD or CAE model known in the art. In an embodiment, the grasp is conditioned by the outer skin (external shape) of the tool and the model at step 101 is first wrapped to eliminate internal details and leave a single outer envelope. An embodiment employs the wrapping in DASSAULT SYSTEMES® CATIAV5 which generates a lower definition model based on the surface approximation of the outer skin of the object. Hence, there is no specific requirement for the tool's initial 3D geometry format since it can be wrapped. For example, the model received at step 101 can be an exact CAD model or a tessellated model. Once the wrapped model is obtained 101, grasping cues are extracted by implementing steps 102-106 of the method 100.

The method 100 scans 102 the model representing a real-world tool (received at 101) to generate a series of sections from the CAD model. Then, properties of each section of the series of sections are extracted 103, and one or more regions of the CAD model are identified (referred to as segmentation) 104 based upon the extracted properties and a tool family to which the tool represented by the CAD model belongs. In an embodiment, accounting for the tool family considers expected geometrical properties, e.g., width and height, for regions of a tool. To continue, a respective classification for each of the one or more identified regions is determined 105. In turn, grasping cues for the CAD model are generated 106 based upon the determined respective classification for each of the one or more regions. In this way, the grasping cues are generated based on properties of key faces of regions.

Further details of the functionality implemented at steps 102-106 is described hereinbelow. For instance, in embodiments, the section scan 102 may be performed using the method 220 described hereinbelow in relation to FIG. 2. Moreover, properties may be extracted 103 using the method 330 described hereinbelow in relation to FIG. 3. Further, regions may be identified 104 using the functionality described hereinbelow in relation to FIGS. 4-6. Further still, regions may be classified 105 using the functionality described below in relation to "Region Classification" and using the sequences of region classification illustrated in FIG. 7 and described below. Moreover, grasping cues may be generated 106 using the functionality described below in relation to "Grasping Cue Generation."

In an embodiment, scanning 102 the CAD model comprises scanning the CAD model in an optimal direction. An embodiment of the method 100 may further include determining the optimal scanning direction. In one such embodiment, determining the optimal scanning direction includes processing an oriented bounding box surrounding the CAD model to determine a longest dimension of the oriented bounding box and determining the optimal scanning direction as an axis along the determined longest dimension of the oriented bounding box. In another embodiment of the method 100, determining the optimal scanning direction includes (i) determining an approximate handle axis for a handle of the tool represented by the CAD model, (ii) determining a working axis of the tool represented by the CAD model using the determined approximate handle axis, and (iii) determining the optimal scanning direction based on the determined working axis.

According to an embodiment, each section determined at step 102 is formed of one or more closed curves, and each closed curve forms a face. In such an embodiment, extracting properties 103 of each section comprises calculating properties for each face. Properties of each face in an example embodiment include at least one of: geometric center, area, and extremum points.

Another embodiment of the method 100 associates the grasping cues identified at step 106 with the CAD model in computer memory. Such an embodiment may also simulate the real-world use of the tool using the CAD model with the associated grasping cues. Such a simulation can be used to improve the real-world use of the tool. For instance, the grip for the tool, the positioning of a person, or how a manufacturing task using the tool may be modified based upon results of the simulation.

Section Scan

A major challenge solved by embodiments is identifying affordance features from a geometric 3D model. To provide this functionality, embodiments identify the affordance features, i.e., features that indicate grasp, from spatial information. An example embodiment generates a series of sections on the 3D model to recover section properties capable of generating a simplified and harvestable model. Hence, in such an embodiment, the first step is the section scan step, e.g. the step 102 of the method 100 or step 1921 of the method 1990 detailed later.

Figure 2:
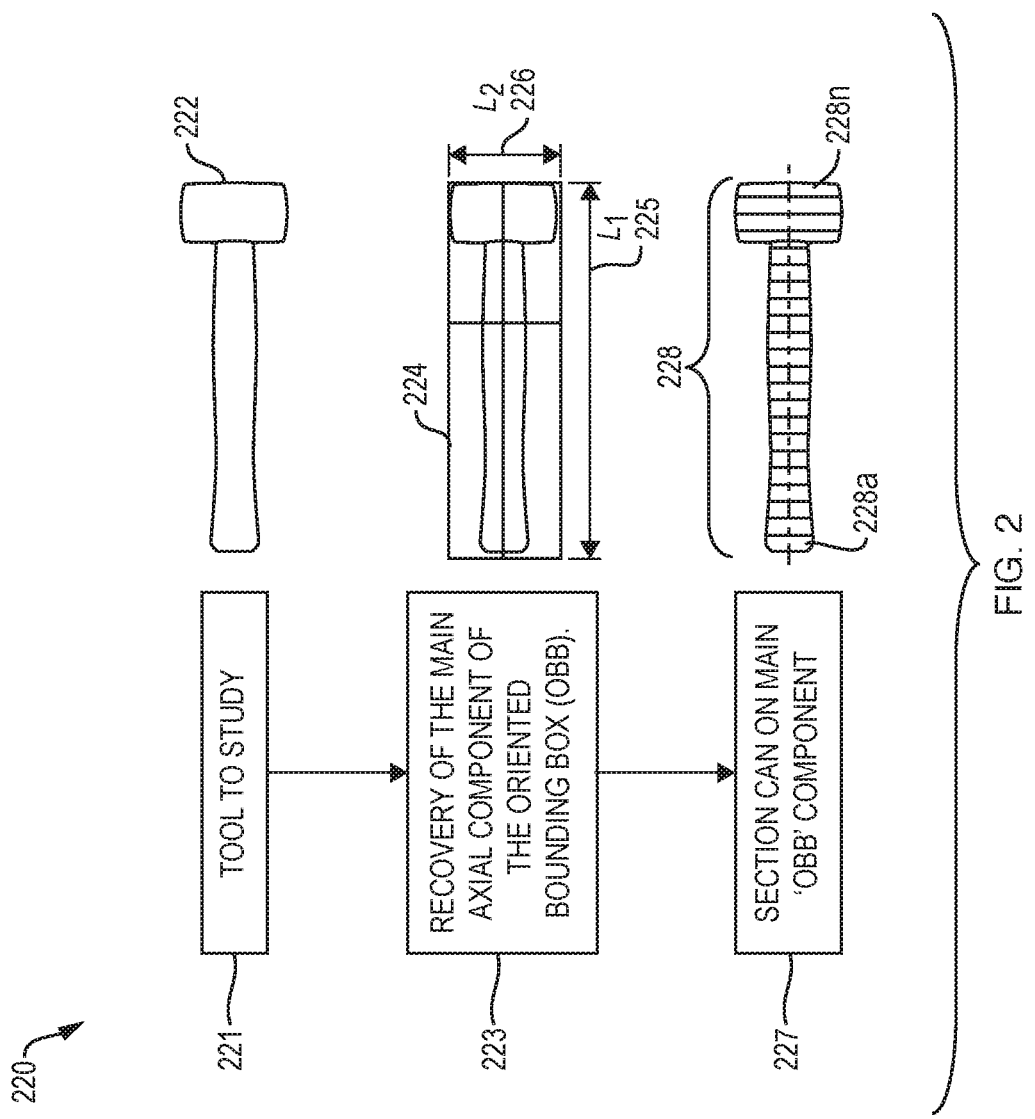
FIG. 2 illustrates a method for determining sections of a tool to determine grasping locations for the tool according to an embodiment.

FIG. 2 illustrates an example method 220 of scanning sections of a tool model according to an embodiment. The method 220 begins at step 221 by obtaining a model of a tool. FIG. 2 illustrates the example tool model 222. In turn, at step 223, the main axial component 225 of an oriented bounding box 224 surrounding the tool is determined. In such an embodiment, the objects to be analyzed are assumed to be familiar one-handed tools which have a main axial component oriented along the longest dimension, e.g., the dimension 225, of the object's oriented bounding box 224. The oriented bounding box's 224 principal inertia axis yields the tool's main direction (height $L_1$ 225 in FIG. 2), while it is assumed that height $L_1$ 225 is significantly longer than width $L_2$ 226, and width $L_2$ 226 is longer than $L_3$ which is the depth (not shown).

After the main component of the bounding box is determined at step 223, the method continues to step 227 where the tool model 222 is scanned along the main direction 225 of the oriented bounding box 224 to generate the sections 228 which include, for example, the sections 228a and 228n. The tool's 222 main direction 225 determines the scanning direction along which sections are obtained at step 227. Once obtained, the N sections 228 are individually processed to extract geometric properties which are used to create a simplified and harvestable model of the tool 222.

Extraction of Section Properties

Figure 3:
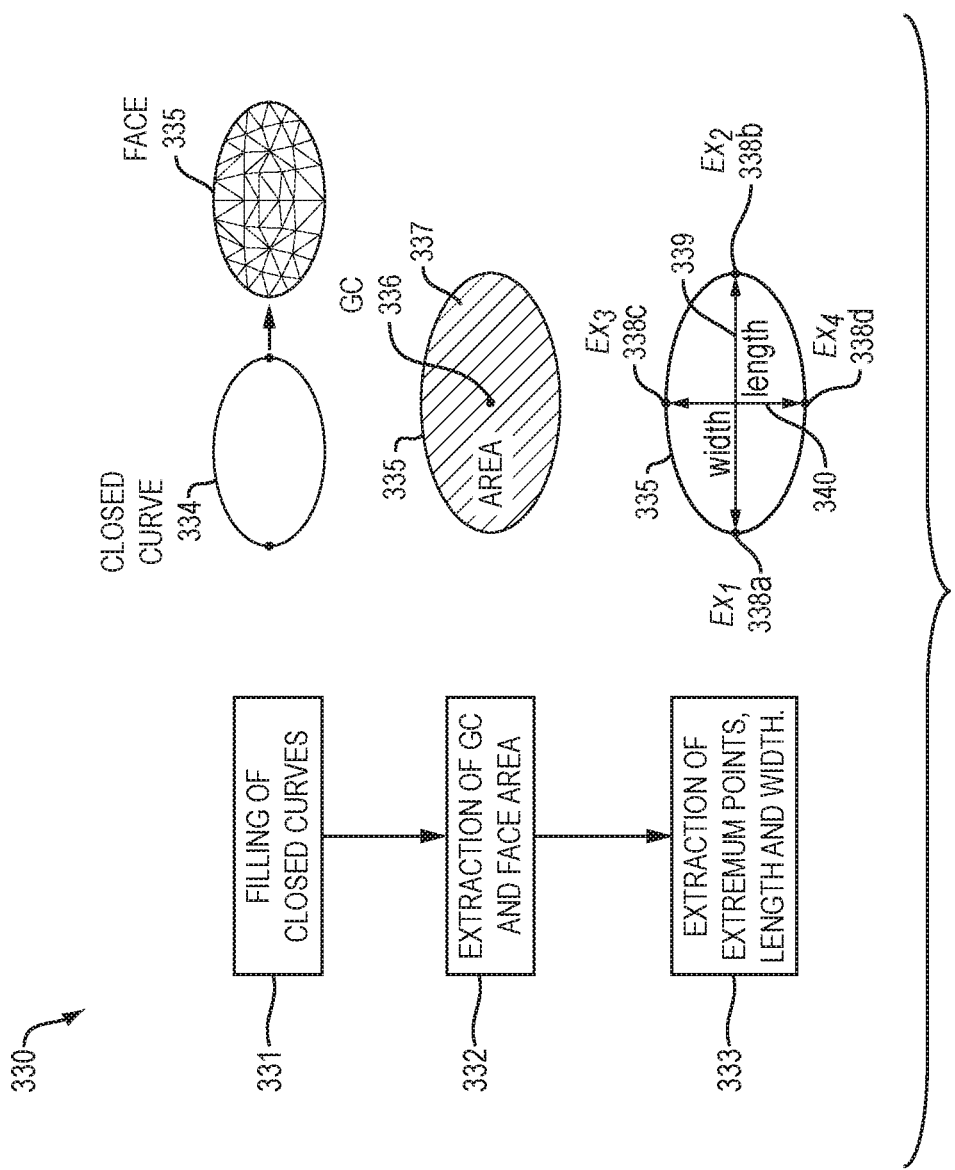
FIG. 3 depicts a method embodiment for extracting properties of sections of a tool.
Figure 19:
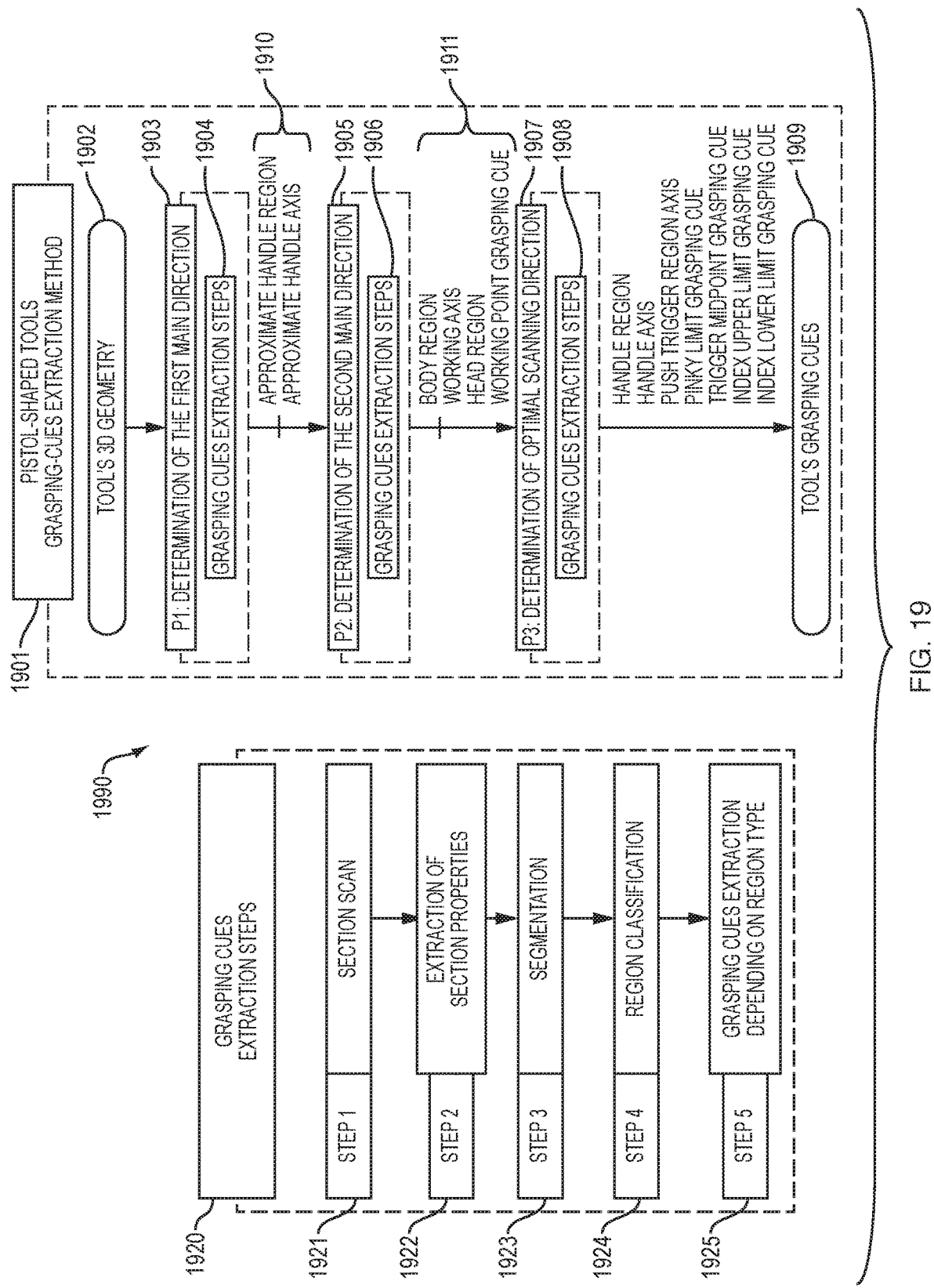
FIG. 19 is a flowchart of a method embodiment for determining grasping cues for a CAD model of a tool.

After generating the sections, e.g., step 102 of FIG. 1 or step 1921 of FIG. 19, an example embodiment continues by extracting the properties of each section, e.g., step 103 of FIG. 1 or step 1922 of FIG. 19. FIG. 3 illustrates an example method 330 for extracting section properties according to an embodiment. In such an embodiment, each section includes "n" closed curves, e.g., the closed curve 334. As such, the method 330 begins by filling 331 each closed curve 334 to form a face 335. At step 332, the geometric center 336 and area 337 of the face 335 are computed. In such an embodiment, the geometric center (GC) 336 corresponds to the centroid of the face 335.

To characterize the outer skin of the tool, other properties are also extracted for each face. Specifically, in the method 330, at step 333, the extremum points 338a-d, length 339, and width 340 of the face 335 are determined. The extreme points ($Ex_1$, $Ex_2$) 338a and 338b are along the direction of the second longest dimension of a bounding box surrounding the tool, e.g., $L_2$ 226 in FIG. 2) and in line with the face's 335 geometric center 336. The face length 339 is computed from the distance between $Ex_1$ 338a and $Ex_2$ 338b. The other identified extreme points 338c-d ($Ex_3$, $Ex_4$) are along the direction perpendicular to the face length 339. The face width 340 is computed from the distance between $Ex_3$ 338c and $Ex_4$ 338d.

Segmentation to Identify Regions

Figure 4:
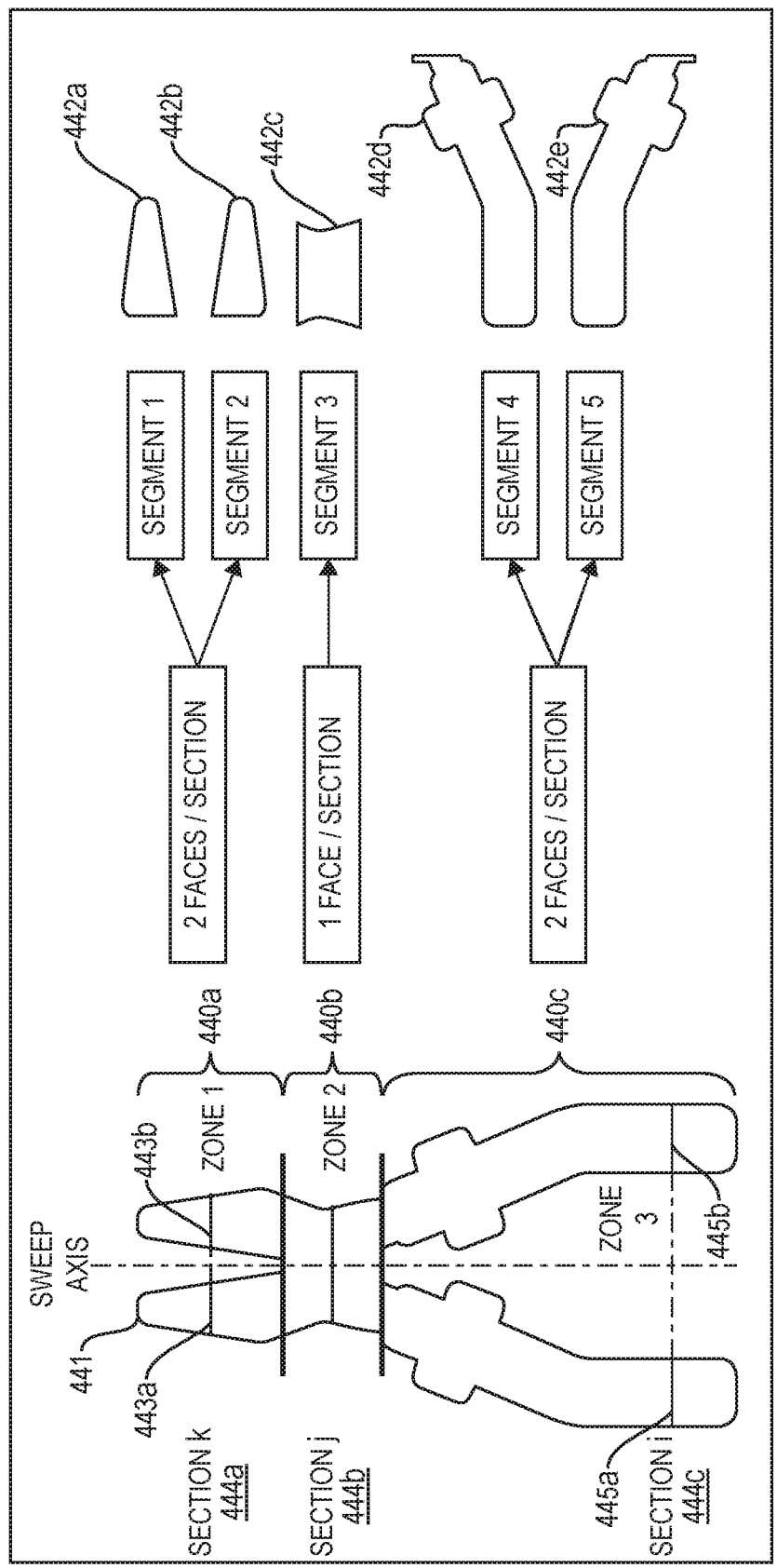
FIG. 4 portrays zones and segments of a tool that are identified according to an embodiment.
Figure 5:
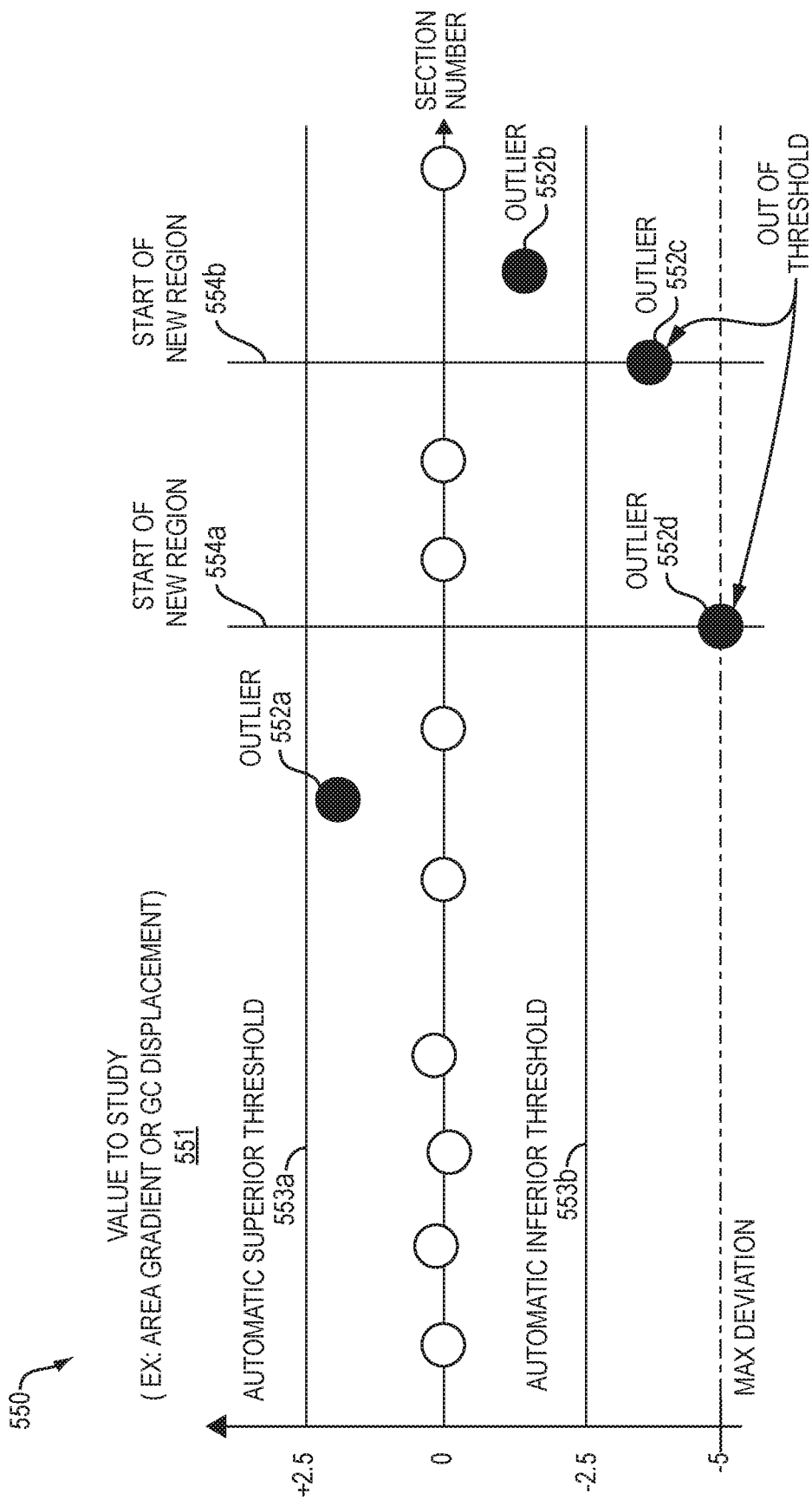
FIG. 5 is a plot of tool properties that is used to identify tool transitions in an example embodiment.

Segmentation identifies regions within a tool's geometry so as to ultimately, identify the grasping region. The segmentation may be performed at step 104 of FIG. 1 or step 1923 of FIG. 19 to identify regions of a tool. In an embodiment, the segmentation is performed in steps so as to identify successively a tool's zones, segments, and regions. Each step is based on the concept of grouping sections or faces that share common properties, so that a significant change in a sections' properties can be used to identify a transition. The first segmentation step detects a tool's zones 440a-c. A zone is defined as a successive set of sections 444a-c that have the same number of faces. Hence, zone detection depends on the tool's topology. FIG. 4 illustrates three such distinct zones 440a-c for the case of typical pliers 441. The second step is to detect the tool's 441 segments 442a-e. A segment is defined as a subset of a zone 440a-c that groups successive faces based on the proximity of the geometric centers of the faces. Hence, the zones 440a and 440c with two faces per section, e.g., the faces 443a and 443b of the section 444a and the faces 445a and 445b of the section 444c yield two segments 442a-b and 442d-e, respectively.

Once the segments are formed, the third step of segmentation, i.e., region determination, detects a tool's regions. A region is defined as a subset of a segment that groups successive faces that share similar area and geometric center properties. In an embodiment, the series of faces from a given segment are analyzed according to two criteria: (i) a gradient (GradArea) and (ii) the displacement in space δ.

Tracing the evolution of the face areas, a gradient (GradArea) makes it possible to detect sudden changes in area value.

$$Grad_{Area} = \frac{Area_{Face\ i} - Area_{Face\ i-1}}{Area_{Face\ i-1}}$$

The displacement in space (δ) of the geometric centers of the faces allows the changes in geometric center values to be detected.

$$\delta_x = GC_{x\ face\ i} - GC_{x\ face\ i-1}$$

$$\delta_y = GC_{y\ face\ i} - GC_{y\ face\ i-1}$$

$$\delta_z = GC_{z\ face\ i} - GC_{z\ face\ i-1}$$

In an embodiment, these two criteria (area gradient and geometric center displacement) are used for all pairs of successive faces of a segment, starting from its second face. The result of these tests reveals regions based on their common geometric characteristics. However, not every data variation should be considered as a new functional region. Region segmentation sensitivity is depicted visually in FIG. 5 by the plot 550. The plot 550 identifies outliers 552a-d in the value of the variable 551 of interest, e.g., area gradient or geometric center displacement. In an embodiment, when an outlier is outside of a threshold 553a or 553b, the outlier indicates a new region. For instance, in the plot 550, the outliers 552c and 552d indicate the start of a new region 554a and 554b.

An embodiment, uses the "IsOutLier" function from Matlab® Software, (MathWorks Inc) to identify values that are more than three scaled median absolute deviations away from the median and labels these values as outliers. Outliers are then classified as meaningful if they exceed the threshold automatically set at half the maximum deviation. As described, these meaningful outliers indicate a transition between regions.

Figure 6:
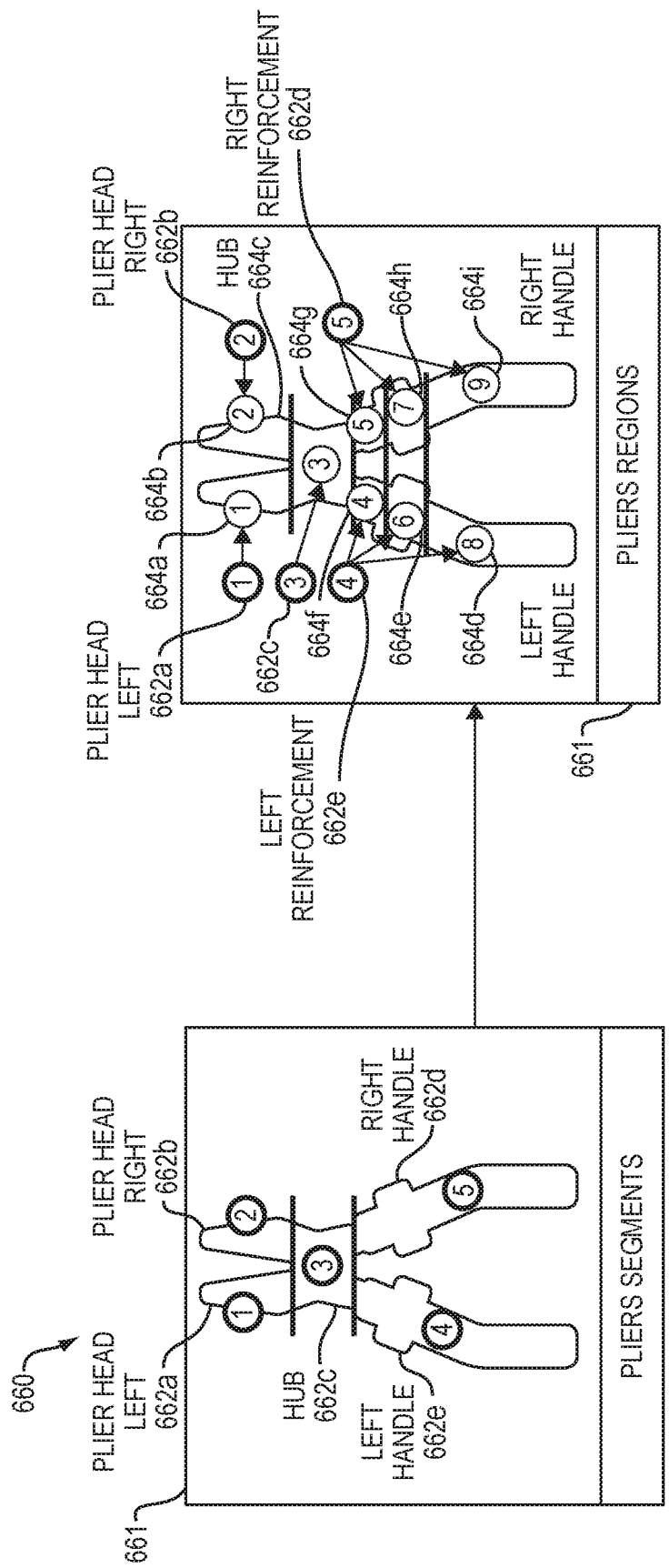
FIG. 6 is a diagram of a tool and segments and regions of the tool that are identified in an example embodiment.

Another embodiment for identifying regions refines the results based on tool sections properties. FIG. 6 visually illustrates region identification in an embodiment 660. In such an embodiment, first, segments 662a-e are identified 661. In turn, the regions 664a-i are identified 663 for segments 662a-e.

Region Classification

The segmentation step described above distinguished regions that, in an embodiment, are classified as either the handle region, the trigger region, or the head region. The region classification may be performed at step 105 of FIG. 1 or step 1924 of FIG. 19. In the case of one-handed tools, the tool is assumed to include a handle and a head, two regions at opposite ends of the tool. The handle allows the positioning of the hand along a grasping axis. A tool head provides a working application point that leads to a task-oriented grasp. The region classification step is performed by comparing region properties with expected values for the family of tools. The expected values for the family of tools may be pre-determined from measurements of tools and this data may be stored in a database.

To perform region classification, each region is first characterized with its properties obtained by averaging the properties of the faces belonging to the region. Properties considered in embodiments include: (i) average region area (computed from the region's faces), (ii) average region width (computed from the region's faces), (iii) average geometric center (computed from the region's faces), and (iv) height of the region (computed by the sum of the distances between the geometric center of the faces).

Next, the regions' properties are compared with the expected values for that family of tools. For example, a mallet handle is expected to have an average region area of about 700 mm²±200 mm². One challenge here is that different regions can share similar values, which may make the classification difficult. However, this can be overcome by looking for the most typical region first. For example, for the straight drill family of tools, the most typical region is the trigger; therefore, for the straight drill family, the trigger region is identified first. Hence, a predefined classification sequence may be set and used for each tool family. An example classification sequence for tools is shown in Table 1.

TABLE 1

Search Sequence For Tool Regions

| Tool Family | First Region | Second Region | Third Region |
| --- | --- | --- | --- |
| Mallet | Head | Handle | N/A |
| Screwdriver | Handle | Head | N/A |
| Plier | Handle | Head | N/A |
| Straight Drill | Trigger | Handle | Head |
| Pistol Style Tool | Head | Handle | Trigger |

Embodiments may rely on assumptions when performing region classification. For instance, it can be assumed that the mallet head would have the biggest average area and the screwdriver handle would have the biggest average area. Further, an embodiment can assume the plier handles would have the largest height and the straight drill trigger would have the smallest average area.

These most typical regions are thus identified first depending on the tool family. Based on this major criterion, the best candidate region is further tested based on complementary properties. Hence, all three region properties (average region area, average region width, height of the region) must fall within the value range of a region type. The values are given in Table 3 and explained in the next section. If the region being tested does not satisfy all three properties, another region is tested until one is identified.

Once the most typical region is identified, it becomes a reference for searching for other regions according to their relative position from this first reference region, based on the average geometric centers of regions. This may be a search for proximity, or for opposition depending on what is being sought. In such an embodiment, the search for proximity looks for the region that is the closest to the reference region, based on the distance between the geometric center of the reference region to all the other regions. The search for opposition goes the other way. As such, in such an embodiment, the search for opposition looks for the region that is the farthest from the reference region, based on the distance between the geometric center of the reference region to all the other regions.

Figure 7:
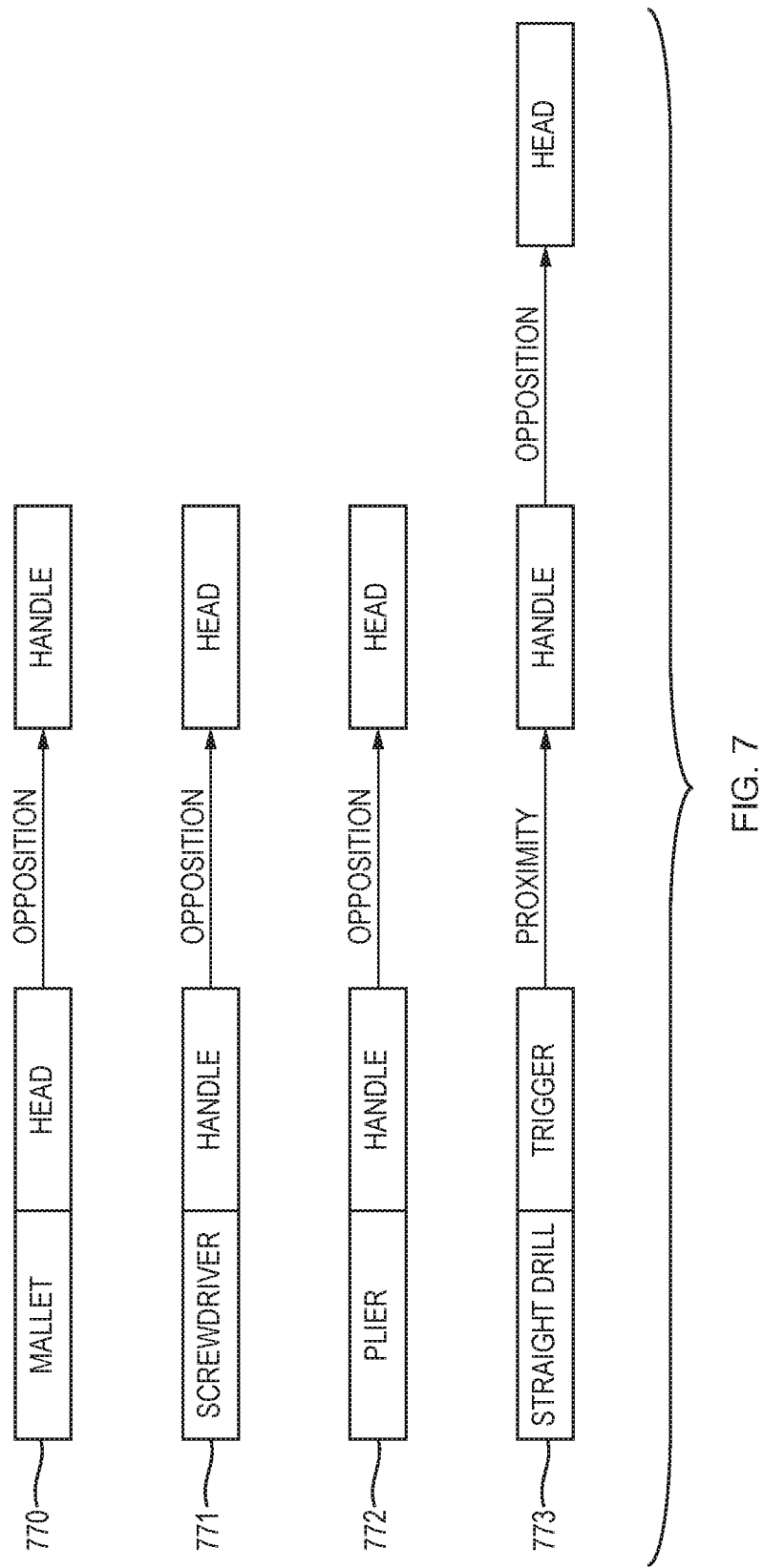
FIG. 7 portrays spatial criteria organization for classifying tool regions according to an embodiment.

For example, in FIG. 7, for a mallet, once the most typical region is identified (the head), the next step is to identify the handle region, which is opposite to the head region. In such an embodiment, the geometric center of each region is known. Hence, such an embodiment computes the distance from the geometric center of each region with respect to the geometric center of the head region. The region that is the farthest from the head region is thus the first candidate region to be recognized as the possible handle region. If this candidate region satisfies all the criteria of the handle region, which for example may be given by Table 3, this region will be classified as the handle region. If not, the process continues with the second farthest region, and so on.

Each tool family requires a specific order of treatment depending on the position of its functional regions as illustrated in FIG. 7. FIG. 7 portrays spatial criteria organization for classifying tool regions according to an embodiment. FIG. 7 shows the sequence for testing regions for a mallet 770, screwdriver 771, plier 772, and straight drill 773. Here again, all three regions' properties must fall within the value range of the region type being searched. If the region being tested does not satisfy all three properties, another region is tested until the properties are found.

Grasping Cue Generation

Once all the meaningful regions (handle, head, and trigger) are identified, a post-process generates grasping cues to guide the grasping of the tool. Different cues are extracted according to the type of region. The grasping cues may be generated at step 106 of FIG. 1 and step 1925 of FIG. 19.

Figure 8:
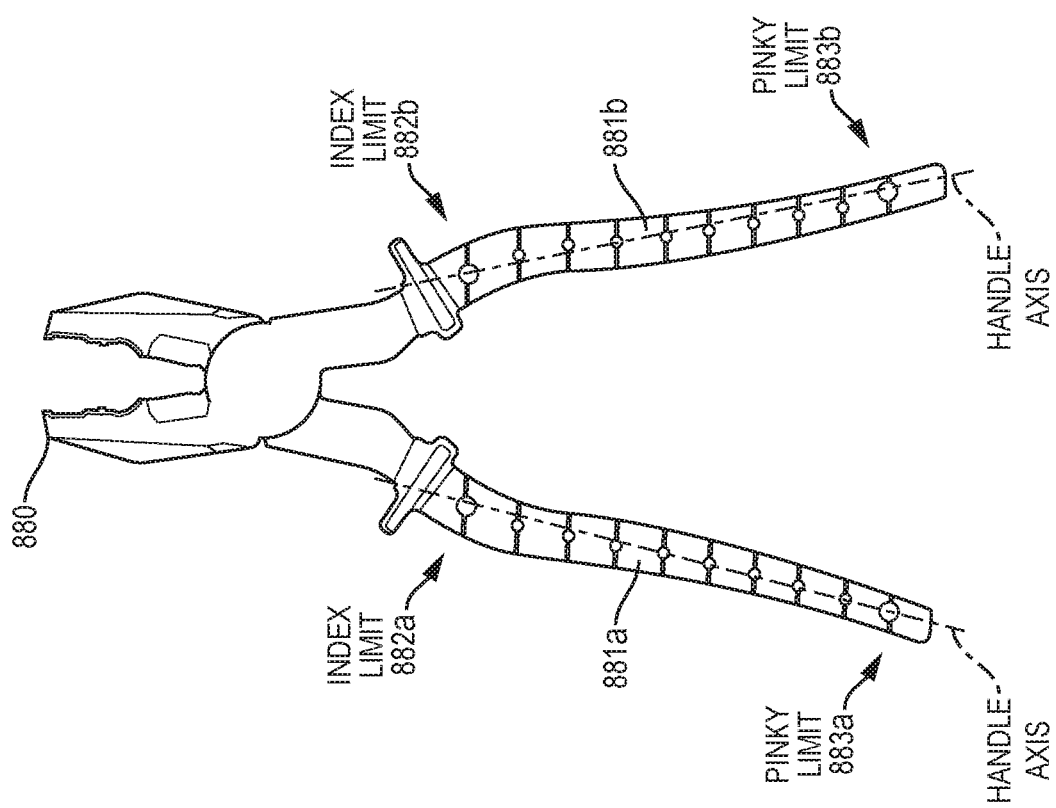
FIG. 8 illustrates grasping cues generated according to principles of an embodiment.

For the handle region, a singular value decomposition (SVD) makes it possible to estimate a mean axis passing through the geometric centers of the faces belonging to the handle region. The two most distant geometric centers projected on the axis form the two grasping cues that limit the hand translation on the axis: the pinky limit and the index limit. FIG. 8 illustrates the pinky limits 883a-b and index limits 882a-b for the handles 881a-b of the pliers 880.

Figure 9:
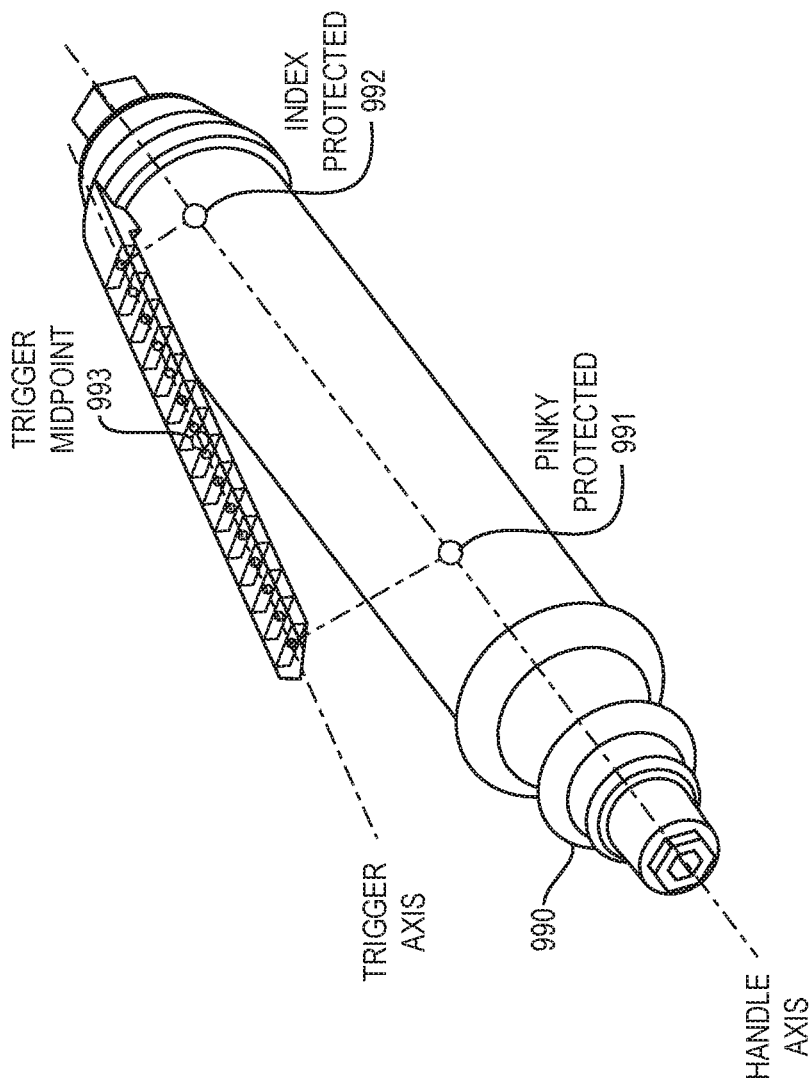
FIG. 9 depicts grasping cues generated according to principles of an embodiment.

For the trigger regions, as with the handle region, an axis passing through the geometric centers of the trigger is computed with a SVD. The two most distant geometric centers are projected on the handle axis to form the limit translation of the handle. FIG. 9 illustrates the pinky limit 991, index limit 992 and trigger midpoint 993 for the straight drill 990. The trigger midpoint 993 computed from the geometric center average indicates the most probable index position.

Figure 10:
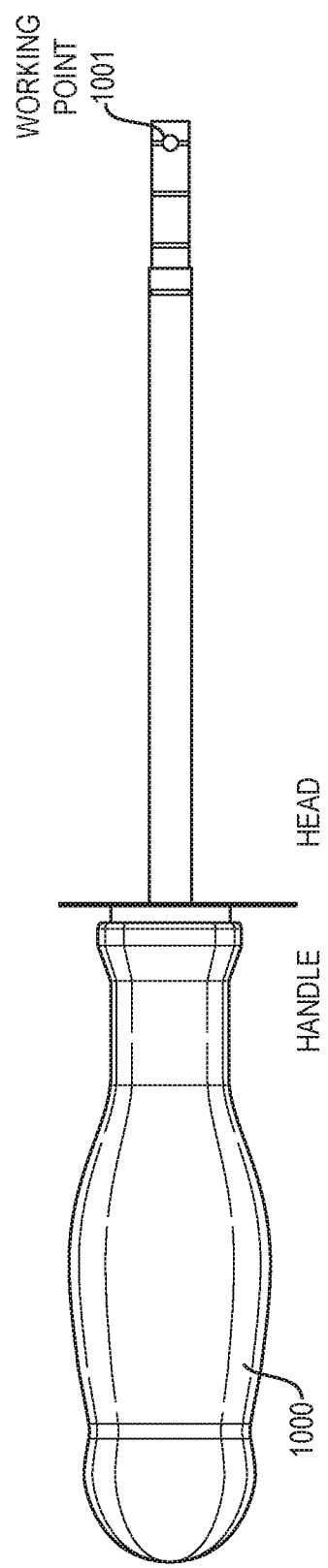
FIG. 10 is a diagram of a tool model and associated grasping cues determined in an embodiment.
Figure 11:
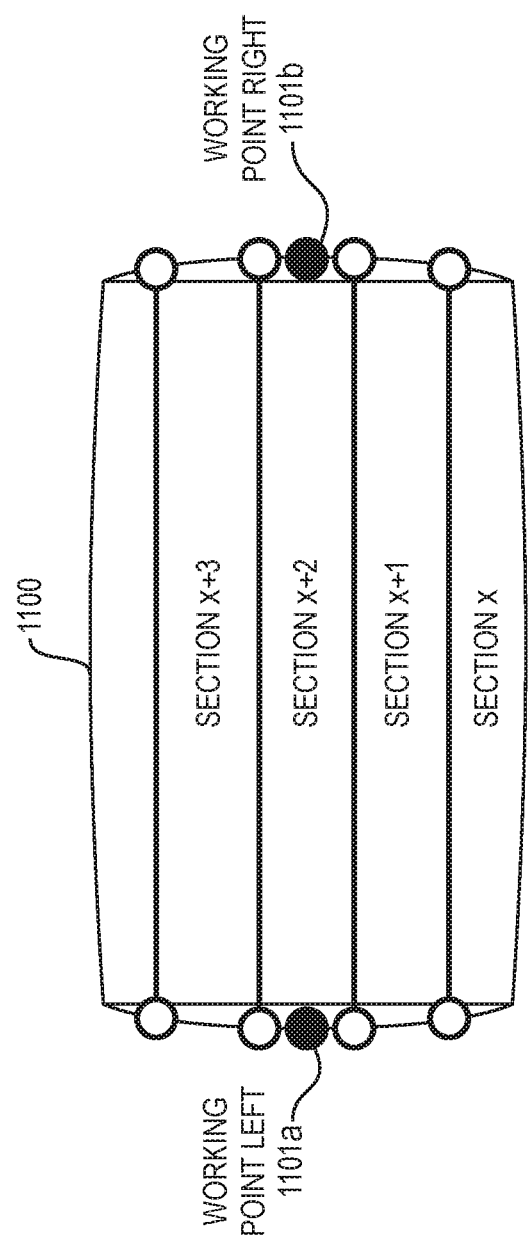
FIG. 11 portrays grasping cues for the head of a tool according to an embodiment.

The tool head is the functional region that executes the task of the tool. Some properties of the head region dictate the working direction of the tool and, thereby, ensure a task-oriented grasp. The working direction is specific to each tool family, e.g., for a straight drill, the working direction coincides with the handle axis. The grasping cue for the head region materializes as one or two working points. For screwdrivers and straight drills, the working point is placed on the geometric center of the farthest face from the handle. FIG. 10 depicts the identified working point 1001 for the screwdriver 1000. For mallets, there are two possible working directions since there are two equivalent sides on the head. The two working points are placed at both extremities of the head by computing the average extrema length points, e.g., $Ex_1$ 338a and $Ex_2$ 338b from FIG. 3) on both sides of the head. FIG. 11 illustrates the generated working points 1101a-b for the mallet head 1100.

Figure 12:
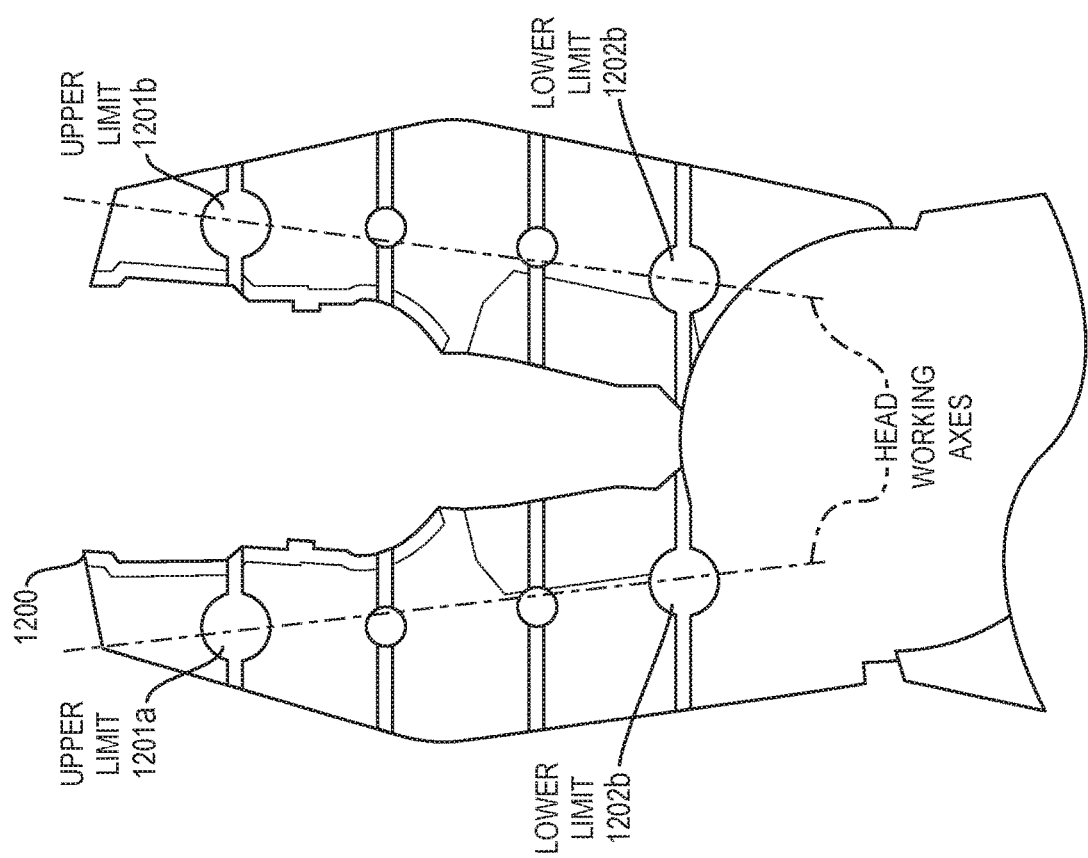
FIG. 12 depicts grasping cues generated according to principles of an embodiment.

For pliers, a working axis is obtained from the SVD of the geometric centers of all the faces that belong to each head region. In such an embodiment, the two limit points of each axis become the grasping cues of the plier's head. FIG. 12 depicts the upper limit grasping points 1201a-b and lower limit grasping points 1202a-b for the pliers 1200.

Validation and Results

The grasping cues extraction methods described above, e.g., the method 100, were tested on forty tools belonging to the four above-mentioned families, screwdrivers, mallets, pliers, and straight handle drills. Hereinbelow, some of the results of generating grasping cues for all four tools families is presented.

Figure 13:
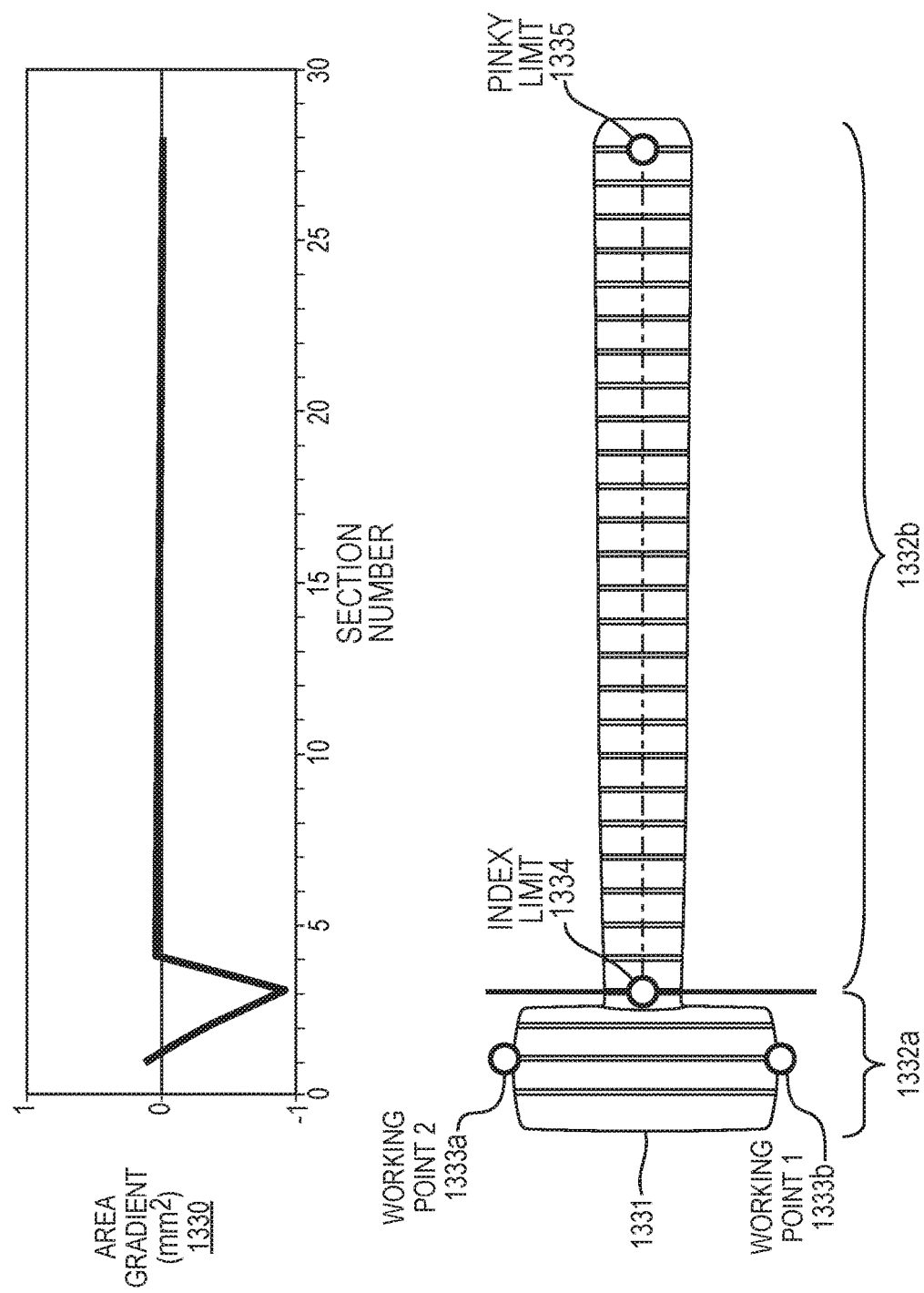
FIG. 13 is a plot of properties of a tool and a depiction of grasping cues determined using the associated plot in an embodiment.
Figure 14:
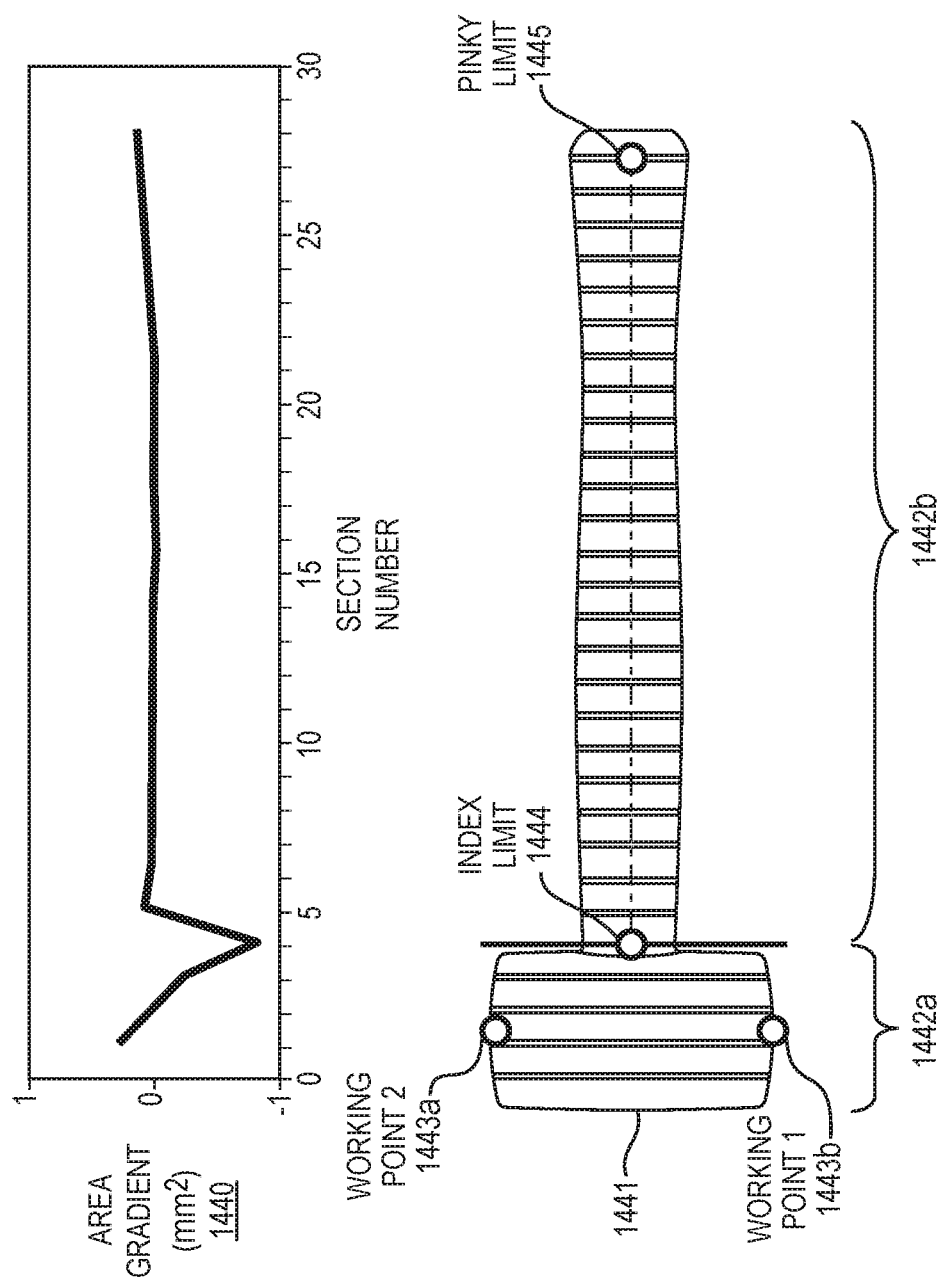
FIG. 14 is a plot of properties of an example tool and a depiction of grasping cues determined using the associated plot in an embodiment.

The five steps of an embodiment, e.g., the steps 102-106 of the method 100 are described below for two mallets. Step 1 (section scan) and step 2 (extraction of section properties) work well and step 3 (segmentation), first identifies a single zone, since all sections include a single face. To continue, a single segment is identified because all faces satisfy the geometric proximity criteria. For instance, since the above mentioned zone is made of sections counting only one face, each face in the series is in close proximity to the previous section, hence finding a single segment. This could also have been done differently, since there can be a single segment in a zone counting only sections with a single face each. Next, two regions are found in that segment, as there is a significant variation in the areas of the faces at the transition between the head and the handle. FIGS. 13 and 14 illustrate the gradients 1330 and 1440 of the face area for the two different mallets, 1331 and 1441. With a maximum deviation measured at −0.94 mm² for FIG. 13 and −0.93 mm² for FIG. 14, two regions 1332a-b and 1442a-b, are distinguished for the mallets 1331 and 1441, respectively.

At step 4 (region classification), the head regions 1332a and 1442a are identified first, as per Table 1. Mallet heads are identified based on their region properties, shown in Table 2 for Mallet 1 (1331) and Mallet 2 (1441). For example, for Mallet 1 1331, the head average area is 1996 mm², which falls between max and min areas of 7000 and 200 mm². Values obtained for each mallet (shown in Table 2) are thus satisfactorily compared to the expected values given in Table 3.

TABLE 2

Region Properties for Mallet 1 (1331 FIG. 13) and Mallet 2 (1441 FIG. 14)

| Tool | Region | Average Area (mm²) | Height (mm) | Average width (mm) | Average Geometric Center (mm) |
|---|---|---|---|---|---|
| Mallet 1 | Head | 1996 | 18 | 29 | [0 0 257] |
| Mallet 1 | Handle | 285 | 229 | 25 | [0 0 124] |
| Mallet 2 | Head | 4800 | 35 | 51 | [0 0 321] |
| Mallet 2 | Handle | 667 | 280 | 37 | [0 0 152] |

Table 3 indicates the expected properties of various regions for four tool families. These values were obtained empirically by measuring 40 actual (real world as opposed to virtual domain) tools and may be used for region classification in embodiments.

TABLE 4

Expected Region Properties For Region Classification

| Tool | Area Max (mm2) | Area Min (mm2) | Height Max (mm) | Height Min (mm) | Width Max (mm) | Width Min (mm) |
|---|---|---|---|---|---|---|
| Plier Handle | 250 | 50 | 225 | 60 | 25 | 5 |
| Plier Head | 250 | 20 | 60 | 0 | 25 | 5 |
| Mallet Handle | 900 | 100 | 400 | 60 | 60 | 15 |
| Mallet Head | 7000 | 200 | 75 | 15 | 60 | 15 |
| Screwdriver Handle | 1500 | 100 | 400 | 50 | 60 | 15 |
| Screwdriver Head | 75 | 5 | 250 | 0 | 30 | 0 |
| Straight Drill Handle | 1500 | 200 | 350 | 60 | 65 | 10 |
| Straight Drill Head | 500 | 125 | 50 | 0 | 65 | 5 |
| Straight Drill Trigger | 175 | 40 | 200 | 10 | 25 | 5 |

In step 5 (extraction of grasping cues) the handle axis is obtained from the handle region through a SVD of the faces' geometric centers. Next, the index limit and the pinky limit are computed by projecting the geometric centers of both extrema faces onto the axis. Finally, the two working points are obtained by computing the average extremum length points on both sides of the head. The resulting grasping cues 1333a-b, 1334, 1335 for the mallet 1331 and the grasping cues 1443a-b, 1444, and 1445 for the mallet 1441 are shown in FIGS. 13 and 14. These two cases illustrate the capacity of embodiments to distinguish the head from the handle and to extract grasping cues for mallets of different geometries, sizes, and masses. Twelve mallets were successfully tested.

As with mallets, for screwdrivers, step 1 (section scan) and step 2 (extraction of section properties), were performed on screwdrivers. The segmentation step, as for the mallets, yields one zone and one segment. This segment was then divided into regions based on the gradients 1551 and 1661 of the area of the faces. Similar to the mallets, a significant gradient deviation (the points 1553 and 1663) is observed when transitioning from the handle to the next region. The main gradient deviation is 0.98 mm² for both screwdrivers. For screwdriver 1 (1550 in FIG. 15), gradient analysis reveals two regions 1552a and 1552b as the gradient at the tip remains within the threshold value (half the maximum deviation). For screwdriver 2 (1660 in FIG. 16), the analysis reveals three regions 1662a-c because the gradient at the tip exceeds the threshold value (at −0.56 mm²).

The handle regions (1552a in FIGS. 15 and 1662a in FIG. 16) for each screwdriver are identified in step 4, first based on their properties, as per the sequence indicated in Table 1. The handles are identified thanks to their regions' properties that satisfy the tolerance range of typical screwdriver handles given in Table 3 and as measured for the screwdriver 1550 (screwdriver 1) and the screwdriver 1660 (screwdriver 2) in Table 4.

TABLE 4

Figure 15:
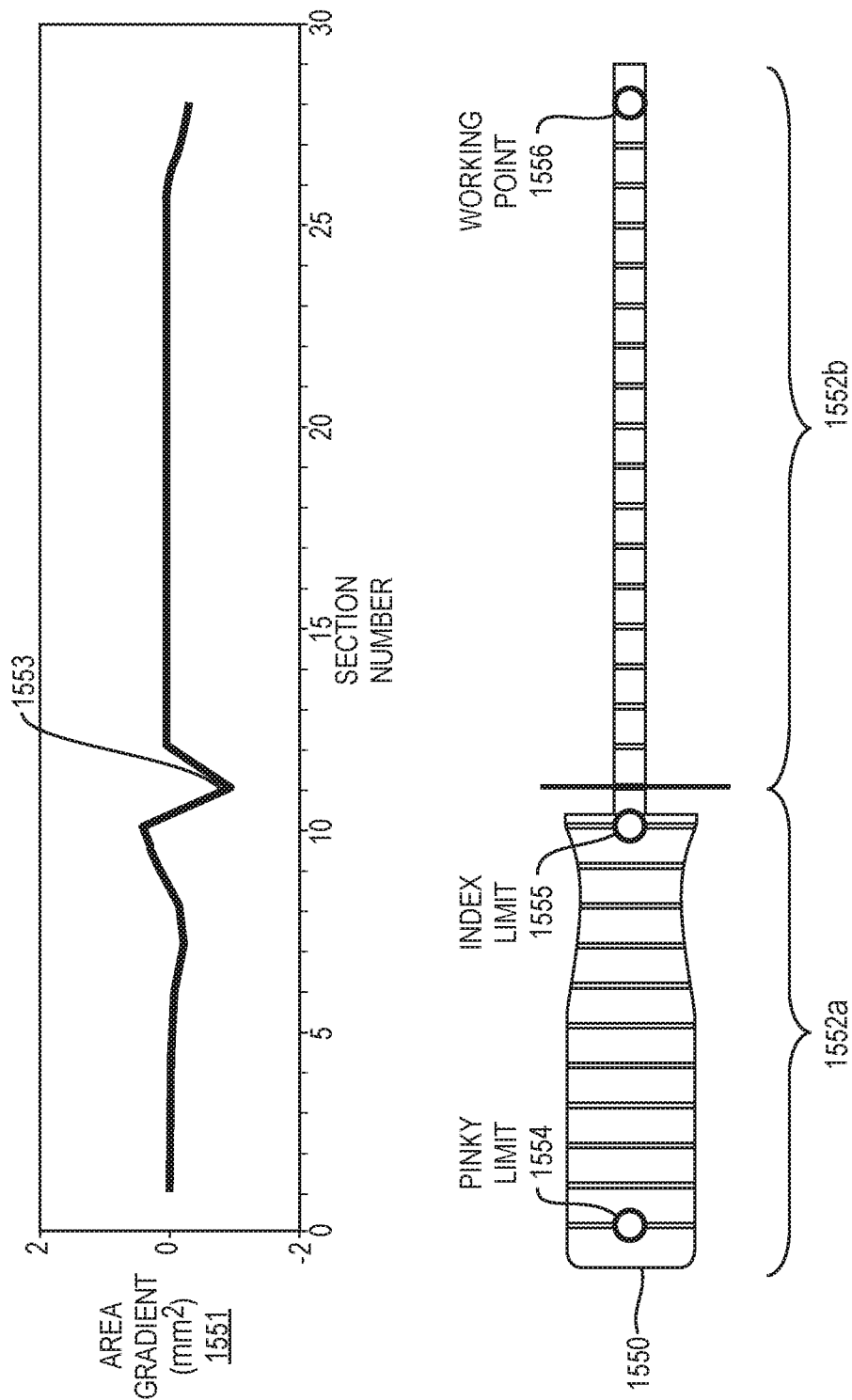
FIG. 15 is a plot of properties of a tool and a depiction of grasping cues for the tool model determined using the associated plot according to an embodiment.
Figure 16:
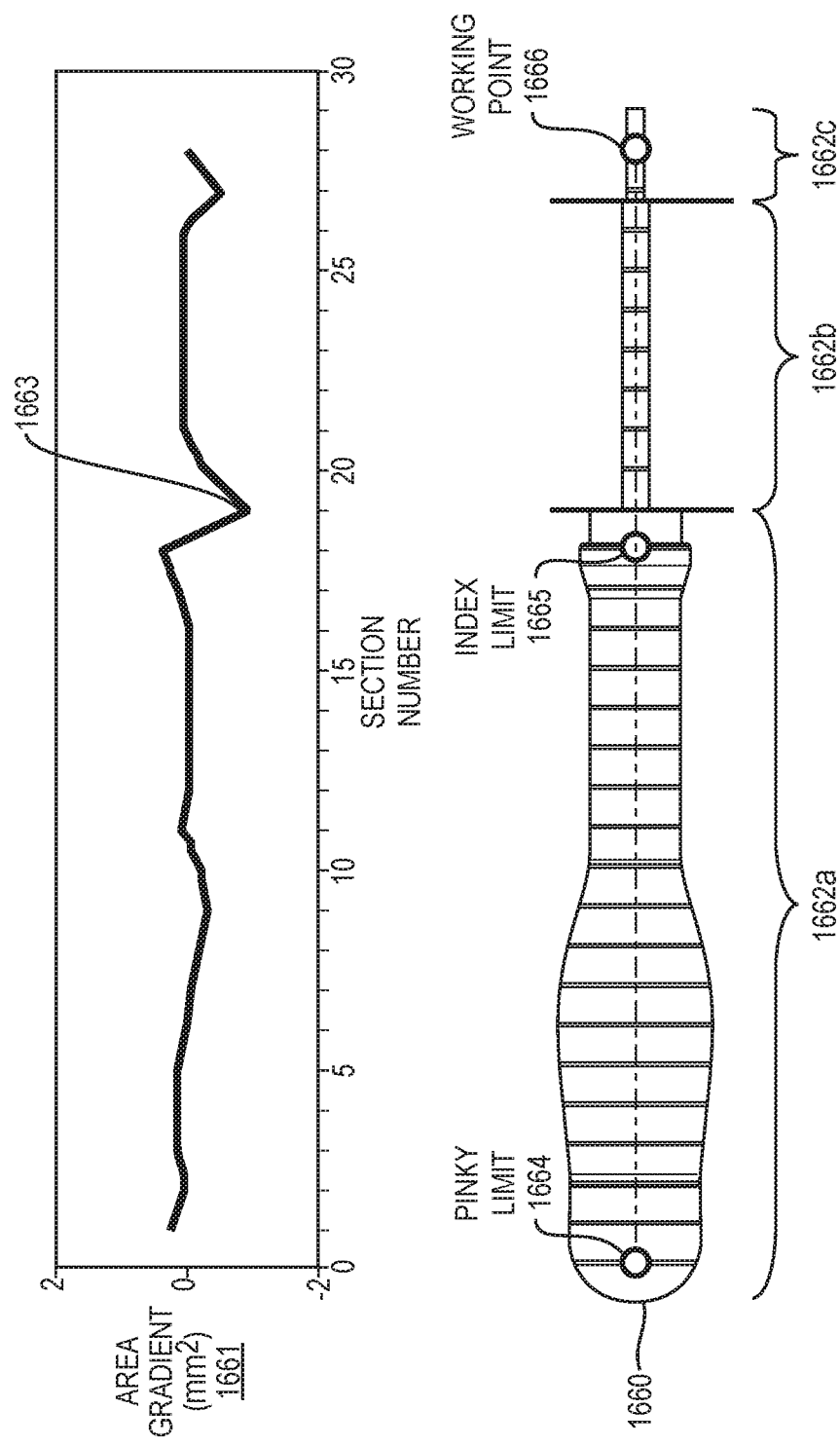
FIG. 16 is a plot of properties of a tool and a depiction of grasping cues determined for the tool model using the associated plot in an embodiment.

Region Properties of Screwdriver 1 (1550 FIG. 15) and Screwdriver 2 (1660 FIG. 16)

| Tool | Region | Average Area (mm2) | Height (mm) | Average Width (mm) | Average GC (mm) |
|---|---|---|---|---|---|
| Screwdriver 1 | Handle | 990 | 98 | 34 | [−62 0 0] |
| Screwdriver 1 | Head | 62 | 235 | 9 | [−241 0 0] |
| Screwdriver 2 | Handle | 283 | 95 | 19 | [−53 0 0] |
| Screwdriver 2 | Shank | 7 | 53 | 3 | [−134 0 0] |
| Screwdriver 2 | Head | 5 | 6 | 2 | [−169 0 0] |

The head region is searched for next as the region farthest from the handle, as per FIG. 7. The head region properties are satisfactorily compared to the expected values (Table 3). It is noted that for the screwdriver 1550 of FIG. 15 the head region 1552b includes the shank, while for the screwdriver 1660 of FIG. 16 the head region 1662c only includes the tip. At last, the handle axis is obtained from the handle regions 1552a and 1662a through a SVD of the geometric centers of the faces. Next, the index and pinky limits are computed by projecting the geometric centers of both extrema faces onto the axis. Finally, the working point coincides with the geometric center of the face belonging to the head region that is the farthest from the handle. FIG. 15 depicts the pinky limit grasping cue 1554, index limit grasping cue 1555, and working point grasping cue 1556 for the screwdriver 1550. FIG. 16 depicts the pinky limit grasping cue 1664, index limit grasping cue 1665, and working point grasping cue 1666 for the screwdriver 1660. These two cases illustrate the capacity of embodiments to distinguish the head from the handle and to extract grasping cues for screwdrivers. Ten screwdrivers were successfully tested.

Figure 17:
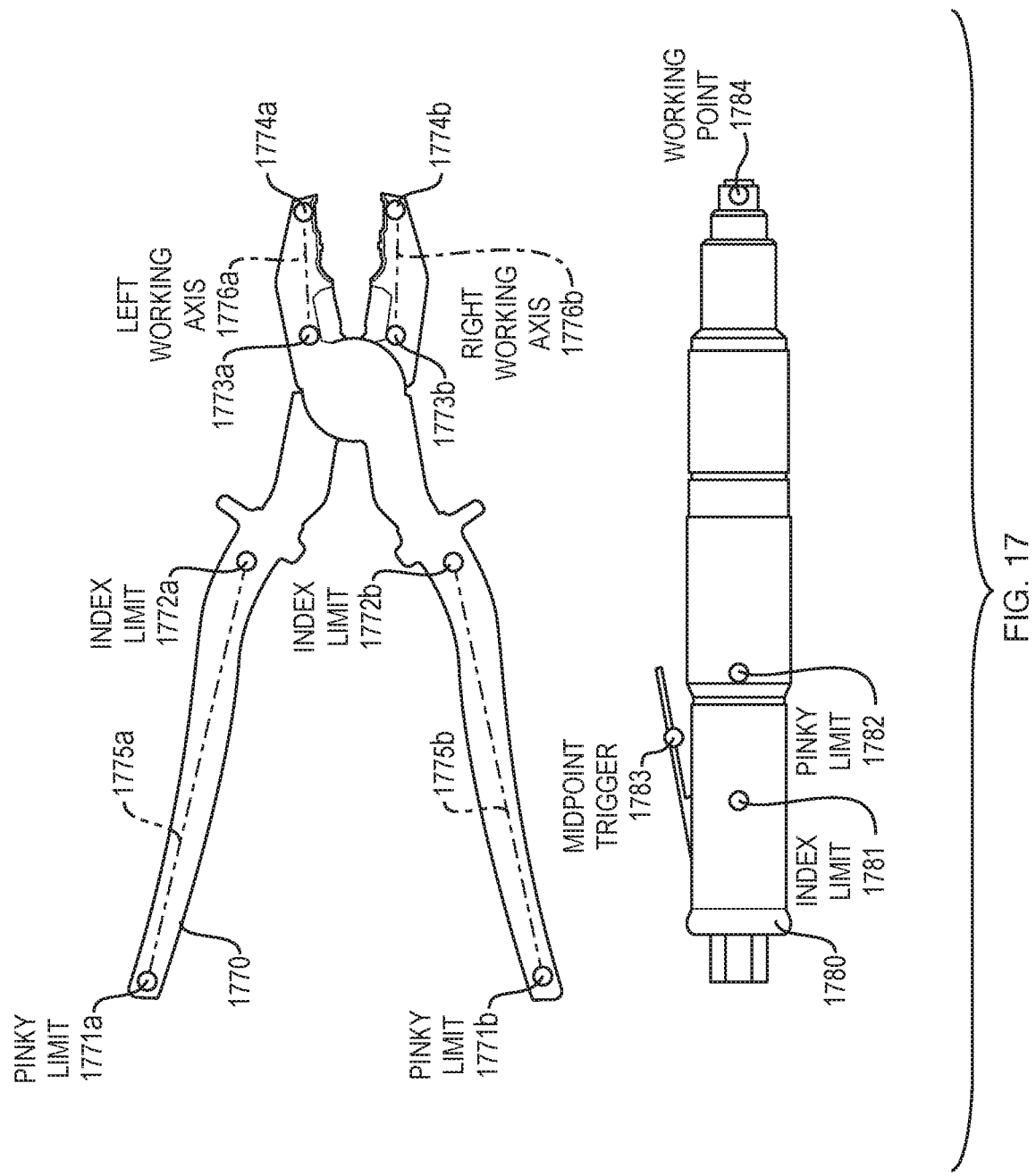
FIG. 17 illustrates grasping cues identified according to principles of embodiments.

FIG. 17 shows the grasping cues 1771a-b, 1772a-b, 1773a-b, and 1774a-b generated for the pliers 1770. These grasping cues are typical of the results obtained for all eight tested pliers. For the pliers 1770, the grasping cues are the four points 1771a-b and 1772a-b that form the two handle axes 1775a-b and the four points 1773a-b and 1774a-b that form the two working axes 1776a-b.

FIG. 17 also illustrates the grasping cues 1781-1784 generated for the straight drill 1780. These grasping cues are typical of the results obtained for all ten straight drills of the lever trigger type that have been evaluated using embodiments. For the straight drill 1780, four grasping cues 1781-1784 are generated including two points 1781 and 1782 for the handle axis, one point 1783 for the midpoint of the trigger, and a single working point 1784 for the head.

Figure 18:
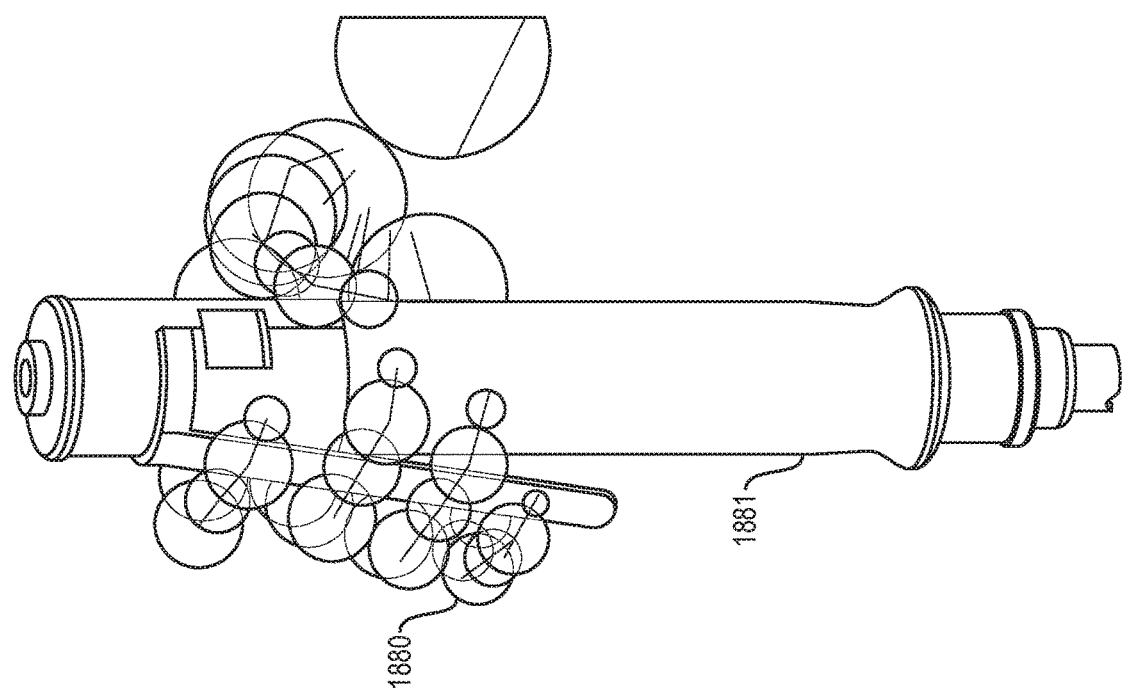
FIG. 18 is a depiction of automated grasp determined for a human model using principles of embodiments.

Embodiments can utilize the generated grasping cues to simulate tasks utilizing the tools. For instance, in one such example embodiment, the grasping cues are used by a human simulation engine, such as the SPE developed by the Applicant, to generate a plausible task-oriented grasp. The result of one such embodiment where a hand 1880 was simulated grasping a straight drill 1881 is illustrated in FIG. 18.

Embodiments identify the grasping cues needed to generate a plausible grasp to be automatically extracted according to a tool's affordance. Grasping cues can then be used as an input by a positioning engine. The grasping cues grant the appropriate degrees of freedom required to generate a plausible tool grasp taking into account the task to be performed.

The grasping cue extraction embodiments described herein use the tool's 3D geometry as an input and decompose the geometry into zones, segments, and regions, successively. Embodiments identify a tools' expected regions (head, handle, trigger), reflecting their affordances. The region identification sequence looks for the most evident region first, depending on the characteristics of the tool's family. Once the handle, head, and trigger (if any) are identified, the grasping cues are obtained so as to guide the positioning of the hand, or other such grasping element, on the handle, while taking into account the orientation potentially constrained by the tool's head.

The segmentation step, e.g., step 104 of FIG. 1, exploits divergent region properties from the median to ensure a segmentation of the tool into distinct regions. This approach is based on the gradient of the areas of faces and the displacement of the geometric centers of the faces in space. The number of segmented regions depends directly on the 3D model of the object.

The region classification step, e.g., step 105 of FIG. 1, exploits both the properties of the regions themselves as well as the relations amongst the regions. Considering only the region properties could lead to erroneous classification. For example, in the straight drill 1780 shown in FIG. 17, the properties of both ends would not suffice to distinguish the working head from the air inlet. However, once the trigger is identified, the method identifies the working head as the farthest region from the trigger and from the handle.

For an embodiment, the quality of segmentation is closely related to the 3D scan step performed on the tool geometry. The larger the distance between sections, the higher the risk of missing a change of shape. However, a very fine scanning step would fail to detect smooth curves. A solution embodiments can implement is conducting two scans: a first, coarser scan, to detect divergences, and hence transitions between regions; and a second, finer scan, to refine data acquisition where needed.

Another limitation comes from the direction of the scan. Indeed, this solution is efficient with tools for which the bounding box directly yields the best scanning direction. This is the case for the families of tools discussed above where L1>>L2>L3. However, this is not true for all tools families. In some cases, such as with pistol drills, the optimal scanning direction is identified. Functionality for generating grasping cues for pistol style tools is described hereinbelow.

Embodiments advantageously automatically extract grasping cues from the 3D models of tools. The provided grasping cues express tool affordance by taking into account the handle, trigger (if any), and head characteristics. This leads to a complete task-oriented grasp. In addition, the grasping cues leave some freedom in determining a plausible grasp that can take into account the constraints of the workplace of an object using the tool, e.g., a digital human model.

The method 100 described hereinabove in relation to FIG. 1 generates grasping cues for models of one-handed tools, such as mallets, screwdrivers, pliers, and straight drills. All these tools share a common characteristic of having one main direction that is exploited when scanning the geometry to extract affordance features. Embodiments can also extend the method 100 of FIG. 1 to extract grasping cues from more complex geometries for tools that have multiple main directions, such as pistol drills and pistol screwdrivers, rather than a single direction. Such embodiments exploit the concepts of geometric feature extraction to iteratively determine an optimal direction for scanning the geometry of pistol-shaped tools. From the section scans, geometric properties are extracted that allow the geometry to be segmented. Regions that are useful to determine a plausible task-oriented grasp, such as the handle, the head, and the push trigger are identified. In turn, grasping cues are extracted according to the region type. These grasping cues can be used in a simulation/posturing engine to generate plausible grasps and perform simulations.

In order to extract grasping cues from models of pistol-shaped tools, i.e., tools that have multiple main directions, rather than a single direction, embodiments, determine an optimal scanning direction of the tool's geometry in order to efficiently recognize specific features (or regions) on the tool model. Further, embodiments recognize specific affordance features such as push triggers found on these types of tools.

FIG. 19 illustrates a process 1990 for generating grasping cues for models of pistol like tools according to an embodiment. The method 1990 utilizes the two sub-procedures 1901 and 1920. The method 1990 begins with the sub-procedure 1901 which, first, obtains 1902 a tool's geometry. The geometry obtained at step 1902 may be in any form known in the art. At step 1903, a first main direction of the tool is determined by performing 1904 the grasping cues extraction process 1920. Performing 1904 the grasping cues extraction process 1920 includes performing the steps 1921-1925 of the sub-procedure 1920. The steps 1921-1925 can be performed in the same manner as steps 102-106 as described hereinabove in relation to FIG. 1, to generate grasping cues. For step 1904, the grasping cues generated by performing the steps 1921-1925 generates an output 1910 that includes an approximate handle region and approximate handle axis of the tool.

To continue, at step 1905 a second main direction of the tool is determined by performing 1906 the grasping cues extraction sub-procedure 1920. Performing 1906 the grasping cues extraction sub-procedure 1920 includes performing the steps 1921-1925 of the sub-procedure 1920 to determine the output 1911 that includes the body region, the working axis, the head region, and the working point grasping cue of the tool.

The method 1901 continues at step 1907 and determines an optimal scanning direction of the tool. In an embodiment, at step 1907, the optimal scanning direction is determined to be perpendicular to the workings axis which is part of the output 1911 determined at steps 1905-1906.

In turn, the method continues at step 1908 and performs the grasping cues extraction sub-procedure 1920. At step 1921, the optimal scanning direction is used and the steps 1921-1925 are implemented as described herein to generate the grasping cues 1909 for the tool. As such, after step 1908 the handle region, the handle axis, the push trigger region, the pinky limit grasping cue, the trigger midpoint grasping cue, the index Upper limit grasping cue, and the index lower limit grasping cue are determined.

The method 1990 utilizes the approach for extracting grasping cues as detailed above in relation to models of tools with a single main direction such as mallets, regular screwdrivers, pliers, and straight drills. Specifically, in sub-procedure 1920, first 1921, a section scan is carried out on the 3D geometry of the tool model to extract a series of sections. The scan 1921 may be carried out similarly to the slicing described by Minetto et al. [28]. The scanning direction is obtained directly from the main direction of the oriented bounding box of the tool. Properties are then extracted 1922 for each section. At the segmentation step 1923, variations of section geometrical properties are analyzed to organize the sections into zones, segments, and regions successively. Next, regions are classified 1924 and specific regions that influence the grasp, such as the handle, are identified. Finally, grasping cues are extracted 1925 from the identified regions, including the head of the tool that provides a working direction related to the task, the handle, or lever trigger, if any.

Pistol Shaped Tools

Figure 20:
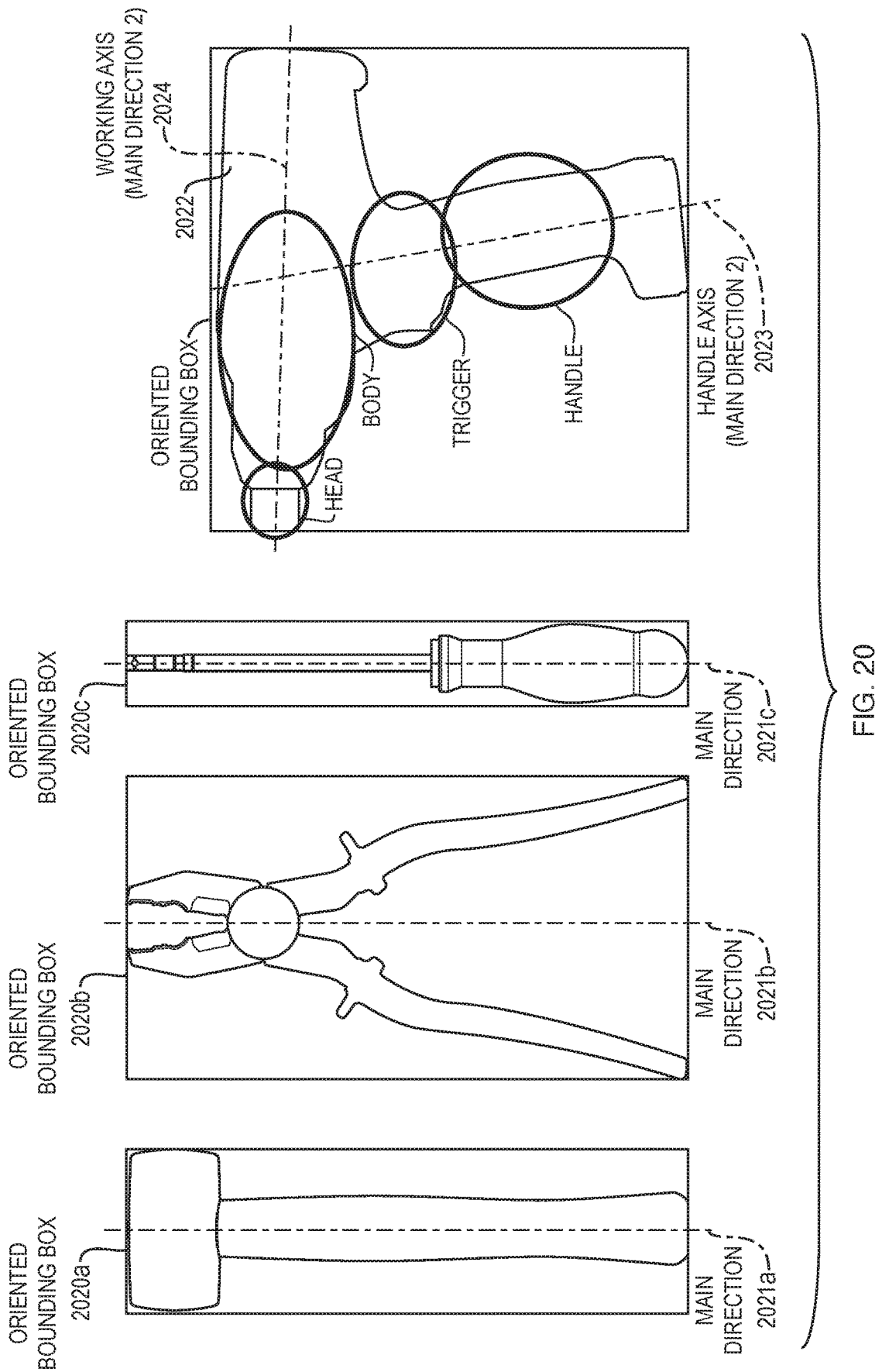
FIG. 20 illustrates types of tools and axes of the tool that are identified in embodiments to determine grasping cues.

Embodiments start with the tool 3D geometry. A wide variety of tools can be found on production lines. These tools generally have different geometries. Embodiments, e.g., the method 100 described above in relation to FIG. 1, yield excellent grasping cue results for models of tools with a single main direction, such as the tools 2020a-c of FIG. 20 with the single main directions 2021a-c. However, other embodiments of the present invention, such as the method 1990, generate grasping cues for models of pistol-shaped tools, such as the tool 2022 that has the handle main direction 2023 and working axis main direction 2024.

Pistol shaped tools, e.g., the tool 2022, share two important characteristics: (i) their general shape is one of a boomerang or of a pistol and (ii) they feature a push trigger. Embodiments consider the push trigger to be a key affordance feature because the trigger determines the position of the index finger on the tool. Hence, embodiments for pistol-shaped tools identify the trigger, as well as other features mentioned above, e.g., the handle and working body.

Push trigger detection, however, is challenging because there is no specific feature that allows the push trigger to stand out from the rest of the segmented regions. Embodiments overcome this problem by looking for a most typical region first. For example, for the 'mallet' family of tools, the most typical region was the head; therefore, for mallets, the head region was identified first. Hence, a predefined classification sequence is established for each tool family [4]. For pistol-shaped tools, an identification sequence used by embodiments is: (1) head, (2) handle, and (3) trigger, which is described in further detail below.

Figure 21:
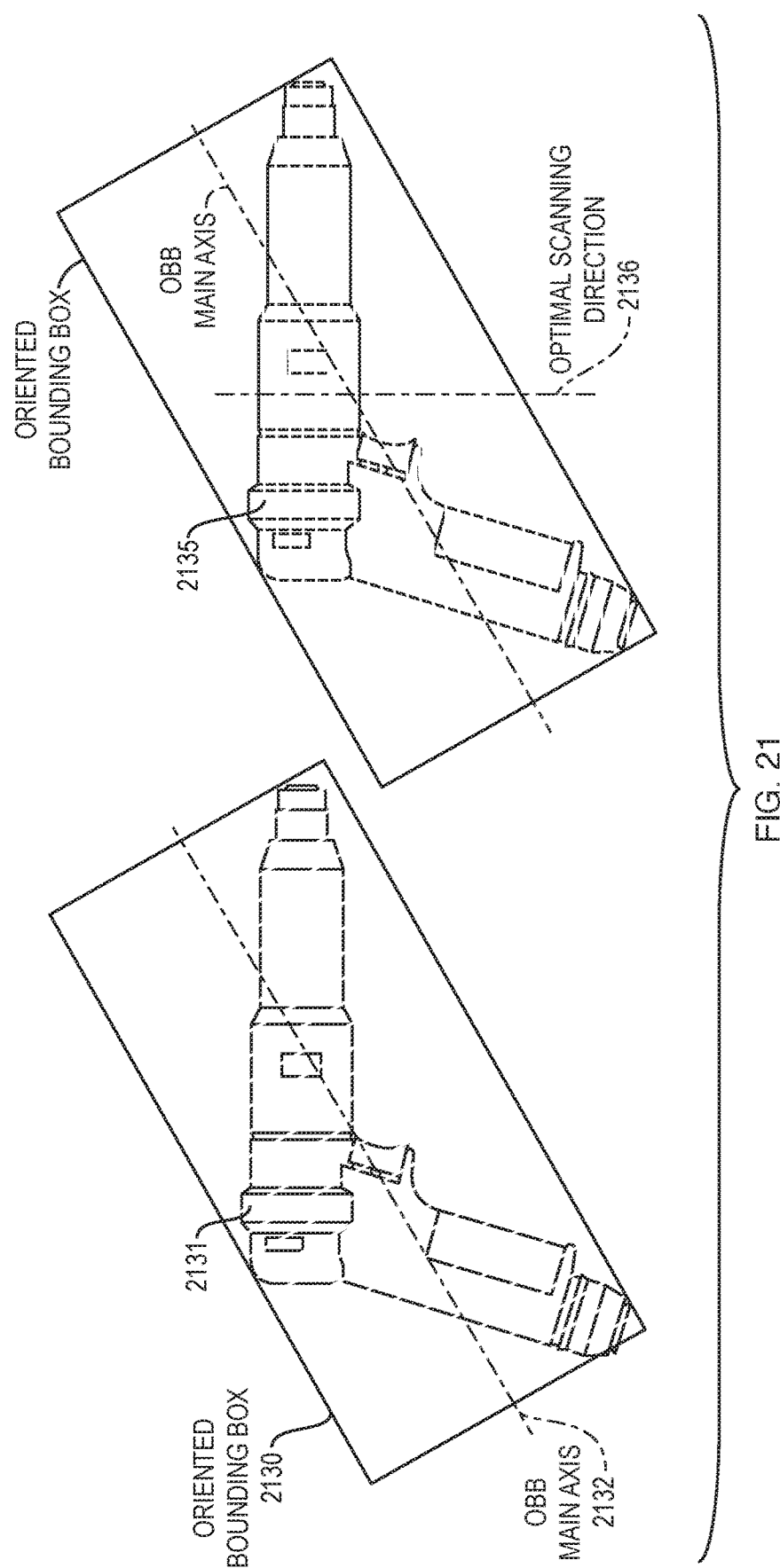
FIG. 21 depicts oriented bounding boxes that may be employed in embodiments to determine grasping cues.

The method used for tools with a single main direction assumes that the direction of the scan performed to generate sections, e.g., step 102, matches the main direction of the tool's bounding box. This is described herein in relation to FIG. 2. However, pistol-shaped tools do not satisfy this criterion. Instead, pistol shaped tools are tools with multiple main directions. As illustrated in FIG. 21, the overall shape of pistol drills and pistol style screwdrivers precludes the use of the bounding box as an optimal scanning direction to precisely identify the trigger. Specifically, the bounding box 2130 surrounding the tool 2131, yields the main direction 2132. Using the scanning direction of the oriented bounding box 2130 main axis 2132 for the scan yields the sections on the tool 2131 that are perpendicular to the oriented bounding box 2130 main axis 2132. These sections do not allow the trigger to be identified. To overcome this problem, a series of steps, e.g., the steps 1902-1909 of FIG. 19 are performed to determine an optimal scanning direction to identify the push trigger. FIG. 21 illustrates an example optimal scanning direction 2136 for the tool 2135 that is determined using principles described herein.

Optimal Scanning Direction

As mentioned above, embodiments identify the push trigger to determine a plausible grasp for models of pistol style tools. Further, as described in relation to FIG. 19, the 3D geometry of the tool is scanned in order to identify affordance features. The optimal scanning direction to identify the push trigger within pistol-shaped tools is perpendicular to the body axis (or working axis). This facilitates identifying a significant change in face area at the transition from the handle/trigger regions to the body region. This optimal scanning direction is obtained in the steps, 1903-1908 described hereinabove in relation to FIG. 19. Further detail of implementing the steps 1903-1908 in embodiments is described below.

Determining the First Main Direction (Steps 1903 and 1904)

For pistol-shaped tools, the first main direction corresponds to the handle axis. Hence, the first steps, 1903-1904, identify an approximate handle region and handle axis from the main axis of the bounding box. This handle region can be distinguished from the tool body based on typical handle width, which is smaller than body width. To determine the handle axis a section scan is first performed, e.g., at step 1921, along the main direction of the oriented bounding box surrounding the tool. Embodiments may determine any number of sections, some number of sections may be determined by default, e.g., 28. In turn, the properties are extracted, e.g., at step 1922, for each section. In an embodiment, when a face is included in another face, the inner face is removed. Further, in an embodiment, when two distinct faces are found in the same section, they are unified with the convex hull of the faces. Sections are then organized, e.g., at step 1923, in regions based on areas and geometric center variations. An approximate handle is then searched for among these regions by performing recognition tests starting with the region of greater height. This functionality serves to classify the regions, e.g., at step 1924. The tested region parameters are compared to stored values of expected region properties for the family of tools being analyzed. Values for expected region properties that may be used in embodiments are shown in Table 5. Since the orientation of the bounding box axis is rarely collinear with the handle axis, the properties of the regions are sometimes greater and, hence, the values associated with an approximate handle are larger than those of the handle (in Table 5). Moreover, in order to distinguish the handle from the body, an embodiment may consider that the approximate handle region cannot be the one with the greater width of all segmented regions, since the body is typically wider than the handle. Once the approximate handle region is identified, a singular value decomposition is used to generate an approximation of the handle axis passing through the average of the geometric centers of this region. In this way, the first main direction of the tool is determined. In an embodiment, the tool's first main direction (which is the approximate handle axis) is determined from the oriented bounding box main axis using the procedure 1920.

Figure 22:
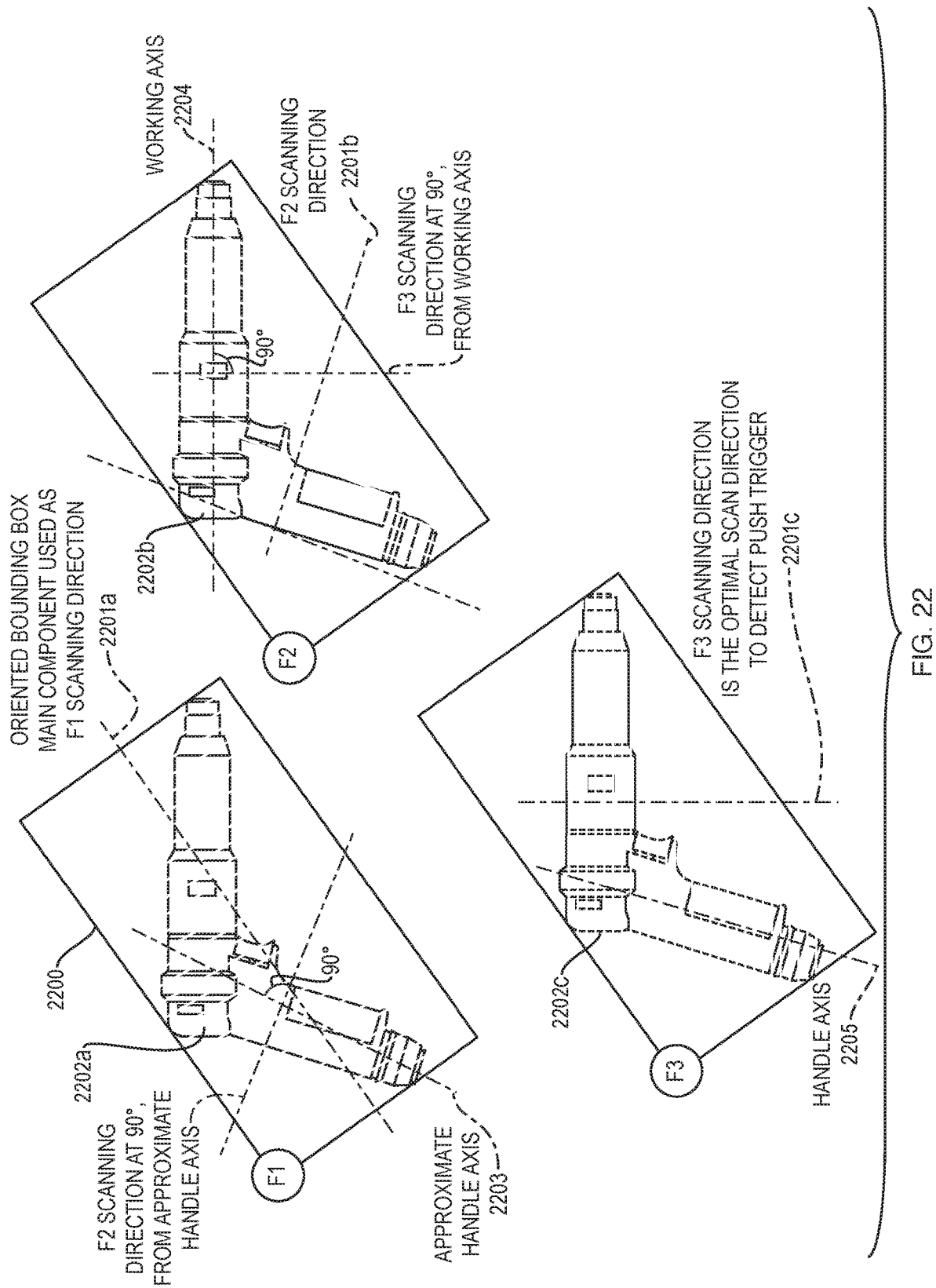
FIG. 22 illustrates stages of a method implemented in embodiments for determining grasping cues.

The functionality for determining the approximate handle axis is illustrated in FIG. 22. Specifically, the bounding box 2200 is considered, the main axis 2201*a* of the bounding box 2200 is used as the scanning direction to generate the sections from the tool 2202*a* (the sections shown by the light shaded lines on the tool 2202*a*). Properties of the sections are determined and then analyzed to determine regions and the regions are classified to identify the approximate handle region and the approximate handle axis 2203.

TABLE 5

Expected Properties For Pistol-Shaped Tool Region Classification

| | Max Area (mm²) | Min Area (mm²) | Max Height (mm) | Min Height (mm) | Max Width (mm) | Min Width (mm) | Region asymmetry |
|---|---|---|---|---|---|---|---|
| Approximate handle (P1) | 1600 | 250 | 350 | 50 | 60 | 30 | Not relevant |
| Body (P2) | 1600 | 300 | 350 | 50 | 60 | 30 | Not relevant |
| Handle (P3) | 1500 | 200 | 300 | 50 | 50 | 30 | Total Symmetry or Partial Asymmetry |
| Push Trigger (P3) | 1700 | 250 | 60 | 10 | 50 | 30 | Total Asymmetry |

Determining the Second Main Direction (Steps 1905 and 1906)

For pistol-shaped tools, the second main direction corresponds to the working axis that passes through the tool's body. The steps 1905 and 1906 determine this working axis, i.e., search for this second main direction. To determine the working axis a second scanning direction is oriented 90 degrees from the approximate handle axis identified at the previous step, e.g., approximate handle axis 2203. The second scanning direction 2201*b* is shown in FIG. 22. Using this scanning direction 2201*b* a second section scan is performed, e.g., at step 1921, to determine sections, e.g., 19 sections, for the tool 2202*b*. In FIG. 22 the sections are shown by the light shaded lines on the tool 2202*b*. As before, when a face is included in another face, the inner face is removed. Further, in an embodiment, when two distinct faces are found in the same section, they are unified with the convex hull of the faces. Properties for the sections are then determined, e.g., at step 1922, and sections are then organized in regions based on areas and geometric center variations, e.g., at step 1923. The body region is then searched for among these regions by performing recognition tests starting with the region of greater height. As such, the body region is identified/classified, e.g., at step 1924. The tested region parameters are compared to the values of Table 5. Moreover, in order to distinguish the body region from the handle, an embodiment assumes that the body region has a greater width than the previously identified approximate handle, since the body is typically wider than the handle. Once the body region is identified, a singular value decomposition is used to generate the working axis 2204 passing through the average of the GCs of the body region. In an embodiment, the working axis 2204 is determined at step 1925 of the procedure 1920.

At this stage, because the approximate handle axis 2203 and the working axis 2204 are identified, the head of the tool can be determined. In an embodiment, this is done by comparing the width of a few extremum sections on both sides of the tool and determining that the head is on the side with the smallest width. According to an embodiment, the geometric center of the extremum face, for which the projected geometric center is the most distant to the approximate handle axis 2203, is used as the working point of the tool's head. In embodiment, the tool's head is identified as a grasping cue, as described above. It is noted that while the tool's head is not grasped, the head itself can grasp for some tools, e.g., pliers, and the identified head can be used in determining the grasp by orienting the tool toward the task to be performed.

Determining the Optimal Scanning Direction (Steps 1907 and 1908)

From the working axis 2204 identified at the previous preparatory steps, embodiments determine the optimal scanning direction 2201*c*. The optimal scanning direction 2201*c* is identified as being perpendicular to the working axis 2204. The optimal scanning direction 2201*c* is considered optimal to identify the push trigger region because the optimal scanning direction maximizes the identification of the variation of section properties between the handle/trigger and body regions.

Once the optimal scanning directed 2201*c* is determined embodiments may continue and implement steps, e.g., steps 1921-1925, to determine grasping cues for the tool. In one such embodiment, at step 1921, the tool 2202*c* is scanned along the optimal scanning direction 2201*c* to generate sections, e.g., 28 sections, along the optimal scanning direction 2201*c*. In FIG. 22 the sections are shown by the light shaded lines on the tool 2202*c*. To continue, properties of the sections are extracted at step 1922. In an embodiment, when a face is included in another face, the inner face is removed and when two distinct faces are found in the same section, they are unified with the convex hull of the faces. According to an embodiment, in order to make it easier to identify the push trigger, the faces belonging to the body of the tool are first identified and removed. Because the scanning is carried out in the direction 2201*c* perpendicular to the body of the tool, i.e., the working axis 2204, any section with an area greater than 2000 mm² is considered to be part of the tool's body and removed. All the remaining sections are next segmented into regions at step 1923. The regions are then classified at step 1924. The region classification 1924 identifies a handle by performing recognition tests on regions of greater heights. In an example embodiment, a recognition test computes the height of a region by the sum of the distances between the geometric centers of the faces included in the region. As such, the height of each region is known. Using the height of each region, an embodiment determines which region has the greatest height and this region is tested to see if the region satisfies the criteria for Table 5. Once the handle region is identified, the handle axis 2205 is determined by performing a singular value decomposition on the geometric centers of the faces that belong to the handle region. The identified handle region and handle axis 2205 are used to identify the push trigger by proximity to the handle region, as described below.

Push Trigger Detection

To determine the grasping cues, an embodiment detects the push trigger on the pistol-style tools. A push trigger corresponds to an asymmetric region with a functional side where the index finger is positioned. In order to identify the push trigger region, two properties called 'section asymmetry' and 'region asymmetry' are evaluated, as described below.

Section Asymmetry

Figure 23:
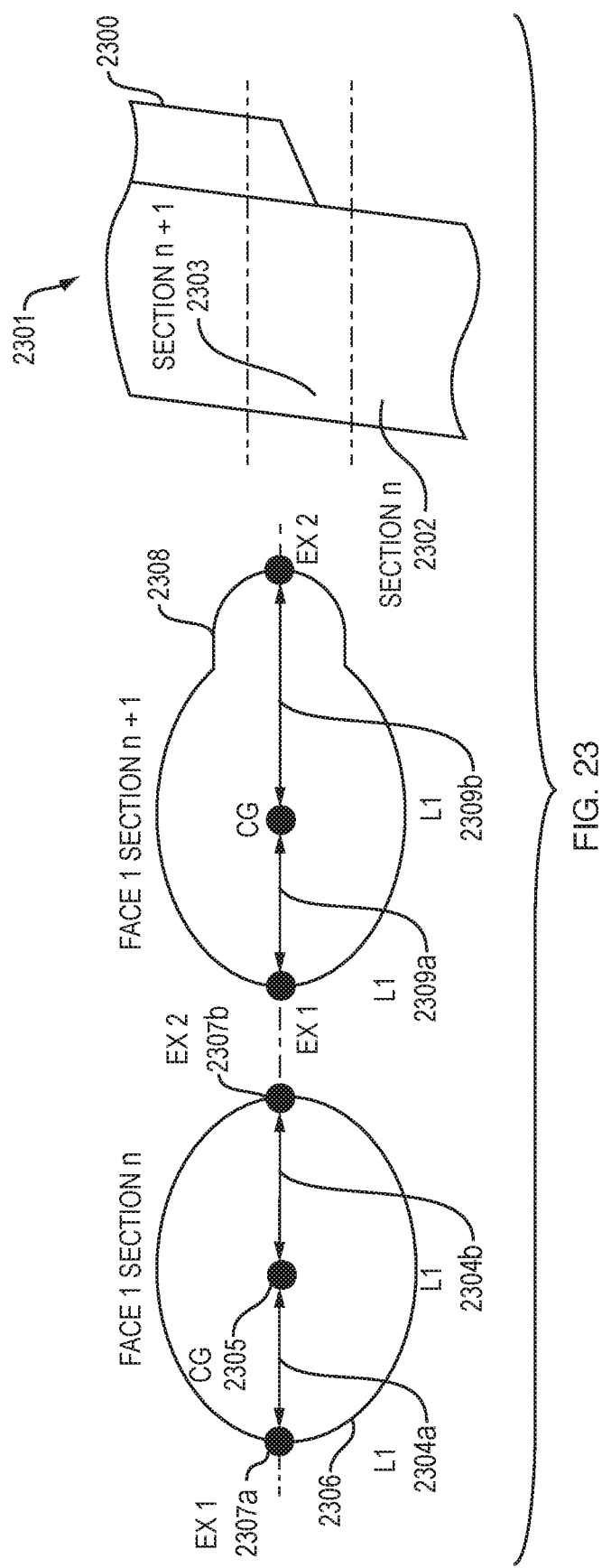
FIG. 23 portrays properties of tool sections that are identified in embodiments.

The section asymmetry evaluation provides information needed to detect a push trigger. FIG. 23 illustrates that a push trigger 2300 is associated with a change in the shape of the handle 2301. This change is visible from the section 2302 to the section 2303 where the section 2303 is included in the trigger 2300. Embodiments analyze the evolution of section properties to identify the trigger 2300. In an embodiment, each section obtained in step 1, e.g. step 1921, includes "n" closed curves. Each closed curve is filled to form a face (at step 2, e.g. step 1922). The presence of a push trigger leads to a longer face length and a change in the positioning of the geometric center of the face. Embodiments evaluate a distance L1 2304a connecting the geometric center 2305 of a face 2306 to Ex1 2307a and a distance $L_2$ 2304b connecting the geometric center 2305 to Ex2 2307b. In an embodiment, it is assumed that a face is asymmetric if |L1-L2|>x, where x is an empirically fixed threshold of 1 mm. It is noted that embodiments may modify the value of x depending upon the tools for which grasping cues are being identified.

In FIG. 23 the face 2306 is considered symmetric because L1 2304a minus L2 2304b is not greater than x because, as depicted in FIG. 23, L1 2304a is approximately equal to L2 2304b. In contrast, the face 2308 is asymmetric. Specifically, the absolute value of 2309a minus 2309b is greater than x. In FIG. 23, the face 2306 is from the section 2302 and the face 2308 is from the section 2303. Embodiments can identify asymmetric sections by evaluating the properties of faces that are part of sections.

Region Asymmetry

As described above, the evolution of section properties can be exploited at the segmentation step (step 3, e.g., the step 1923) so as to organize tool geometry into zones, segments, and regions successively. In an embodiment, a region is defined as a group of sections that share similar area and geometric center properties. Each region possesses elementary properties such as its height, width, length, geometric center, and area. In embodiments, regions are also described by a new property, referred to herein as region asymmetry. Region asymmetry is determined by analyzing the asymmetry of the faces belonging to the region. Three cases are considered: (1) if more than 50% of the faces are asymmetrical and have a total height greater than 15 mm, then the region is considered to have "total asymmetry," (2) if less than 50% of the faces are asymmetrical and have a total height less than 15 mm, then the region is considered to have "total symmetry," and (3) if the faces of the regions do not fall into those classifications, the region is considered to have "partial asymmetry." In an embodiment, regions of the model as classified using these criteria and, then, as described below, this region asymmetry property is used to detect push triggers.

Push Trigger Identification

At the beginning of step 4 (step 1924 FIG. 19), tool geometry has been segmented into regions. Step 4 classifies and identifies these regions as a head, a handle, or a push trigger. Since the head region was identified during steps 1905-1906, embodiments, at steps 1907-1908, identify the handle and the push trigger.

In an embodiment, regions are identified by comparing their properties with the value range of the region type being searched. For example, a pistol drill handle is expected to have a width between 30 and 50 mm, as shown in Table 5. In an embodiment, the handle is identified by performing this comparison.

Figure 24:
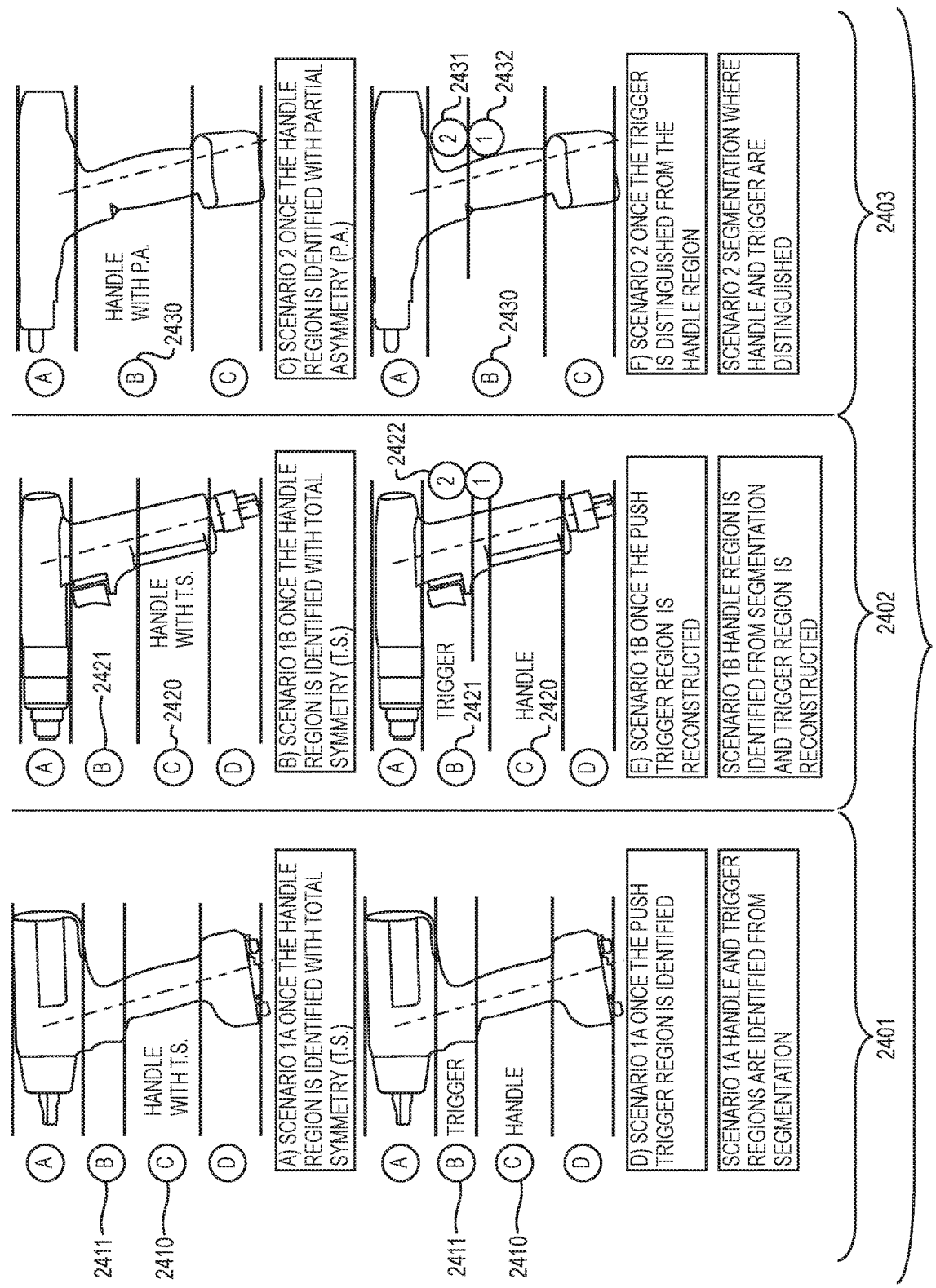
FIG. 24 illustrates scenarios of push trigger detection that are considered in embodiments for determining grasping cues for pistol-shaped tools.

To continue, for the steps 1907-1908, it is assumed that the handle region is already identified and, as such, as part of step 1908, the push trigger region is identified. Depending on the segmentation parameters and the pistol-shaped tool geometry, three possible scenarios, scenario 1A (2401 in FIG. 24), scenario 1B (2402 in FIG. 24), and scenario 2 (2403 in FIG. 24), arise.

Scenario 1A (2401)

For the scenario 2401, a handle region 2410 was identified that is characterized by total symmetry. In turn, the trigger identification step, described below, will identify a push trigger region 2411.

Figure 25:
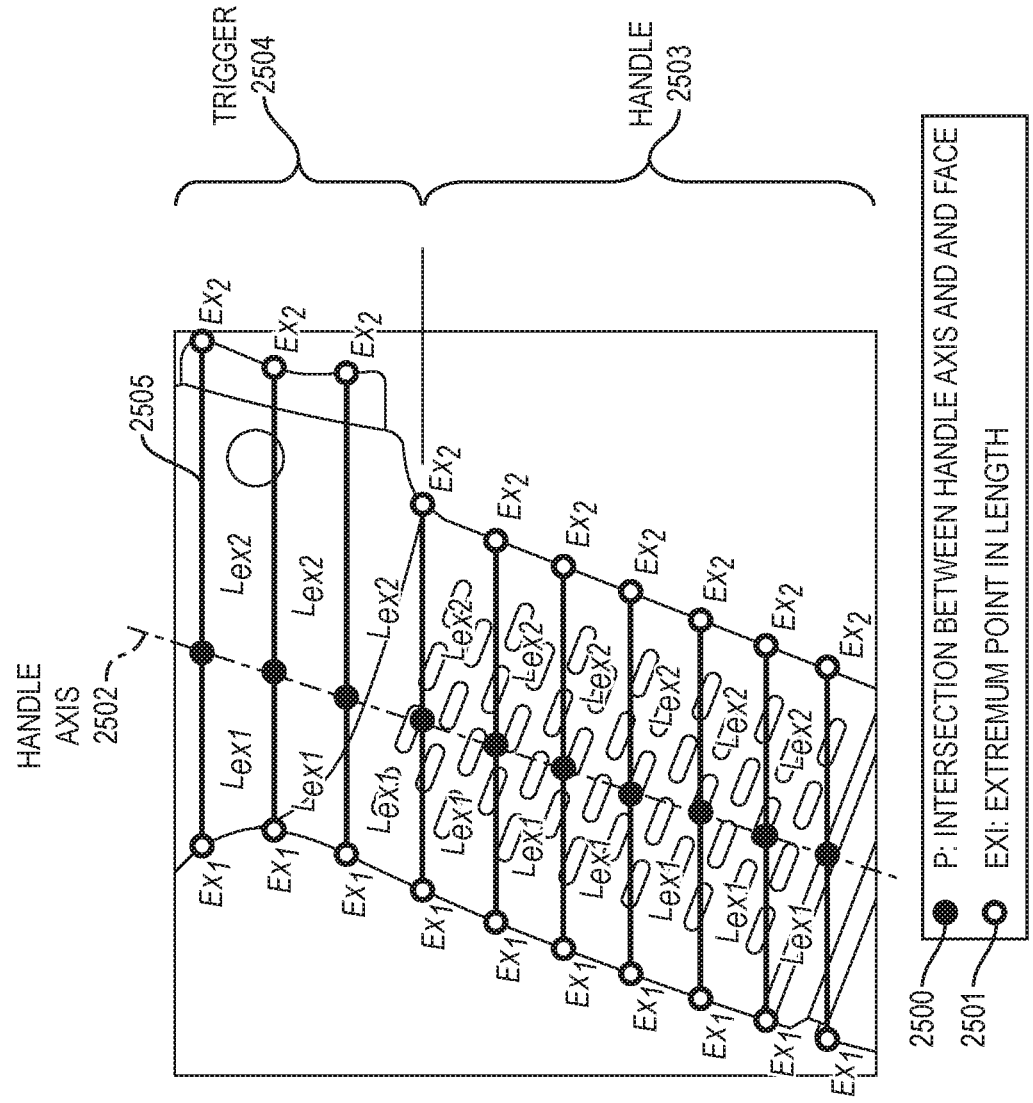
FIG. 25 depicts faces and properties of the faces that are analyzed in an embodiment.

In scenario 2401, the push trigger region 2411 is identified. Starting from the first region above the handle 2410, according to the distance from the tool's head (determined at steps 1905-1906), the regions are tested successively according to the following two criteria. The first criteria are the region property values falling within the values specified for push triggers in Table 5. In this example, the region is identified as having total asymmetry, and the region's width is between 30 and 50 mm. The second criteria requires that for each asymmetric face of the region, one extremum point along the length verifies the rule $L_{exi} > \overline{L} + 5$ mm, where $L_{exi}$ is the distance between the extremum point and the intersection of the handle axis with the face (P), while L characterizes the average distance between the extremum points and P for all faces of the handle region. This is illustrated in FIG. 25 where the points 2500 (P) of the intersection between the handle axis 2502 and the faces of the handle 2503 and trigger 2504 are depicted and the extremum points 2501 for each face of the handle 2503 and trigger 2504 are depicted. In FIG. 25, an example $L_{exi}$ 2505 is shown. In this way, it is verified that the push trigger geometry 2504 includes a portion that is offset from the handle 2503 and where the index finger is positioned to operate the tool.

Scenario 1B (2402)

For the scenario 2402, a handle region 2420 was identified that is characterized by total symmetry. However, the trigger identification step, described below, will not identify a push trigger region and reenacts it, i.e., the push trigger region is recognized/reconstructed by identifying sections that satisfy criteria to belong to the trigger region, and these sections are assembled into a trigger region.

If scenario 1A was not verified, no push trigger region was identified and scenario 1B (2402) applies. Such an embodiment reenacts the trigger, i.e., the push trigger region is recognized/reconstructed by identifying sections that satisfy criteria to belong to the trigger region, and assembles these sections into a trigger region In such an embodiment, starting from the first section in the region 2421 above the handle 2420, according to the distance from the head (determined at steps 1905-1906), the sections are tested successively according to the following criteria: (1) the section is asymmetric and (2) the sections corresponding face verifies the rule $L_{exi}>\overline{L}+5$ mm. This is illustrated in FIG. 25 where the points 2500 of the intersection between the handle axis 2502 and the faces of the handle 2503 and trigger 2504 are depicted and the extremum points 2501 for each face of the handle 2503 and trigger 2504 are depicted. In FIG. 25, an example $L_{exi}$ 2505 is shown.

If a section does not qualify as belonging to the push trigger, it is discarded. If the section qualifies as belonging to the push trigger, it is counted and the test proceeds with the next section until a series of sections with a height of 20 mm is found. It is noted that while the described embodiments consider a series of sections with a combined height of 20 mm to be indicative of a trigger region, embodiments may change this threshold based upon the tools being analyzed. To continue, the series of sections with a combined height of 20 mm is considered to be the push trigger region 2422 illustrated as region B2 in FIG. 24. In this way, it is verified that the push trigger region 2422 is at least 20 mm high and includes a portion that is offset by at least 5 mm from the handle axis and where the index finger can be positioned to operate the mechanism.

Scenario 2 (2403)

In the scenario 2403, a handle region 2430 that is characterized by partial asymmetry was found. The trigger identification step, described below, identifies a push trigger region 2431 within this handle region 2430.

Scenario 2 2403 applies when a handle region 2430 is found and characterized by partial asymmetry. To continue, within that region 2430, the asymmetric portion 2431 and the symmetric portion 2432 are identified. The symmetric portion 2432 of the region is expected to correspond to the handle, whereas the asymmetric portion 2431 is tested as a push trigger according to the rules of Scenario 1A. Specifically, the criteria require that (1) the region has total asymmetry and its width is between 30 and 50 mm and (2) for each asymmetric face of the region, one extremum point along the length verifies the rule $L_{exi}>\overline{L}+5$ mm, where $L_{exi}$ is the distance between the extremum point and the intersection of the handle axis with the face (P) and L characterizes the average distance between the extremum points and P for all faces of the handle region.

If none of these scenarios 2401, 2402, or 2403 applies, then no trigger is identified. It can be noted, however, that in all tested cases a trigger was identified if a handle was identified.

Extraction of Grasping Cues for Pistol-Shaped Tools

For pistol-shaped tools, and as mentioned above, the affordance features are identified in sequence starting with the head, then the handle, and finally the push trigger.

Once the features are identified the next step is to extract grasping cues from these features. In an embodiment, the grasping cue associated with the head, and designated working point, is extracted in step 1906 (which includes the steps 1921-1925), just after identifying the head.

Figure 26:
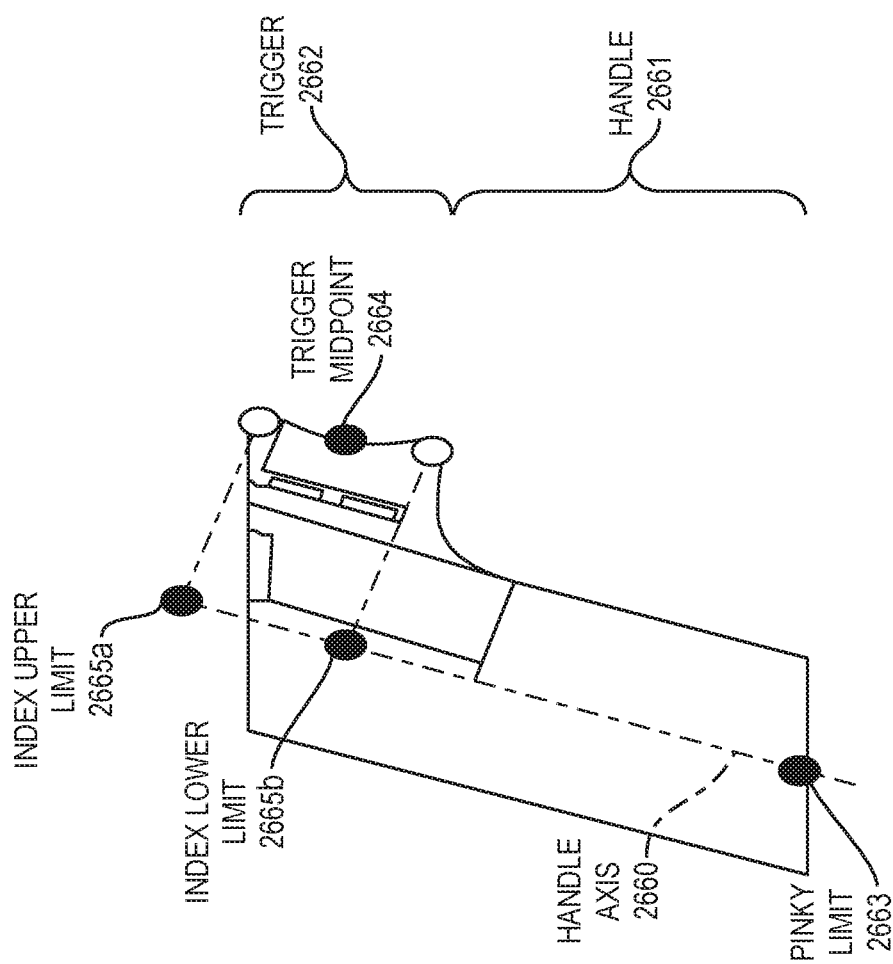
FIG. 26 portrays grasping cues identified in an embodiment for a pistol-shaped tool.

To continue, in an embodiment, the handle axis 2660 illustrated in FIG. 26 is obtained at steps 1907-1908 using a singular value decomposition to estimate a mean axis passing through the geometric centers of the faces belonging to the handle region 2661. The two most distant faces of the handle region 2661 are used to determine the limits of the position of the hand on the handle. Specifically, the geometric centers of these two faces are projected on the handle axis 2660 to generate the two grasping cues that limit the hand translation, the pinky limit 2663 and the index limit, which is further refined. The index limit is replaced next by more precise cues extracted from the push trigger 2662.

According to an embodiment, the grasping cues associated with the push trigger 2662 are obtained as follows. First, the functional side of the trigger 2662 is identified. The functional side is the side of the trigger 2662 where the index finger will be positioned. The functional side is also the side of the trigger 2662 that is the farthest from the handle axis 2660. The functional side is identified by projecting the extremum points (Ex1 and Ex2), obtained earlier, e.g., the points 2501 illustrated in FIG. 25, for each face of the trigger region 2662, onto the axis of the handle 2660. The functional side is the one with the largest average projection distance. Once the functional side is identified, the position of the index finger on the trigger 2662 is conveyed by a grasping cue, designated 'trigger midpoint' 2664, calculated by averaging the extremum points belonging to the functional side of the trigger region 2662. Next, as it is possible for the index finger to move on the contact surface of the trigger 2662, two index movement limits are conveyed by two grasping cues, index upper limit 2665a and index lower limit 2665b. The index upper limit 2665a and index lower limit 2665b are calculated by projecting the extremum point belonging to the functional side of the first and last faces of the trigger region 2662 onto the handle axis 2660.

Example Embodiment Illustration and Validation

Below an example embodiment is described that illustrates the proposed grasping cues extraction functionality for pistol-shaped tools and the results obtained from twelve industrial 3D CAD models are presented.

Illustration of Example Embodiment

Figure 27:
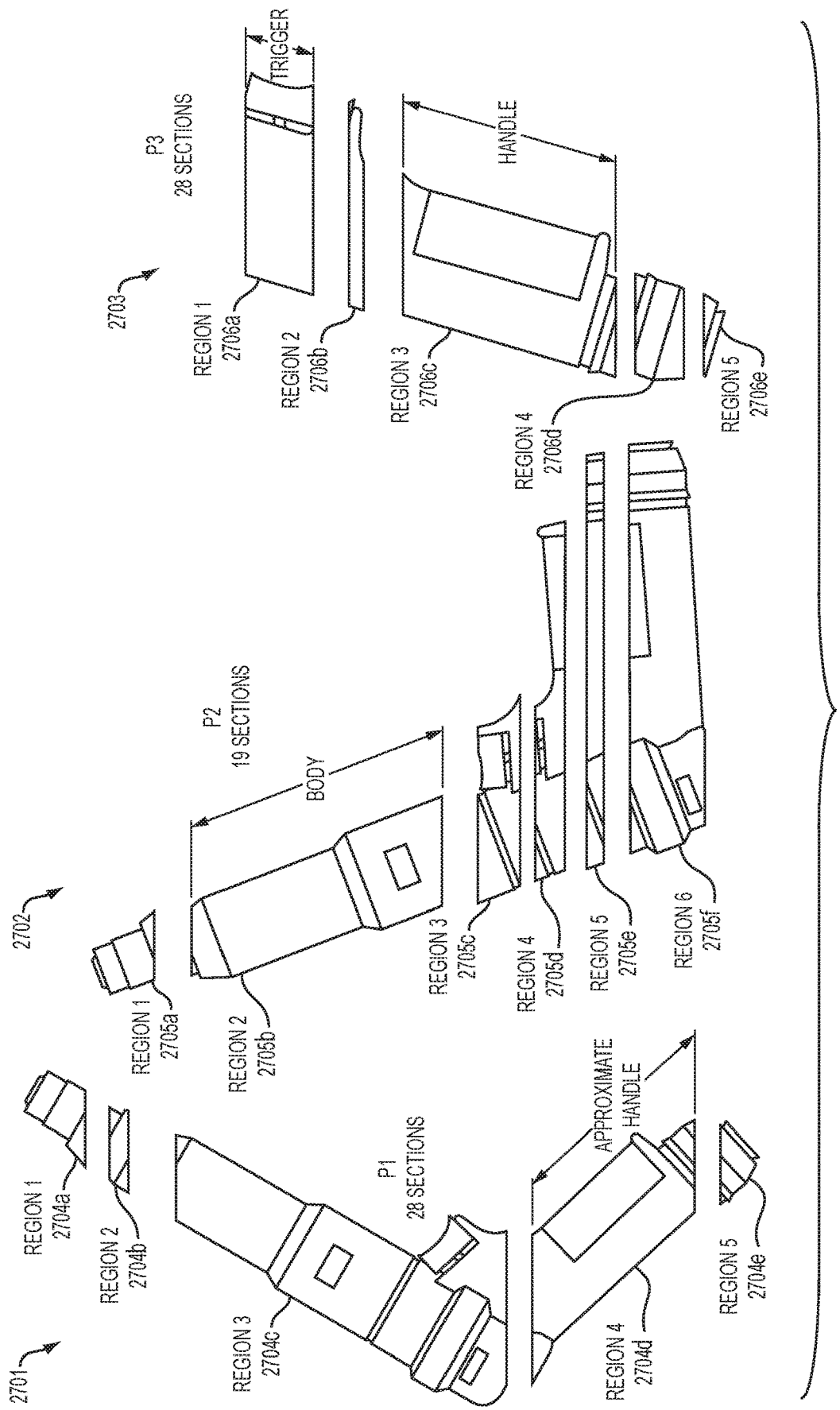
FIG. 27 illustrates stages of an embodiment.

Because pistol-shaped tools have multiple main directions, successive section scans are performed. FIG. 27 illustrates the stages 2701-2703 of an embodiment implementing these successive scans. Steps 1903 and 1904 determine the tool's first main direction, which corresponds to the handle axis. Hence, in the example embodiment illustrated in FIG. 27, a first section scan of 28 sections is performed (1921) along the main axis of the oriented bounding box, e.g., the length 2201a of the bounding box 2200 in FIG. 22. Section properties are extracted (1922). Inner faces are removed and distinct faces, if any, belonging to the same section are unified using convex hull. The tool's 3D geometry is segmented according to the area of the faces and geometric center evolution. For the considered example, five regions 2704a-e are automatically generated (1923). Properties for the regions 2704a-e (corresponding to 1-5) obtained for steps 1903 and 1904 are provided in Table 6.

TABLE 6

Pistol Shaped Tool Example Region Properties

| Region Number | Region Area (mm²) | Region GC (mm) | Region Height (mm) | Region Width (mm) | Region Asymmetry |
|---|---|---|---|---|---|
| 1 | 356.8 | (−13.26; 3.0; 0) | 14.4 | 15.1 | Total Symmetry |
| 2 | 707.6 | (−29.0; 3.0; 0) | 0 | 27.1 | Total Symmetry |
| 3 | 1521.2 | (−114.1; −10.6; 0) | 154.5 | 33.4 | Partial Asymmetry |
| 4 | 1199.2 | (−201.8; −77.7; 0) | 82.8 | 28.7 | Total Symmetry |
| 5 | 388.3 | (−228.8; −121; 0) | 0 | 24.9 | Total Symmetry |

At this step, an approximate handle is searched for (step 1924) among the segmented regions. Regions 2704a-e are tested according to their decreasing height. Region 3 (Region 2704c in FIG. 2701) has the greatest height (154.5 mm shown in Table 6), and region 3's (2704c) properties satisfy the requirements from Table 5. However, region 3 (2704c) also is the widest of all regions listed in Table 6 (33.4 mm). Since the width of the handle is expected to be smaller than the width of the body, region 3 (2704c) is not identified as the handle region. Region 4 (2704d) is tested next. Since region 4's (2704d) properties fall within the expected value ranges of an approximate handle (Table 5) and region 4 (2704d) is not the widest segmented region (28.7 mm), region 4 (2704d) is identified as the approximate handle. The approximate handle axis is obtained by performing a singular value decomposition on the GCs of the faces that belong to the approximate handle region, regions 2704d in FIG. 27.

Steps 1905-1906 determine the tool's second main direction, which corresponds to the working axis that passes through the tool's body. The new scanning direction (e.g., 2201b in FIG. 22) is obtained by rotating the approximate handle axis by 90 degrees around the smallest dimension of the bounding box. A section scan of 19 sections is performed (1921). Section properties are extracted, i.e., calculated (1922). Inner faces are removed and distinct faces, if any, belonging to the same section are unified using convex hull. The tool's 3D geometry is segmented (1923) according to the evolution of the area and geometric centers of the faces. For this example depicted at stage 2702, six regions 2705a-f are automatically generated, as shown in FIG. 27. Properties for the regions 2705a-f (corresponding to regions 1-6) obtained for steps 1905 and 1906 are provided in Table 7.

At this step, the tool's body is searched for amongst the segmented regions to classify (1924) the regions. Regions are tested according to their decreasing height. Since properties of region 2 (2705b) fall between the expected value ranges of a body (Table 5), while having a greater width (33.2 mm) than the approximate handle (from the previous step, 28.7 mm), region 2 (2705b) is identified as the body. The working axis is then obtained by performing a singular value decomposition on the geometric centers of the faces that belong to the body region (region (2705b). Regarding the identification sequence of a pistol drill, the grasping cue of the tool's head can be determined (1925) determined by looking at the tool extremity of the smallest area of the faces of the body region (region 2705b). Its corresponding "working point" is then extracted as a grasping cue (1925).

Steps 1907-1908 determine the optimal scanning direction to detect the push trigger. At this step, both main directions represented by the approximate handle and the working axis are known. The optimal direction (e.g. 2201c in FIG. 22) for this third section scan is obtained by rotating the body axis by 90 degrees around the smallest dimension of the bounding box. Once the optimal scanning direction is determined the process 1920 is performed to determine the grasping cues of the tool.

A section scan of 28 sections is performed (1921) along the optimal direction. Section properties are extracted (1922). Inner faces are removed and distinct faces, if any, belonging to the same section are unified using convex hull. Moreover, to maximize the efficiency of trigger segmentation, sections with an area greater than 2000 mm² are removed since they are likely to belong to the body of the tool, which is useless at this step. The remaining (smaller) sections are organized according to the evolution of face area and geometric centers.

For this example depicted at stage 2703, five regions 2706a-e are automatically generated (1923), as shown in FIG. 27. Properties for the regions 2706a-e (corresponding to 1-5) obtained for steps 1907 and 1908 are provided in Table 8.

TABLE 7

Pistol Shaped Tool Example Region Properties

| Region Number | Region Area (mm²) | Region GC (mm) | Region Height (mm) | Region Width (mm) | Region Asymmetry |
|---|---|---|---|---|---|
| 1 | 412.7 | (−18.7; −1.4; 0) | 10.5 | 22.9 | Total Symmetry |
| 2 | 980.2 | (−77.9; −0.8; 0) | 90.8 | 33.2 | Total Symmetry |
| 3 | 1739.3 | (−142.9; −15.4; 0) | 13.1 | 36.4 | Total Asymmetry |
| 4 | 2387.5 | (−173.7; −59.6; 0) | 0 | 8.6 | Total Asymmetry |
| 5 | 4101.1 | (−191.0; −80.9; 0) | 0 | 8.8 | total Asymmetry |
| 6 | 5064.5 | (−191.6; −46.7; 0) | 9.2 | 29.3 | Total Asymmetry |

TABLE 8

| | Pistol Shaped Tool Example Region Properties | | | | |
|---|---|---|---|---|---|
| Region Number | Region Area (mm²) | Region GC (mm) | Region Height (mm) | Region Width (mm) | Region Asymmetry |
| 1 | 1497.1 | (−169.3; −16.9; 0) | 16.5 | 20.4 | Total Asymmetry |
| 2 | 1597.2 | (−183; −44.1; 0) | 0 | 28.4 | Total Asymmetry |
| 3 | 998.5 | (−202.3; −78.9; 0) | 62.3 | 28.6 | Total Symmetry |
| 4 | 728.5 | (−219.2; −116.2; 0) | 5.1 | 30.1 | Total Symmetry |
| 5 | 634.4 | (−221.6; −124.9; 0) | 0 | 27.9 | Total Symmetry |

At this step, the handle is searched for amongst the segmented regions. Regions are tested according to their decreasing height. Region 3 (2706c) has the greatest height (62.3 mm), and its properties satisfy the requirements from Table 5 for a handle. The handle axis is obtained by performing a singular value decomposition on the geometric centers of the faces that belong to this handle region (region 2706c).

Since the handle region 2706c identified above was determined (by evaluating geometry of faces) to have total symmetry, searching for the push trigger belongs to scenario 1, described above. Regions are tested iteratively, starting from the first region above the handle, according to the distance from the tool's head. Here, region 2 (2760b) is tested first, but region 2's (2706b) height is null and, hence, cannot be identified as a trigger (the height is null because the regions count only one section). Region 1 (2706a) is subsequently tested. Region 1's (2706a) properties satisfy the specifications for a push trigger in Table 5, and all four faces of the region have one extremum point that satisfies the rule $A=L_{Ext}>L\pm 5$ mm. Hence, the analysis falls under scenario 1a and region 1 (2706a) is identified as the trigger region.

Figure 28:
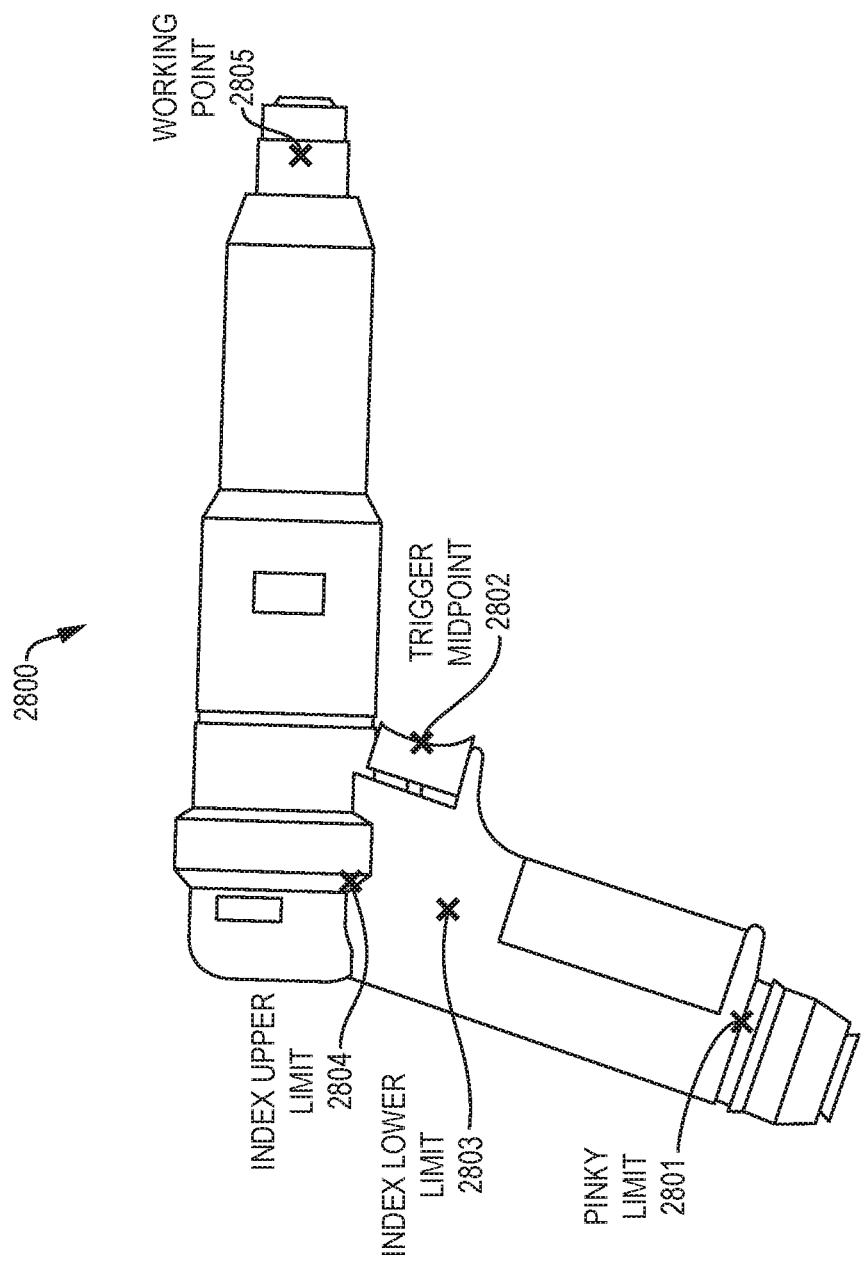
FIG. 28 is an example tool model and the associated grasping cues determined in an embodiment.

Lastly, the grasping cues 2801-2805 for the tool 2800 are generated (1925) as shown in FIG. 28. The working point 2805 is identified as described above by looking at the tool extremity of the smallest area of the faces of the body region. For the handle, the geometric centers of the two most distant faces of the handle region are projected on the handle axis to form the two grasping cues that limit the hand translation on the handle axis, the pinky limit 2801 and the index limit (not shown). The index limit which is closer to the trigger, is however disregarded to be replaced by more precise cues coming from the trigger. For the trigger, the trigger midpoint cue 2802 is calculated by averaging the extremum points belonging to the functional side of the trigger region. Next, the extremum points on the functional side of the trigger of the two most distant faces of the trigger region are projected on the handle axis to form the two grasping cues that limit the index translation, yielding the index upper limit 2804 and the index lower limit 2803. All these grasping cues are shown in FIG. 28.

Test Results

Figure 29:
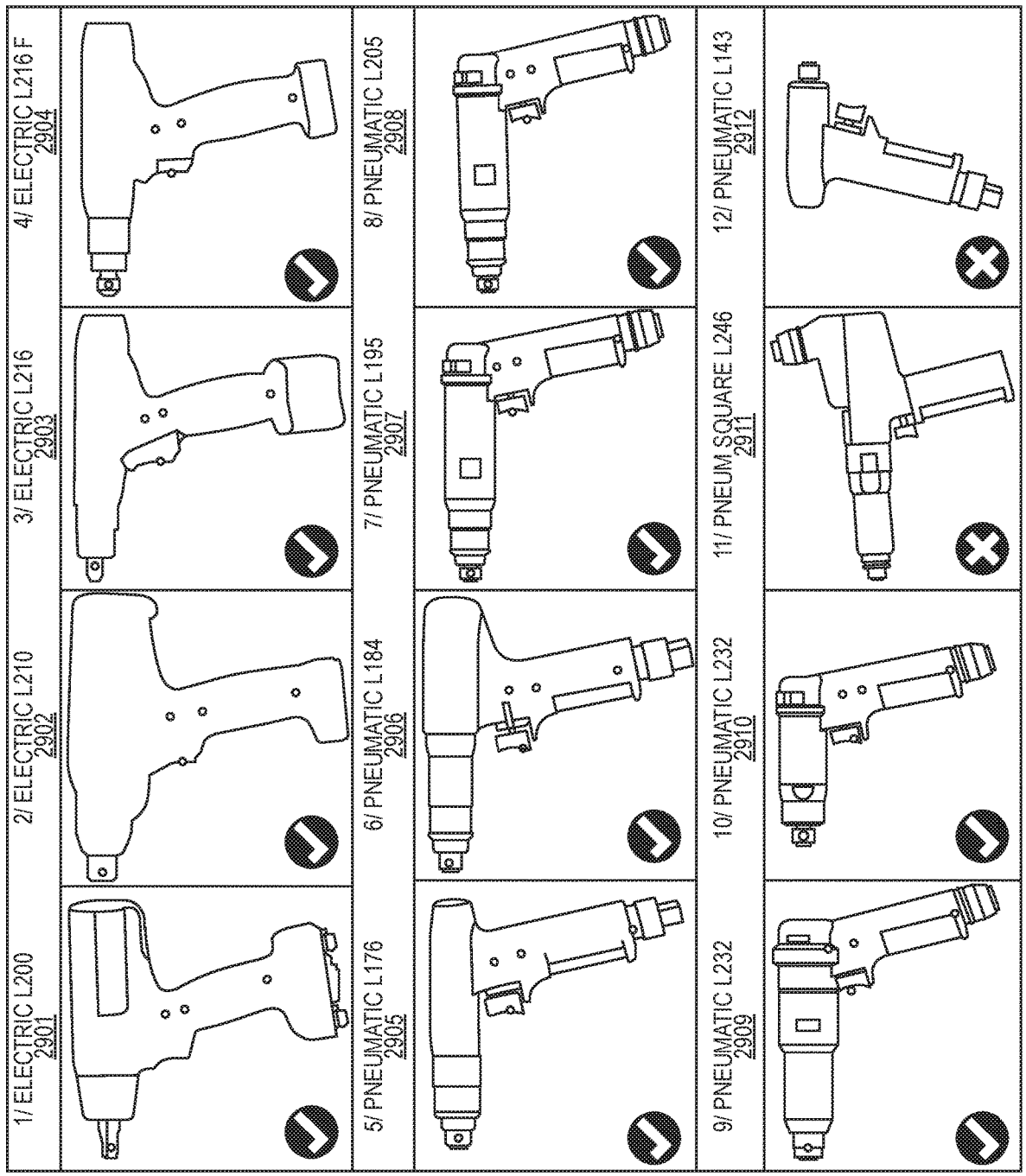
FIG. 29 illustrates CAD models of tools and grasping cues determined for the tools according to principles of embodiments.

Embodiments of the present invention for determining grasping cues have been tested and verified. Specifically, embodiments for determining grasping cues for pistol-shaped tools were tested on twelve pistol-shaped tools (using electric or pneumatic power) retrieved from Part Supply, a catalog of sourceable 3D components, or from GrabCAD, a collaboration environment that allows sharing CAD models. FIG. 29 shows tools tested 2901-2912 and the grasping cues obtained (the white dots) for the tools 2901-2912. The grasping cues obtained for the pistol-shaped tools 2901-2910 are satisfactory.

Determining if the grasping cues are satisfactory, or not, is based on the grasp of the tool expected from a human. If the grasping cues are visually positioned in a plausible way, then the result is considered valid. Otherwise, the result is considered incorrect. Two of the twelve tested tools, the tools 2911 and 2912, yielded no result because their general shape is too different from a pistol shape, or boomerang shape. For the tool 2912, the geometry of the body is too small to allow the reconstruction of an adapted working axis at steps 1905-1906. Hence, no optimal scanning direction could be determined. In the second case, the tool 2911, the square clutch at the rear of the body inhibits identifying the approximate handle region at steps 1903-1904.

As mentioned above, all models have been retrieved from Part Supply or from GrabCAD. While other online platforms, such as TurboSquid or Sketchfab, also offer a variety of 3D models freely shared by Internet users, these models do not come from industrial sources, but from other fields such as computer graphics, for which the design constraints are different. Hence, results on such tools would have questionable validity.

Embodiments rely on the scanning of the 3D geometry to lead to the extraction of sections. For the scanning, the larger the step size (or the distance between sections), the greater the risk of missing a variation in shape. On the other hand, if the scanning resolution is too fine, the scanning would not yield results that allow detecting large, but continuous variations. One possible solution that may be employed in embodiments is performing two scans: a coarser scan to detect transitions between regions and a finer scan to refine data acquisition where necessary.

Embodiments provide a method that allows automatically extracting grasping cues from the 3D CAD models of familiar tools. In embodiments the scanning direction can be directly obtained from the CAD model's oriented bounding box, as is the case for mallets, pliers, or screwdrivers. Other embodiments of the present invention build on the functionality for mallets, pliers, and screwdrivers to provide a method that automatically determines the optimal scanning direction for pistol-shaped tools (that have a more complex geometry than mallets, for example), and that leads to identifying the push trigger as a key affordance feature.

An embodiment encompasses steps 1902-1908 whose objective is to determine the main directions of the tool. First (1903-1904), the approximate handle region and approximate handle axis are determined. Second (1905-1906), the approximate handle axis is used to determine the tools' body region and working axis. Third (1907-1908), the working axis is used to determine the optimal scanning direction to identify the push trigger region.

For each scanning direction, the general process includes the same steps. First, a section scan is performed 1921. Second, the section properties are extracted 1922, including properties called section asymmetry and region asymmetry, that are used to identify the push trigger. Third, the 3D geometry is segmented 1923 into zones, segments, and regions. Fourth, regions that are meaningful for grasping are identified 1924. Fifth, grasping cues are extracted 1925 for each type of region.

Figure 30:
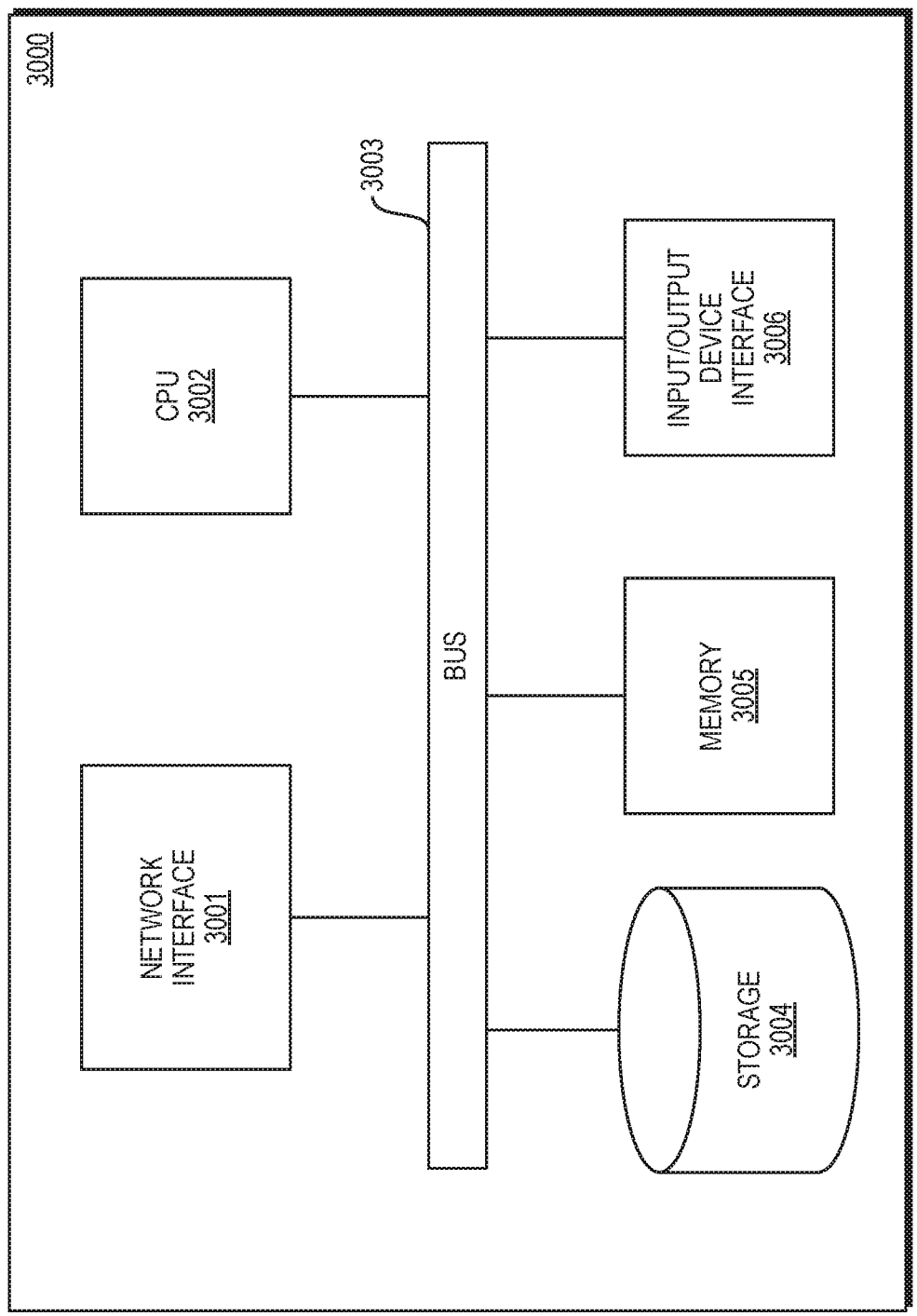
FIG. 30 is a simplified block diagram of a computer system for determining grasping cues for a CAD model of a tool according to an embodiment.

FIG. 30 is a simplified block diagram of a computer-based system 3000 that may be used to determine grasping cues according to any variety of the embodiments of the present invention described herein. The system 3000 comprises a bus 3003. The bus 3003 serves as an interconnect between the various components of the system 3000. Connected to the bus 3003 is an input/output device interface 3006 for connecting various input and output devices such as a keyboard, mouse, display, speakers, etc. to the system 3000. A central processing unit (CPU) 3002 is connected to the bus 3003 and provides for the execution of computer instructions. Memory 3005 provides volatile storage for data used for carrying out computer instructions. Storage 3004 provides non-volatile storage for software instructions, such as an operating system (not shown). The system 3000 also comprises a network interface 3001 for connecting to any variety of networks known in the art, including wide area networks (WANs) and local area networks (LANs).

It should be understood that the example embodiments described herein may be implemented in many different ways. In some instances, the various methods and machines described herein may each be implemented by a physical, virtual, or hybrid general purpose computer, such as the computer system 3000, or a computer network environment such as the computer environment 3100, described herein below in relation to FIG. 31. The computer system 3000 may be transformed into the machines that execute the methods described herein, for example, by loading software instructions into either memory 3005 or non-volatile storage 3004 for execution by the CPU 3002. One of ordinary skill in the art should further understand that the system 3000 and its various components may be configured to carry out any embodiments or combination of embodiments of the present invention described herein. Further, the system 3000 may implement the various embodiments described herein utilizing any combination of hardware, software, and firmware modules operatively coupled, internally, or externally, to the system 3000.

Figure 31:
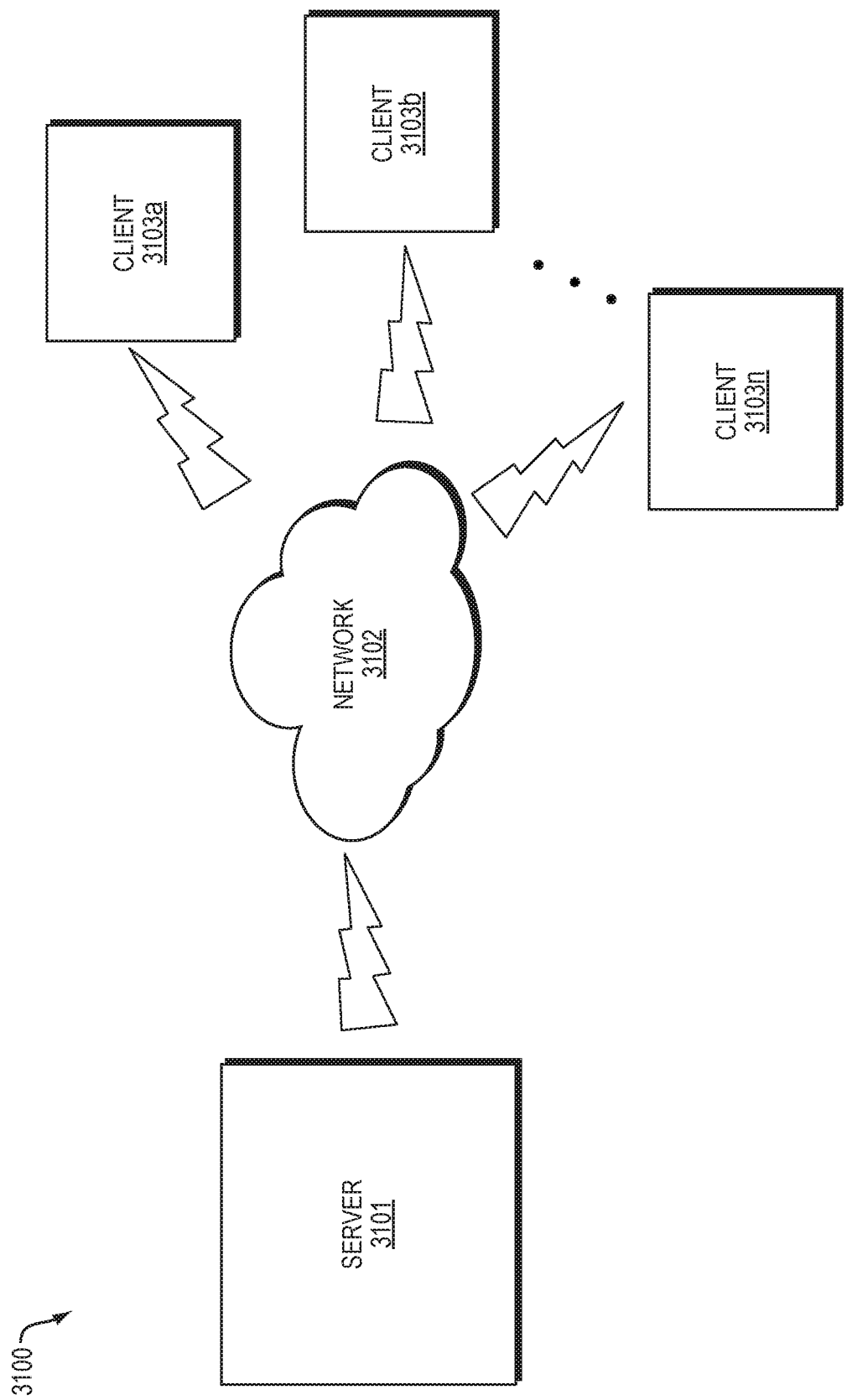
FIG. 31 is a simplified diagram of a computer network environment in which an embodiment of the present invention may be implemented.

FIG. 31 illustrates a computer network environment 3100 in which an embodiment of the present invention may be implemented. In the computer network environment 3100, the server 3101 is linked through the communications network 3102 to the clients 3103*a*-*n*. The environment 3100 may be used to allow the clients 3103*a*-*n*, alone or in combination with the server 3101, to execute any of the embodiments described herein. For non-limiting example, computer network environment 3100 provides cloud computing embodiments, software as a service (SAAS) embodiments, and the like.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

REFERENCES

[1] M. R. Cutkosky and R. D. Howe. Human Grasp Choice and Robotic Grasp Analysis. In ST Venkataraman, page 5-31, 1990.

[2] V.-D. Nguyen, "Constructing force-closure grasps," Int. Jour. Robotic Res, vol. 7, no. 3, pp. 3-16, 1988.

[3] Bohg, J., Morales, A., Asfour, T., & Kragic, D. (2014). Data-driven grasp synthesis—a survey. *IEEE Transactions on Robotics,* 30(2), 289-309.

[4] J. Bohg and D. Kragic, "Learning grasping points with shape context," Robotics and Autonomous Systems, vol. 58, no. 4, page 362-377, 2010.

[5] A. T. Miller, S. Knoop, P. K. Allen, and H. I. Christensen. Automatic grasp planning using shape primitives. In Proceedings of IEEE International Conference on Robotics and Automation, 2003.

[6] Y. Li and N. Pollard, "A Shape Matching Algorithm for Synthesizing Humanlike Enveloping Grasps," in IEEE/RAS Int. Conf. on Humanoid Robots (Humanoids), page 442-449, 2005.

[7] K. Yamane, J. Kuffner, and J. K. Hodgins. Synthesizing animations of human manipulation tasks. ACM Transactions on Graphics, 23(3), 2004.

[8] F. Kyota, T. Watabe, S. Saito, and M. Nakajima. Detection and evaluation of grasping positions for autonomous agents. In International Conference on Cyberworlds, page 8-460, 2005.

[9] S. El-Khoury. Approche Mixte, Analytique et par Apprentissage, pour la Synthèse d'une Prise Naturelle (Thesis, Pierre et Marie Curie University, Paris, France, 2008).

[10] A. Myers, C. Teo, C. Fermüller, and Y. Aloimonos. Affordance Detection of Tool Parts from Geometric Features. In International Conference on Robotics and Automation, page 1374-1381, 2015.

[11] A. Myers, A. Kanazawa, C. Fermüller, and Y. Aloimonos. Affordance of Object Parts from Geometric Features. In International Conference on Robotics and Automation, page 1374-1381, 2015.

[12] R. Rouhi, M. Amiri, B. Irannej ad, A review on feature extraction techniques in face recognition, Signal & Image Processing, 3 (2012) 1.

[13] A. Sahbani, S. El-Khoury, P. Bidaud, An overview of 3D object grasp synthesis algorithms, Robotics and Autonomous Systems, 60 (2012) 326-336.

[14] S. El-Khoury, A. Sahbani, A new strategy combining empirical and analytical approaches for grasping unknown 3D objects, Robotics and Autonomous Systems, 58 (2010) 497-507.

[15] J. Huang, C.-H. Menq, Automatic data segmentation for geometric feature extraction from unorganized 3-D coordinate points, IEEE Transactions on Robotics and Automation, 17 (2001) 268-279.

[16] X. Li, Y. J. Zhang, X. Yang, H. Xu, G. Xu, Point cloud surface segmentation based on volumetric eigenfunctions of the Laplace-Beltrami operator, Computer Aided Geometric Design, 71 (2019) 157-175.

[17] S. Prabhakar, M. R. Henderson, Automatic form-feature recognition using neural-network-based techniques on boundary representations of solid models, Computer-Aided Design, 24 (1992) 381-393.

[18] P. Schmidt, N. Vahrenkamp, M. Wächter, T. Asfour, Grasping of unknown objects using deep convolutional neural networks based on depth images, in: 2018 IEEE International Conference on Robotics and Automation (ICRA), IEEE, 2018, pp. 6831-6838.

[19] Z. Zhang, P. Jaiswal, R. Rai, FeatureNet: Machining feature recognition based on 3D Convolution Neural Network, Computer-Aided Design, 101 (2018) 12-22.

[20] N. D. Cornea, D. Silver, P. Min, Curve-skeleton properties, applications, and algorithms, IEEE Transactions on Visualization & Computer Graphics, (2007) 530-548.

[21] O. K.-C. Au, C.-L. Tai, H.-K. Chu, D. Cohen-Or, T.-Y. Lee, Skeleton extraction by mesh contraction, in: ACM transactions on graphics (TOG), ACM, 2008, pp. 44.

[22] C.-M. Ma, S.-Y. Wan, J.-D. Lee, Three-dimensional topology preserving reduction on the 4-subfields, IEEE Transactions on Pattern Analysis and Machine Intelligence, 24 (2002) 1594-1605.

[23] S. Svensson, I. Nyström, G. S. Di Baja, Curve skeletonization of surface-like objects in 3D images guided by voxel classification, Pattern Recognition Letters, 23 (2002) 1419-1426.

[24] C. Holleman, L. E. Kavraki, A framework for using the workspace medial axis in PRM planners, in: Proceedings 2000 ICRA. Millennium Conference. IEEE International Conference on Robotics and Automation. Symposia Proceedings (Cat. No. 00CH37065), IEEE, 2000, pp. 1408-1413.

[25] C. Díaz, S. Puente, F. Tones, Grasping points for handle objects in a cooperative disassembly system, IFAC Proceedings Volumes, 40 (2007) 112-117.

[26] N. Vahrenkamp, E. Koch, M. Wachter, T. Asfour, Planning high-quality grasps using mean curvature object skeletons, IEEE Robotics and Automation Letters, 3 (2018) 911-918.

[27] L. Berscheid, T. Rühr, T. Kröger, Improving Data Efficiency of Self-supervised Learning for Robotic Grasping, arXiv preprint arXiv:1903.00228, (2019).

[28] R. Minetto, N. Volpato, J. Stolfi, R. M. Gregori, M. V. Da Silva, An optimal algorithm for 3D triangle mesh slicing, Computer-Aided Design, 92 (2017) 1-10.

What is claimed is:

1. A computer-implemented method of determining grasping cues for a model of a tool, the method comprising: scanning a computer-aided design (CAD) model representing a real-world tool to generate a series of sections from the CAD model;
extracting properties of each section of the series of sections;
automatically identifying one or more regions of the CAD model, wherein each identified region is formed of a grouping of successive sections and each region is identified based upon: (i) change in extracted properties between successive sections across one or more of the identified regions exceeding a threshold and (ii) a tool family to which the tool represented by the CAD model belongs;
determining a respective classification for each of the one or more identified regions based upon geometrical properties of the one or more identified regions and the tool family, wherein for each region the tool family indicates the determined respective classifications as a function of expected geometrical properties of real-world tools in the tool family; and
generating grasping cues for the CAD model based upon the determined respective classification for each of the one or more regions.

2. The method of claim 1 wherein scanning the CAD model comprises:
scanning the CAD model in an optimal direction.

3. The method of claim 2 further comprising:
determining the optimal scanning direction.

4. The method of claim 3 wherein determining the optimal scanning direction comprises:
processing an oriented bounding box surrounding the CAD model to determine a longest dimension of the oriented bounding box; and
determining the optimal scanning direction as an axis along the determined longest dimension of the oriented bounding box.

5. The method of claim 3 wherein determining the optimal scanning direction comprises:
determining an approximate handle axis for a handle of the tool represented by the CAD model;
determining a working axis of the tool represented by the CAD model using the determined approximate handle axis; and
determining the optimal scanning direction based on the determined working axis.

6. The method of claim 1 wherein each section is formed of one or more closed curves, each closed curve forming a face.

7. The method of claim 6 wherein extracting properties of each section comprises:
calculating properties for each face.

8. The method of claim 7 wherein the properties of each face include at least one of:
geometric center; area; and extremum points.

9. The method of claim 1 further comprising:
associating the identified grasping cues with the CAD model in computer memory.

10. The method of claim 9 further comprising:
simulating real-world use of the tool using the CAD model with the associated grasping cues.

11. A system for determining grasping cues for a tool model, the system comprising:
a processor; and
a memory with computer code instructions stored thereon, the processor and the memory, with the computer code instructions being configured to cause the system to:

scan a computer-aided design (CAD) model representing a real-world tool to generate a series of sections from the CAD model;

extract properties of each section of the series of sections;

automatically identify one or more regions of the CAD model, wherein each identified region is formed of a grouping of successive sections and each region is identified based upon: (i) change in extracted properties between successive sections across one or more of the identified regions exceeding a threshold and (ii) a tool family to which the tool represented by the CAD model belongs;

determine a respective classification for each of the one or more identified regions based upon geometrical properties of the one or more identified regions and the tool family, wherein for each region the tool family indicates the determined respective classifications as a function of expected geometrical properties of real-world tools in the tool family; and generate grasping cues for the CAD model based upon the determined respective classification for each of the one or more regions.

12. The system of claim 11 wherein, in scanning the CAD model, the processor and the memory, with the computer code instructions, are further configured to cause the system to:

scan the CAD model in an optimal direction.

13. The system of claim 12 wherein, the processor and the memory, with the computer code instructions, are further configured to cause the system to:

determine the optimal scanning direction.

14. The system of claim 13 wherein, in determining the optimal scanning direction, the processor and the memory, with the computer code instructions, are further configured to cause the system to:

process an oriented bounding box surrounding the CAD model to determine a longest dimension of the oriented bounding box; and determine the optimal scanning direction as an axis along the determined longest dimension of the oriented bounding box.

15. The system of claim 13 wherein, in determining the optimal scanning direction, the processor and the memory, with the computer code instructions, are further configured to cause the system to:

determine an approximate handle axis for a handle of the tool represented by the CAD model;

determine a working axis of the tool represented by the CAD model using the determined approximate handle axis; and determine the optimal scanning direction based on the determined working axis.

16. The system of claim 11 wherein each section is formed of one or more closed curves, each closed curve forming a face.

17. The system of claim 16 wherein, in extracting properties of each section, the processor and the memory, with the computer code instructions are further configured to cause the system to:

calculate properties for each face.

18. The system of claim 11 wherein, the processor and the memory, with the computer code instructions, are further configured to cause the system to:

associate the identified grasping cues with the CAD model in computer memory.

19. The system of claim 18 wherein, the processor and the memory, with the computer code instructions, are further configured to cause the system to:

simulate real-world use of the tool using the CAD model with the associated grasping cues.

20. A non-transitory computer program product for determining grasping cues for a model of a tool, the computer program product executed by a server in communication across a network with one or more clients and comprising:

a computer readable medium, the computer readable medium comprising program instructions which, when executed by a processor, causes the processor to:

scan a computer-aided design (CAD) model representing a real-world tool to generate a series of sections from the CAD model;

extract properties of each section of the series of sections;

automatically identify one or more regions of the CAD model, wherein each identified region is formed of a grouping of successive sections and each region is identified based upon: (i) change in extracted properties between successive sections across one or more of the identified regions exceeding a threshold and (ii) a tool family to which the tool represented by the CAD model belongs;

determine a respective classification for each of the one or more identified regions based upon geometrical properties of the one or more identified regions and the tool family, wherein for each region the tool family indicates the determined respective classifications as a function of expected geometrical properties of real-world tools in the tool family; and generate grasping cues for the CAD model based upon the determined respective classification for each of the one or more regions.

* * * * *